United States Patent
Kosaka et al.

(10) Patent No.: US 11,270,450 B2
(45) Date of Patent: Mar. 8, 2022

(54) DATA POINT GROUP CLUSTERING METHOD, GUIDE INFORMATION DISPLAY DEVICE, AND CRANE

(71) Applicants: TADANO LTD., Kagawa (JP); THE SCHOOL CORPORATION KANSAI UNIVERSITY, Osaka (JP)

(72) Inventors: Takayuki Kosaka, Kagawa (JP); Iwao Ishikawa, Kagawa (JP); Satoshi Kubota, Osaka (JP); Shigenori Tanaka, Osaka (JP); Kenji Nakamura, Osaka (JP); Yuhei Yamamoto, Osaka (JP); Masaya Nakahara, Osaka (JP)

(73) Assignees: TADANO LTD., Kagawa (JP); THE SCHOOL CORPORATION KANSAI UNIVERSITY, Osaka (JP)

( * ) Notice: Subject to any disclaimer, the term of this patent is extended or adjusted under 35 U.S.C. 154(b) by 0 days.

(21) Appl. No.: 16/632,779

(22) PCT Filed: Jul. 19, 2018

(86) PCT No.: PCT/JP2018/027183
§ 371 (c)(1),
(2) Date: Jan. 21, 2020

(87) PCT Pub. No.: WO2019/017454
PCT Pub. Date: Jan. 24, 2019

(65) Prior Publication Data
US 2020/0167940 A1 May 28, 2020

(30) Foreign Application Priority Data
Jul. 21, 2017 (JP) .............................. JP2017-142197

(51) Int. Cl.
*G06T 7/521* (2017.01)
*G01S 17/42* (2006.01)
*G06T 19/00* (2011.01)
*B60R 1/00* (2022.01)
(Continued)

(52) U.S. Cl.
CPC ................ *G06T 7/521* (2017.01); *B60R 1/00* (2013.01); *B66C 13/16* (2013.01); *B66C 23/905* (2013.01);
(Continued)

(58) Field of Classification Search
CPC ......... G01B 11/24; G01S 17/42; G09B 29/00; G06T 7/521; G06T 19/00; G06T 19/006;
(Continued)

(56) References Cited

U.S. PATENT DOCUMENTS

| 2008/0075326 A1 | 3/2008 | Otani et al. |
| 2013/0218472 A1 | 8/2013 | Fu et al. |

(Continued)

FOREIGN PATENT DOCUMENTS

| CN | 101153796 A | 4/2008 |
| CN | 103500329 A | 1/2014 |

(Continued)

OTHER PUBLICATIONS

Aug. 28, 2018, International Search Report issued for related PCT Application No. PCT/JP2018/027183.
(Continued)

*Primary Examiner* — Diane M Wills
(74) *Attorney, Agent, or Firm* — Paratus Law Group, PLLC

(57) ABSTRACT

Provided is a method for clustering the data point groups of one or more measurement targets located in the same region from among the acquired data point groups. This method is provided with: acquiring a data point group in a region that contains a measurement target from above the measurement target by using a laser scanner; clustering the data point groups that correspond to the top surface of the measurement target as a planar cluster by using a data processing unit; extracting a reference planar cluster which is a refer-
(Continued)

ence for making a same-region determination; calculating the difference in height between the reference planar cluster and other planar clusters, and searching for planar clusters exhibiting a height difference within a prescribed threshold; selecting one planar cluster exhibiting a height difference within the prescribed threshold; detecting whether there is overlap between the reference planar cluster and the one planar cluster; and clustering the planar clusters as clusters in the same region when overlap is detected.

11 Claims, 33 Drawing Sheets

(51) Int. Cl.
*B66C 13/16* (2006.01)
*B66C 23/90* (2006.01)
*B66C 23/42* (2006.01)

(52) U.S. Cl.
CPC ............ *G01S 17/42* (2013.01); *G06T 19/006* (2013.01); *B60R 2300/301* (2013.01); *B66C 23/42* (2013.01); *B66C 2700/0378* (2013.01); *G06T 2207/10028* (2013.01)

(58) Field of Classification Search
CPC .......... G06T 2207/10028; B66C 13/16; B66C 23/42; B66C 23/905; B66C 2700/0378; B60R 1/00; B60R 2300/301
See application file for complete search history.

(56) References Cited

U.S. PATENT DOCUMENTS

| | | | |
|---|---|---|---|
| 2014/0035923 A1* | 2/2014 | Oshima | G06T 11/60 345/440 |
| 2015/0249821 A1* | 9/2015 | Tanizumi | B66C 13/00 348/46 |
| 2017/0116353 A1* | 4/2017 | Loss | G06F 30/13 |
| 2020/0202175 A1* | 6/2020 | Hieida | G06T 17/05 |

FOREIGN PATENT DOCUMENTS

| | | |
|---|---|---|
| EP | 2327652 A1 | 6/2011 |
| JP | 2014-186565 A | 10/2014 |
| JP | 2014-186566 A | 10/2014 |
| JP | 2014-186567 A | 10/2014 |
| JP | 2014186566 A * | 10/2014 |

OTHER PUBLICATIONS

Aug. 28, 2018, International Search Opinion issued for related PCT Application No. PCT/JP2018/027183.

Mar. 11, 2021, European Search Report issued for related EP application No. 18835405.4.

Mar. 22, 2021, European Search Report issued for related EP application No. 20210093.9.

\* cited by examiner

CROSS-SECTION ALONG A-A

DATA POINT GROUP CLUSTERING METHOD, GUIDE INFORMATION DISPLAY DEVICE, AND CRANE

CROSS REFERENCE TO PRIOR APPLICATION

This application is a National Stage Patent Application of PCT International Patent Application No. PCT/JP2018/027183 (filed on Jul. 19, 2018) under 35 U.S.C. § 371, which claims priority to Japanese Patent Application No. 2017-142197 (filed on Jul. 21, 2017), which are all hereby incorporated by reference in their entirety.

TECHNICAL FIELD

The present invention relates to a technology related to a clustering method of point cloud data of a measurement target object, a guide information display apparatus that uses the method, and a crane including the guide information display apparatus.

BACKGROUND ART

Conventionally, there is known a technique of acquiring a three-dimensional shape of a measurement target object on the basis of point cloud data of the measurement target object acquired by a laser scanner. Such a technique is disclosed in Patent Literatures (hereinafter, abbreviated as "PTL(s)") 1 to 3 below, for example.

As techniques for creating a three-dimensional map three-dimensionally expressing the shape of a grounded object as a measurement target object, PTLs 1 to 3 disclose techniques related to a three-dimensional point cloud analysis method of analyzing a three-dimensional point cloud expressing the shapes of a plurality of grounded objects and the like. According to the three-dimensional point cloud analysis methods described in PTLs 1 to 3, first, three-dimensional point cloud data is prepared, the three-dimensional point cloud data expressing outer shapes of a plurality of grounded objects, and including position coordinates in a three-dimensional coordinate space set for analysis and a normal vector of a plane where a point is estimated to exist. Then, principal component analysis is performed on the three-dimensional point cloud data to determine a provisional gravity direction, and a side surface point cloud is extracted by excluding points with normal vectors that are along the provisional gravity direction. Furthermore, points with small inter-point distances are grouped to separate point clouds on a building basis, and a side surface of each building is determined. A gravity direction is determined by determining, by principal component analysis, a normal vector for each side surface obtained in such a manner, and by taking a weighted average of outer products of the normal vectors.

According to the three-dimensional point cloud analysis methods described in PTLs 1 to 3, a side surface of each building is determined by a statistical method of principal component analysis, by using wide-region three-dimensional point cloud data expressing a plurality of grounded objects.

CITATION LIST

Patent Literature

PTL 1
Japanese Patent Application aid-Open No. 2014-186565
PTL 2
Japanese Patent Application Laid-Open No. 2014-186566
PTL 3
Japanese Patent Application Laid-Open No. 2014-186567

SUMMARY OF INVENTION

Technical Problem

In the case of displaying a guide frame indicating an outer shape, height information of a building, and the like on a monitor for each measurement target object (building) in a three-dimensional model created using a conventional technique as described in PTLs 1 to 3, for example, if a measurement target object has a complex shape, or a plurality of measurement target objects are arranged in a group, the amount of information displayed on the monitor may become excessive for a user, and visibility may be reduced.

The present invention has been made in view of such conventional problems, and an object of the present invention is to provide a method of clustering point cloud data of one or a plurality of measurement target objects existing in a same region, among point cloud data acquired, a guide information display apparatus using the method, and a crane including the guide information display apparatus.

Solution to Problem

The problems to be solved by the present invention are as described above. Next, means for solving the problems will be described.

More specifically, a clustering method of point cloud data, according to the present invention includes: a point cloud data acquisition step of acquiring, by a laser scanner, point cloud data from a region including a measurement target object, from above the measurement target object; and by a data processing section that performs arithmetic processing on the point cloud data, a plane clustering step of clustering, as a planar cluster, the point cloud data corresponding to a top surface of the measurement target object, among pieces of the point cloud data; a reference planar cluster extraction step of extracting a reference planar cluster that is the planar cluster to be a same-region determination reference; a planar cluster search step of calculating a difference between elevation values of the reference planar cluster and the planar cluster other than the reference planar cluster, and of searching for the planar cluster for which the difference between the elevation values is at or smaller than a predetermined threshold; a planar cluster selection step of selecting one planar cluster for which the difference between the elevation values is at or smaller than the predetermined threshold; an overlap detection step of detecting overlap/non-overlap of the reference planar cluster and the one planar cluster; and a same-region clustering step of clustering, as a same-region cluster, the reference planar cluster and the one planar cluster, in a case where an overlap is detected.

According to the clustering method of point cloud data having such a configuration, point cloud data of one or a plurality of measurement target objects existing in a same region may be clustered on the basis of point cloud data corresponding to a top surface of a measurement target object acquired by the laser scanner. Visibility of information displayed on a monitor may thereby be increased for a user.

The clustering method of point cloud data, according to the present invention further includes a planar cluster presence/absence determination step of determining, after the same-region clustering step, presence/absence of another planar cluster other than the one planar cluster found in the planar cluster search step, in which the planar cluster selection step, the overlap detection step, and the same-region clustering step are repeated by the data processing section after the planar cluster presence/absence determination step in an order mentioned, until absence of the other planar cluster is determined in the planar cluster presence/absence determination step.

According to the clustering method of point cloud data having such a configuration, all of one or a plurality of planar clusters existing in a same region may be clustered.

Further, in the clustering method of point cloud data according to the present invention, in the reference planar cluster extraction step, the planar cluster with a maximum elevation value is extracted as the reference planar cluster.

According to the clustering method of point cloud data having such a configuration, one or a plurality of planar clusters existing in a same region may be clustered, taking a planar cluster with a maximum elevation value as a reference.

Further, in the clustering method of point cloud data according to the present invention, the plane clustering step includes a grouping step of dividing the region into layers of a plurality of groups having a predetermined thickness in a vertical direction, and grouping the point cloud data acquired into the plurality of groups, a top surface estimation step of clustering, for each group, as the planar cluster, point cloud data corresponding to a top surface of the measurement target object, based on the point cloud data grouped into the plurality of groups, an elevation value difference calculation step of calculating a difference between elevation values of a first planar cluster belonging to one group, and a second planar cluster belonging to another group, among the planar clusters estimated in the top surface estimation step, an overlap detection step of detecting, in a case where the difference between the elevation values of the first planar cluster and the second planar cluster is at or smaller than a predetermined threshold, an overlap be' the first planar cluster and the second planar cluster in a lateral line direction of laser that is radiated by the laser scanner, and a plane combining step of combining the first planar cluster and the second planar cluster in a case where the overlap between the first planar cluster and the second planar cluster is detected, to obtain a new planar cluster.

According to the clustering method of point cloud data having such a configuration, one or a plurality of planar clusters existing in a same region may be clustered on the basis of point cloud data corresponding to a top surface of a measurement target object acquired by the laser scanner.

Further, a guide information display apparatus according to the present invention includes: a data acquisition section that includes a camera that captures an image of a region including at least a measurement target object and a ground surface, from above the measurement target object, and a laser scanner that acquires point cloud data from the region, from above the measurement target object; a data processing section that estimates a top surface of the measurement target object based on the point cloud data acquired by the laser scanner of the data acquisition section, and that creates a guide frame enclosing the top surface of the measurement target object; and a data display section that displays guide information in which the guide frame created by the data processing section and the image captured by the camera are superimposed with each other, in which the data processing section clusters, as a planar cluster, the point cloud data corresponding to the top surface of the measurement target object, among pieces of the point cloud data, extracts a reference planar cluster that is the planar cluster to be a same-region determination reference, calculates a difference between elevation values of the reference planar cluster and the planar cluster, searches for the planar cluster for which the difference between the elevation values is at or smaller than a predetermined threshold, detects overlap/non-overlap of the planar cluster for which the difference between the elevation values is at or smaller than the predetermined threshold and the reference planar cluster, and clusters, as a same-region cluster, the planar cluster for which an overlap is detected and the reference planar cluster, and creates the guide frame that collectively encloses outer shapes of a plurality of planar clusters forming the same-region cluster.

With the guide information display apparatus having such a configuration, point cloud data of one or a plurality of measurement target objects existing in a same region may be clustered on the basis of point cloud data corresponding to a top surface of a measurement target object acquired by the laser scanner. Visibility of guide information displayed on the data display section may thereby be increased for a user.

Further, in the guide information display apparatus according to the present invention, the data processing section extracts the planar cluster with a maximum elevation value as the reference planar cluster.

With the guide information display apparatus having such a configuration, one or a plurality of planar clusters existing in a same region may be clustered, taking a planar cluster with a maximum elevation value as a reference.

A crane according the present invention includes the guide information display apparatus.

With the crane having such a configuration, point cloud data of one or a plurality of measurement target objects existing in a same region may be clustered on the basis of point cloud data corresponding to a top surface of a measurement target object acquired by the laser scanner. Visibility of the guide information displayed by the guide information display apparatus may thereby be increased for a user.

ADVANTAGEOUS EFFECTS OF INVENTION

Advantageous effects of the present invention are as follows.

With the clustering method of point cloud data, the guide information display apparatus, and the crane according to the present invention, point cloud data of one or a plurality of measurement target objects existing in a same region may be clustered.

BRIEF DESCRIPTION OF DRAWING S

FIG. 5A is a schematic diagram along a Z-axis direction, and FIG. 5B is a schematic diagram along an X-axis direction;

FIG. 6A is a schematic diagram along the X-axis direction, and FIG. 6B is a schematic diagram along a Y-axis direction;

FIG. 7A is an upward view along the Y-axis direction, and FIG. 7B is a cross-section along A-A in FIG. 7A;

FIG. 8A is a diagram illustrating a data display section displaying image M, and FIG. 8B is a diagram illustrating the data display section displaying image M and guide information GD in an overlapping manner;

Figure 9A:
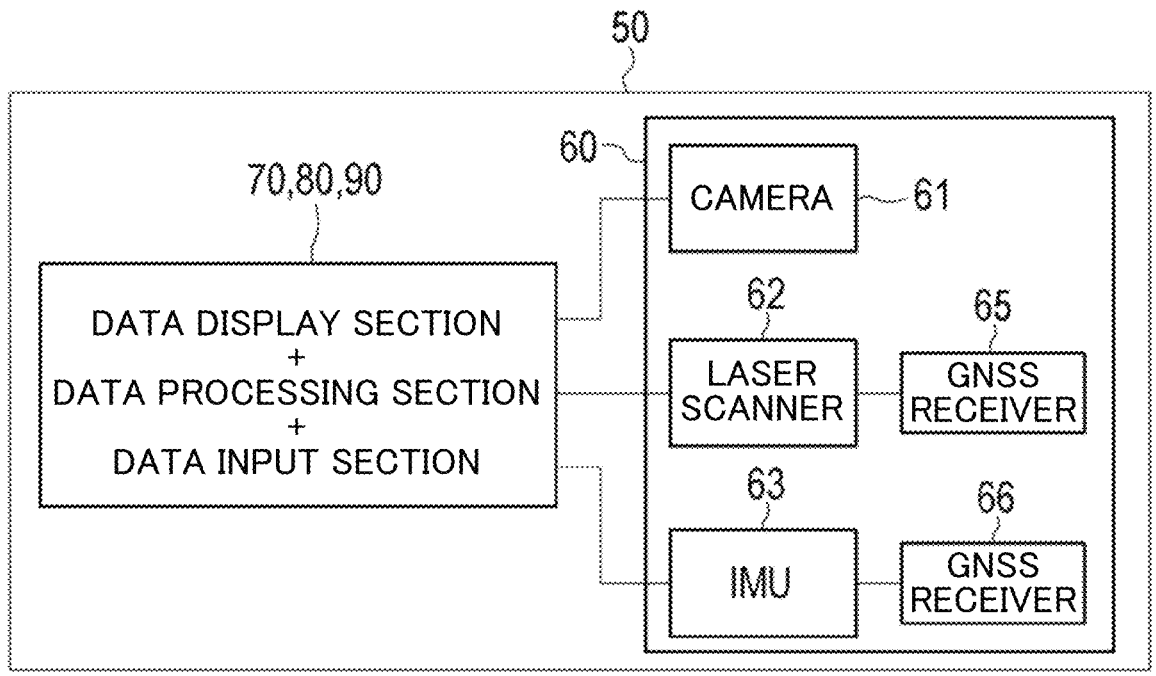
Figure 9B:
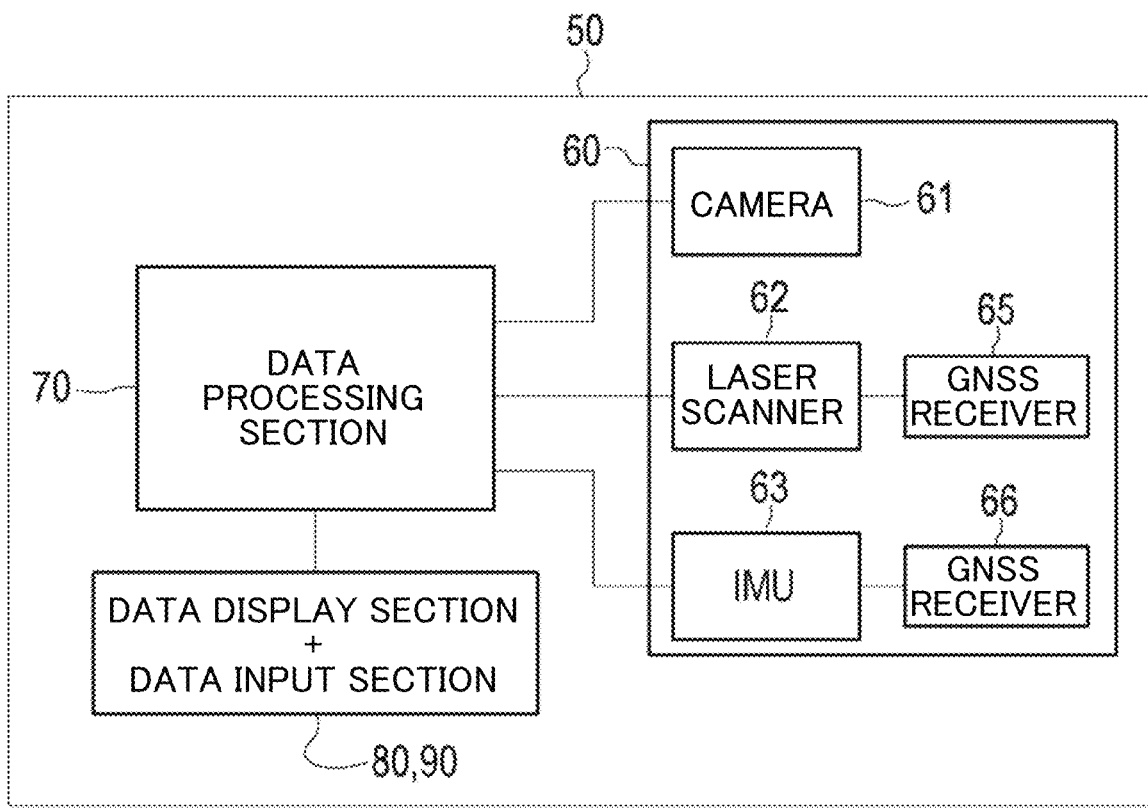
Figure 10:
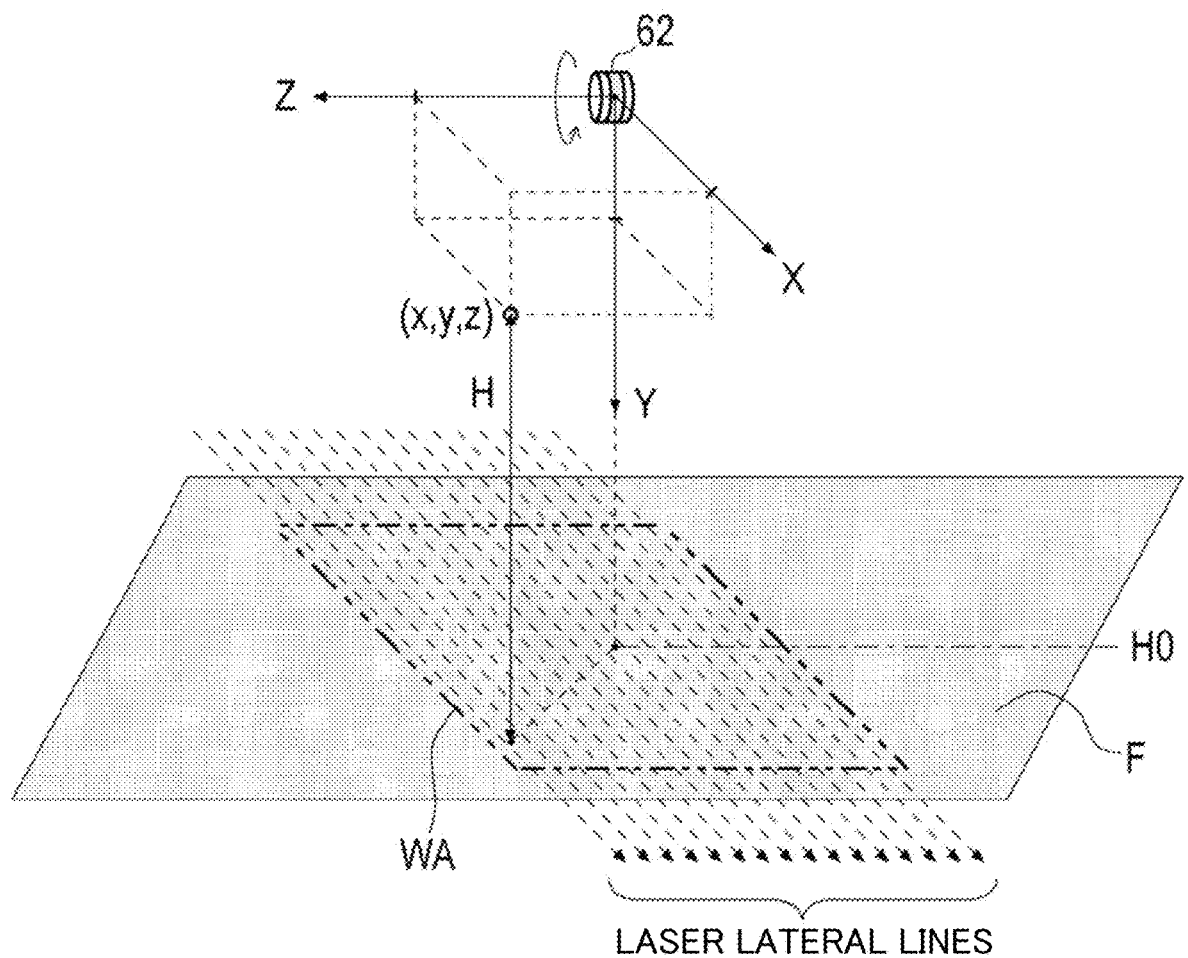
Figure 11:
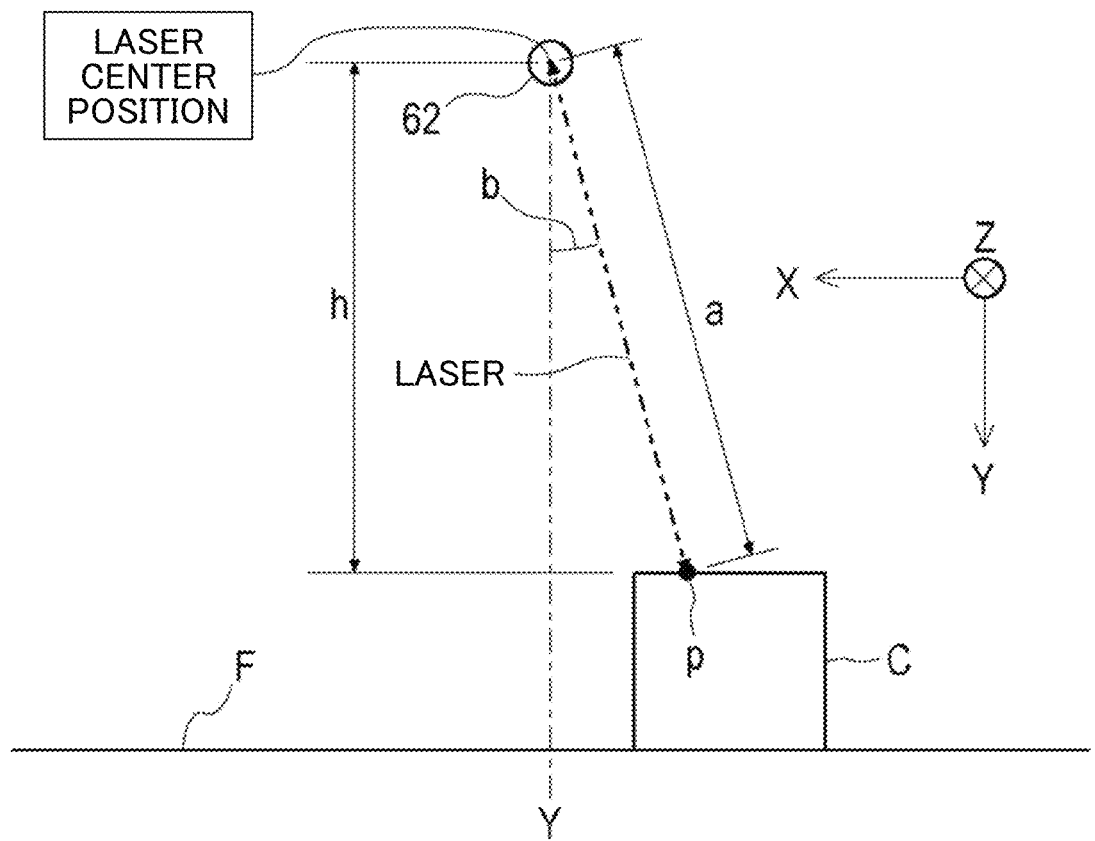
Figure 12:
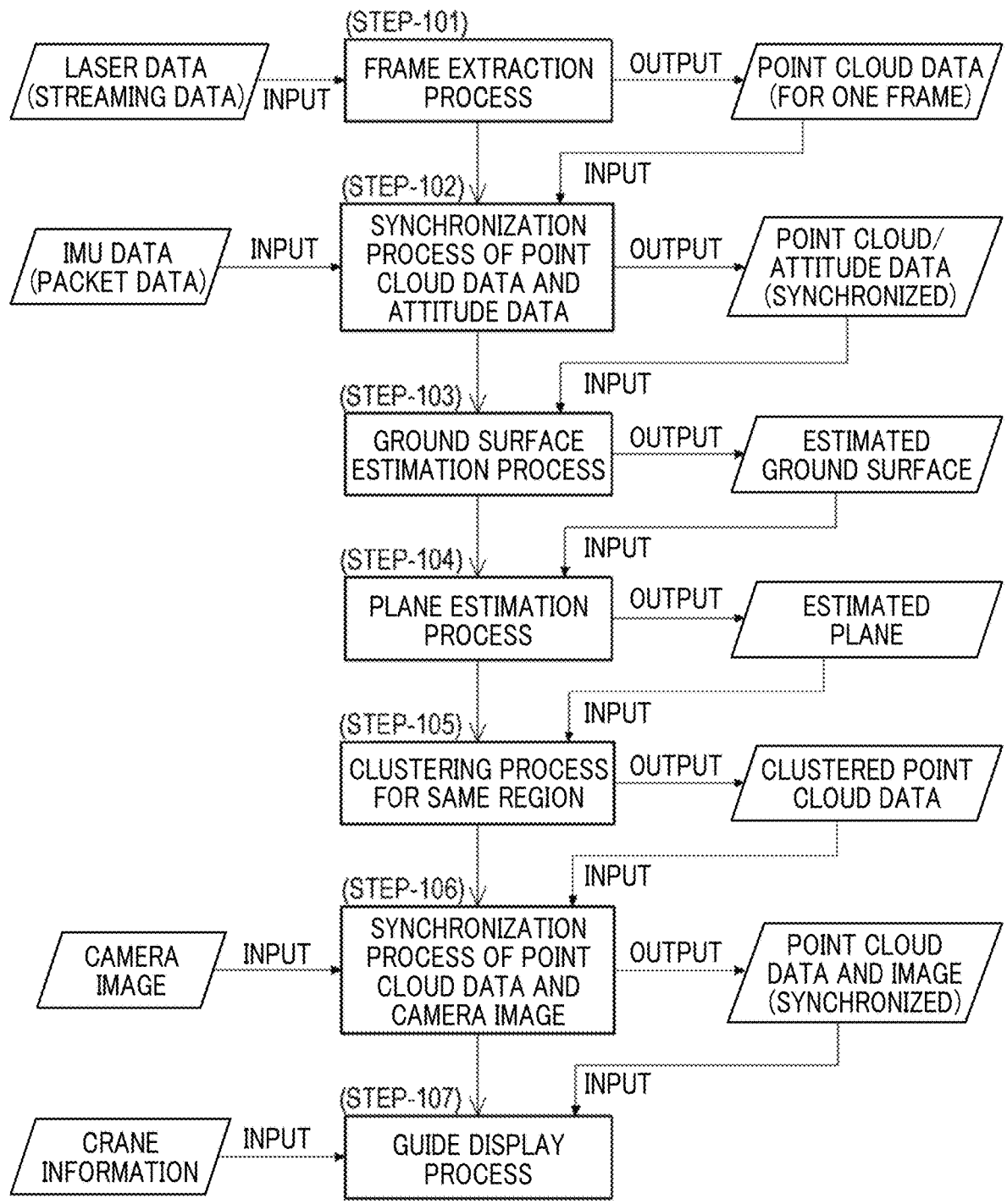
Figure 13A:
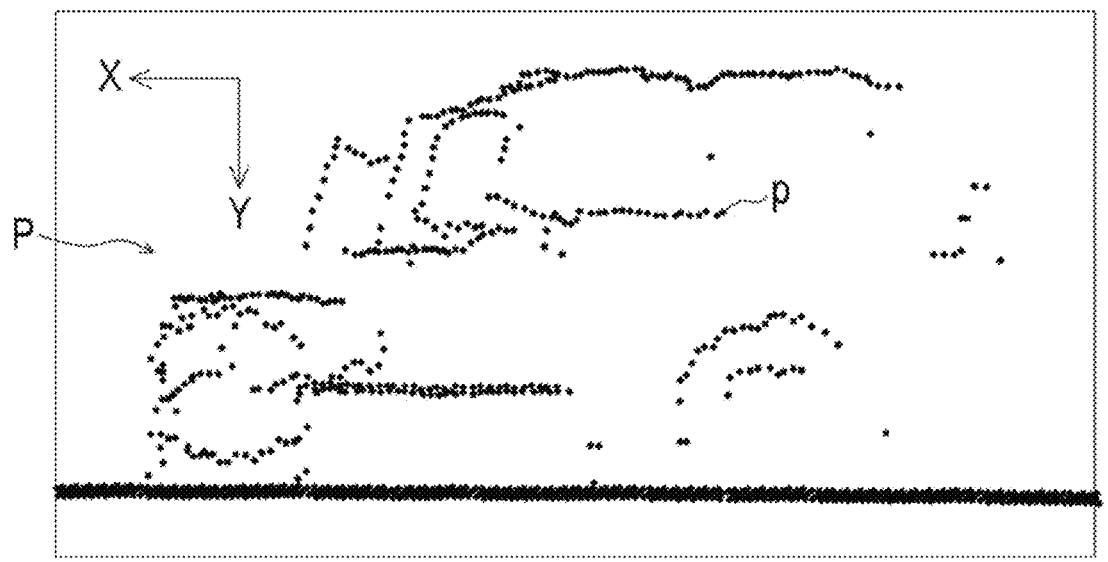
Figure 13B:
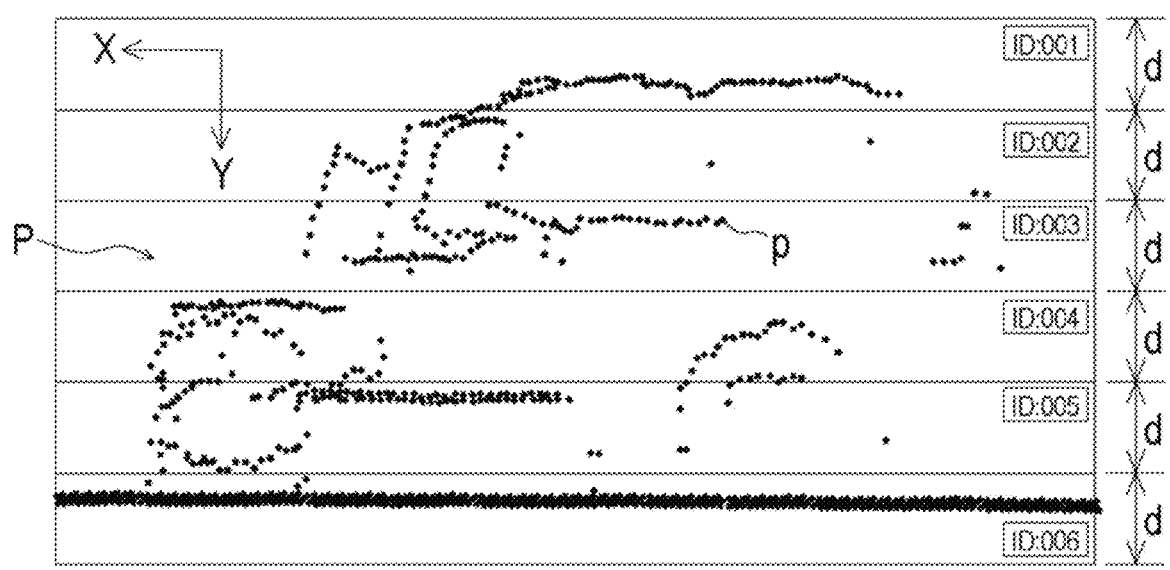
Figure 14:
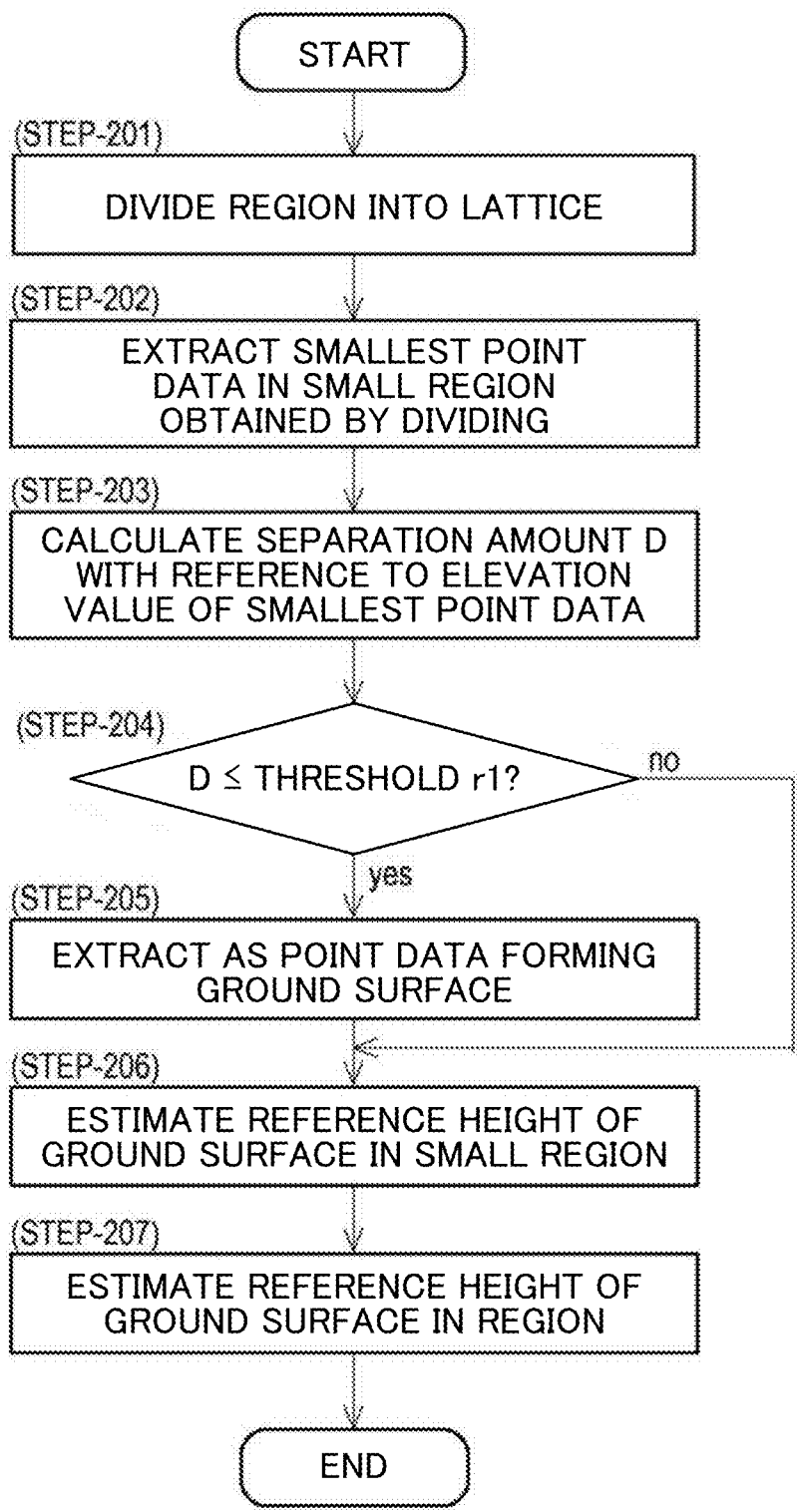
Figure 15A:
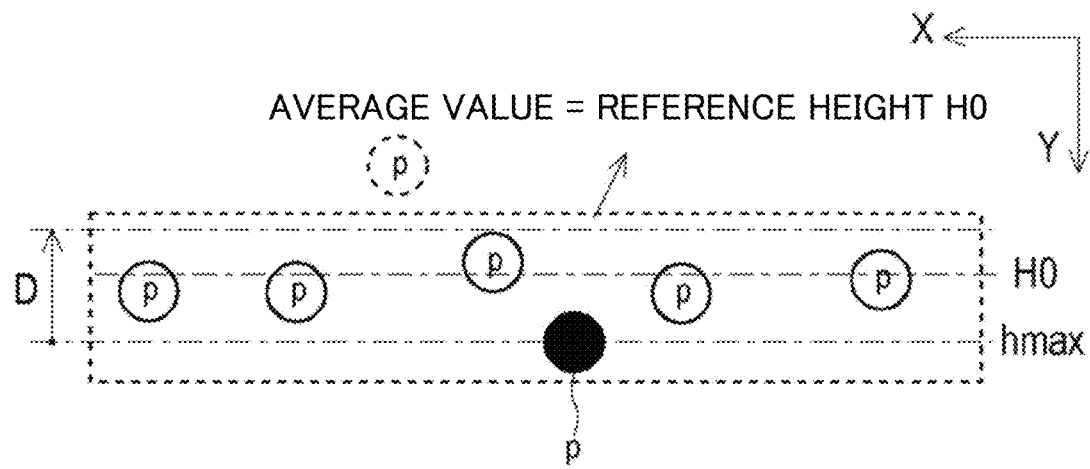
Figure 15B:
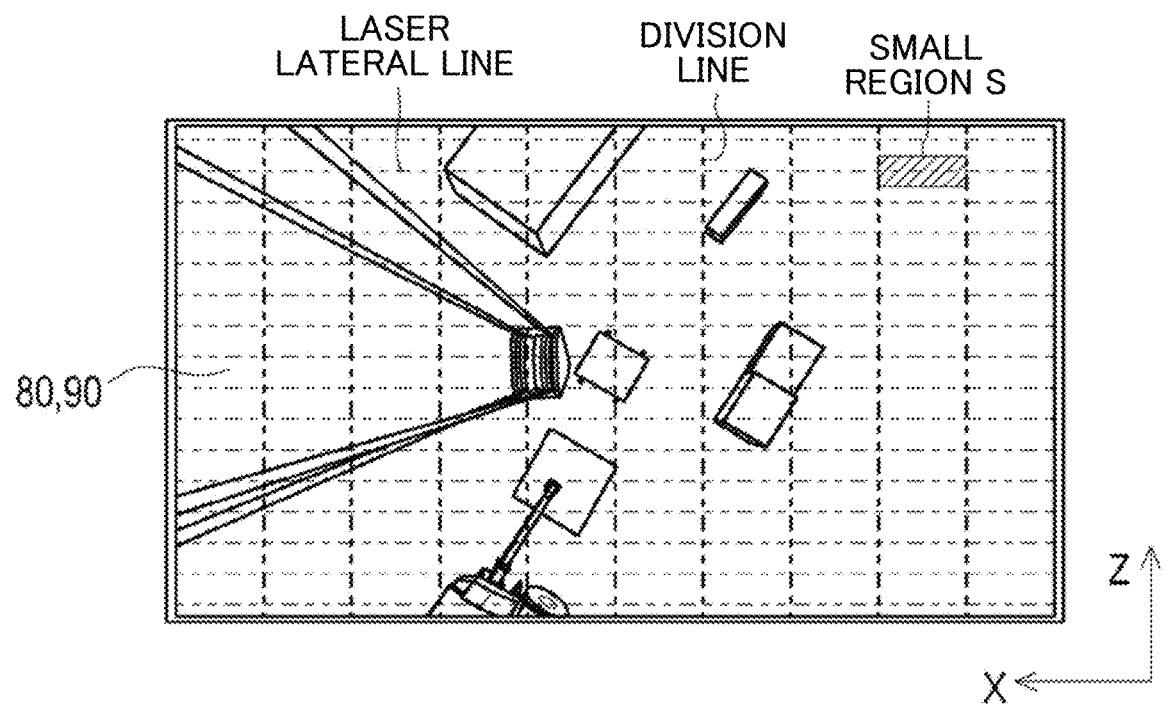
Figure 16:
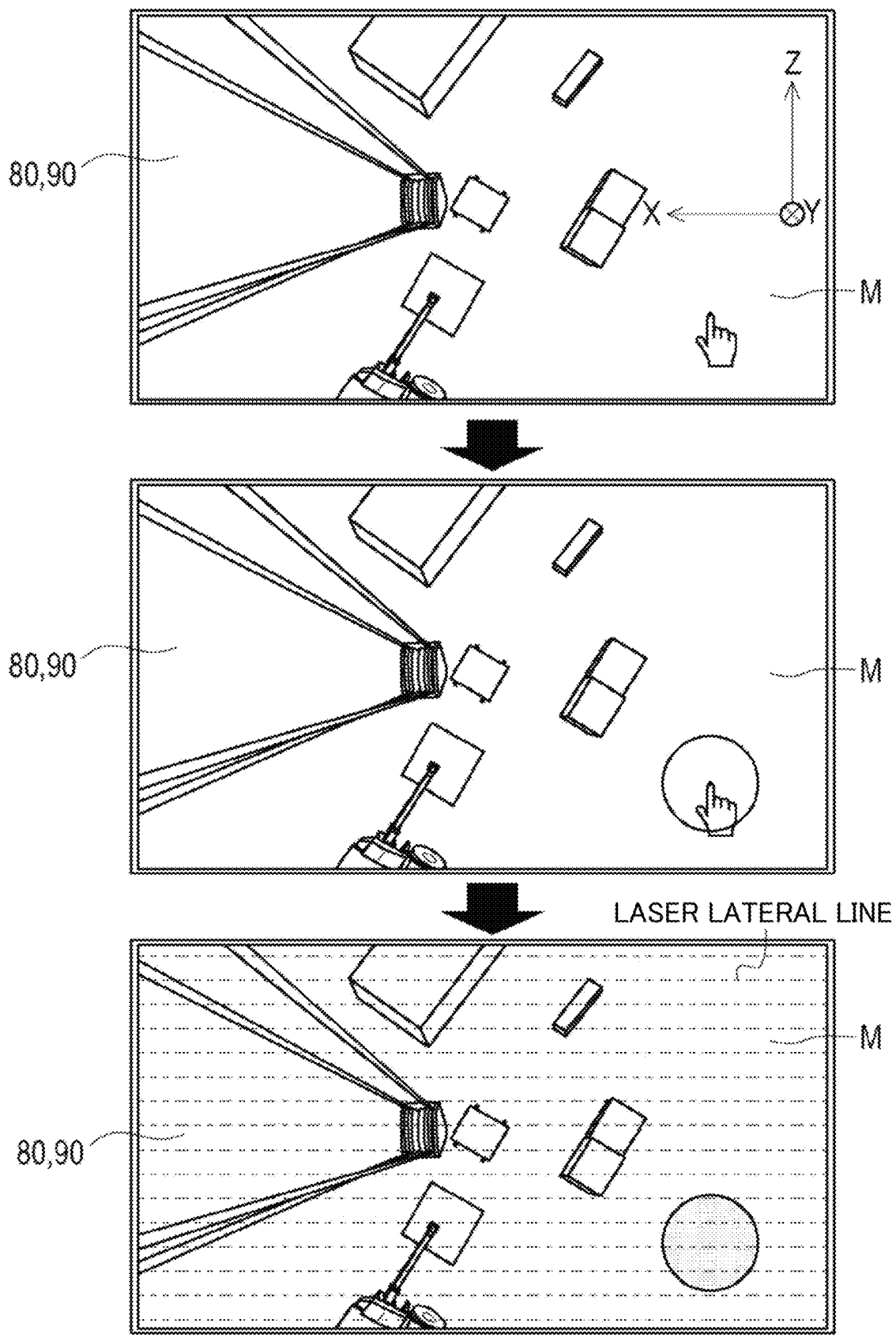
Figure 17:
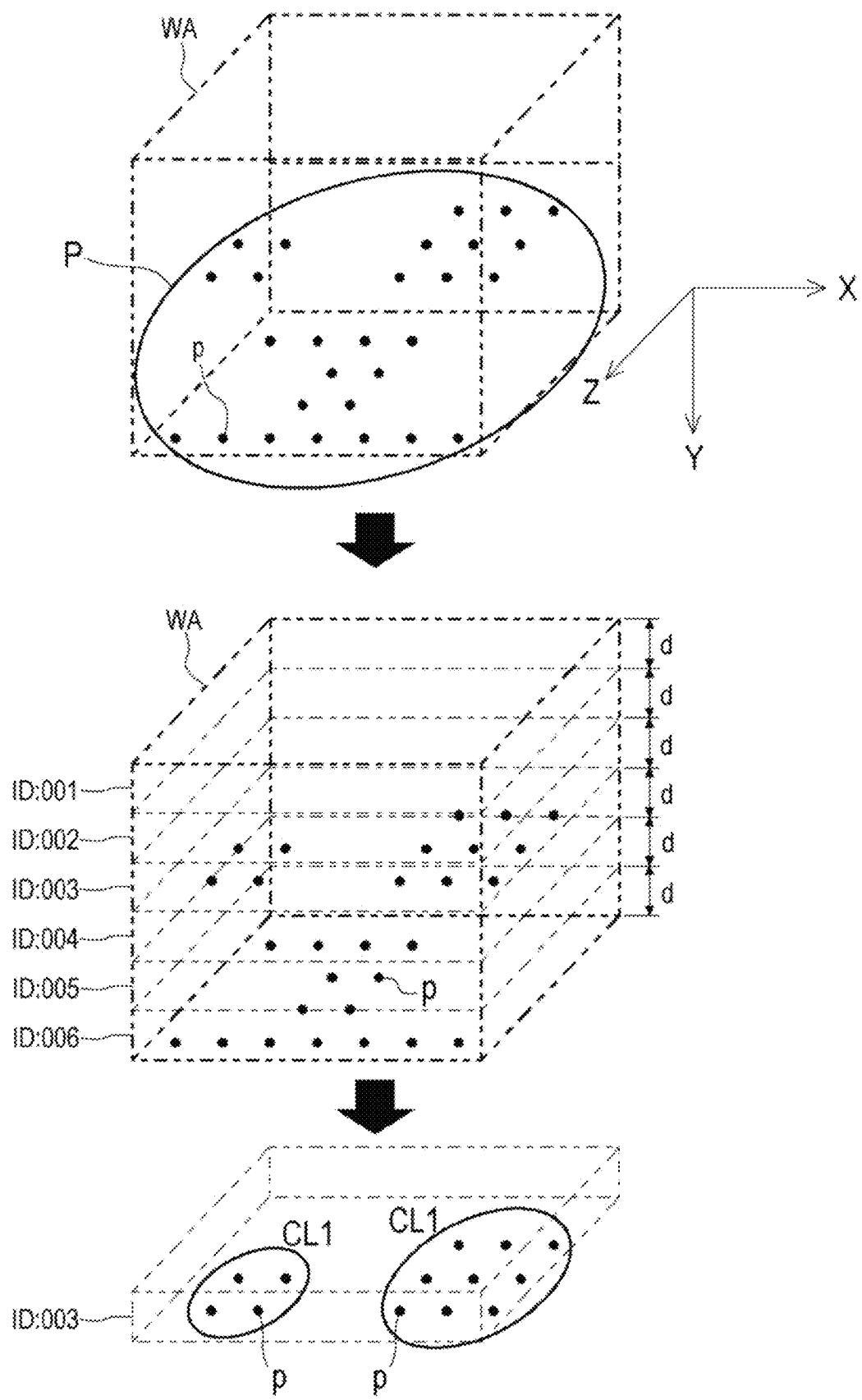
Figure 18:
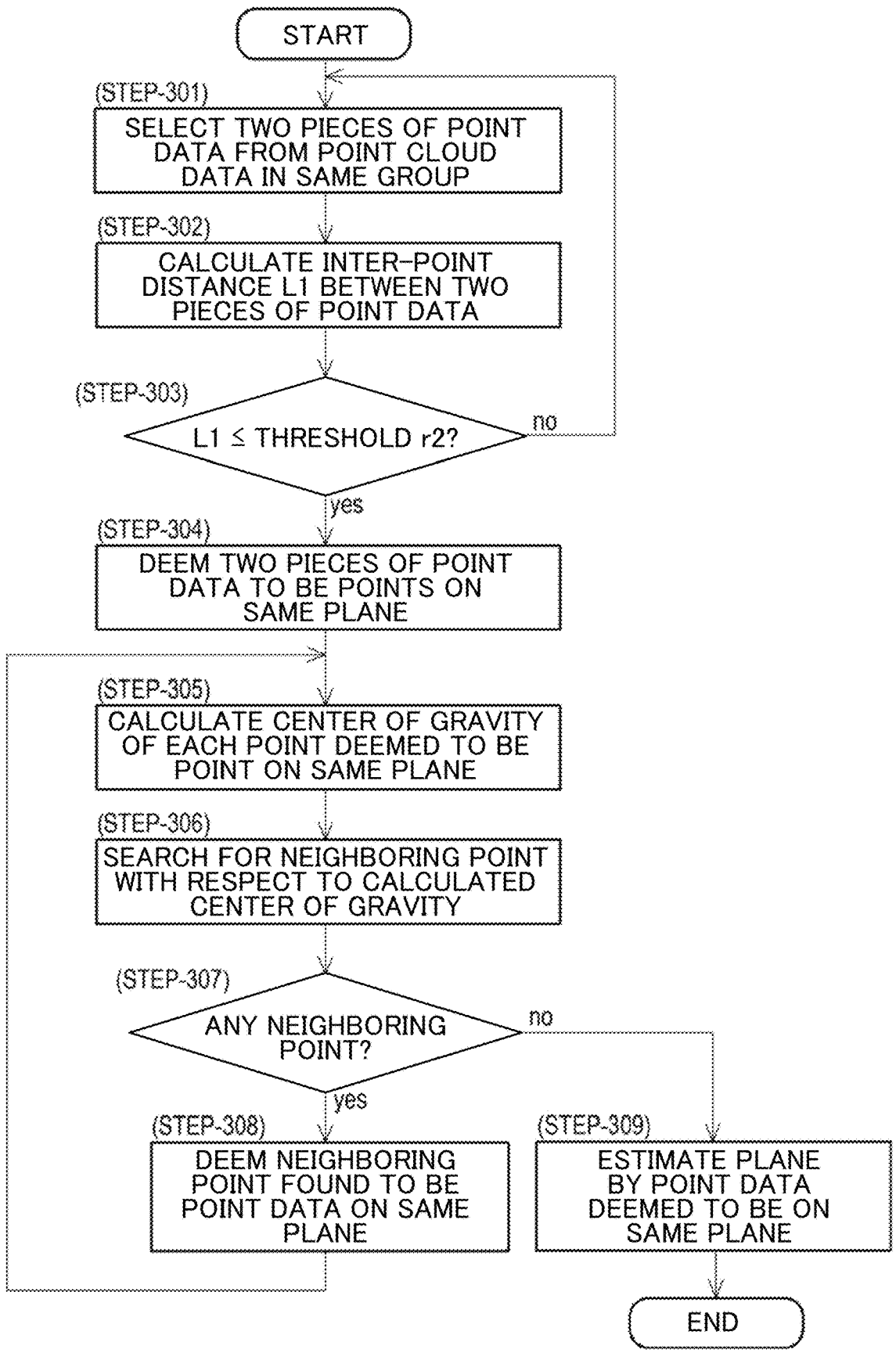
Figure 19:
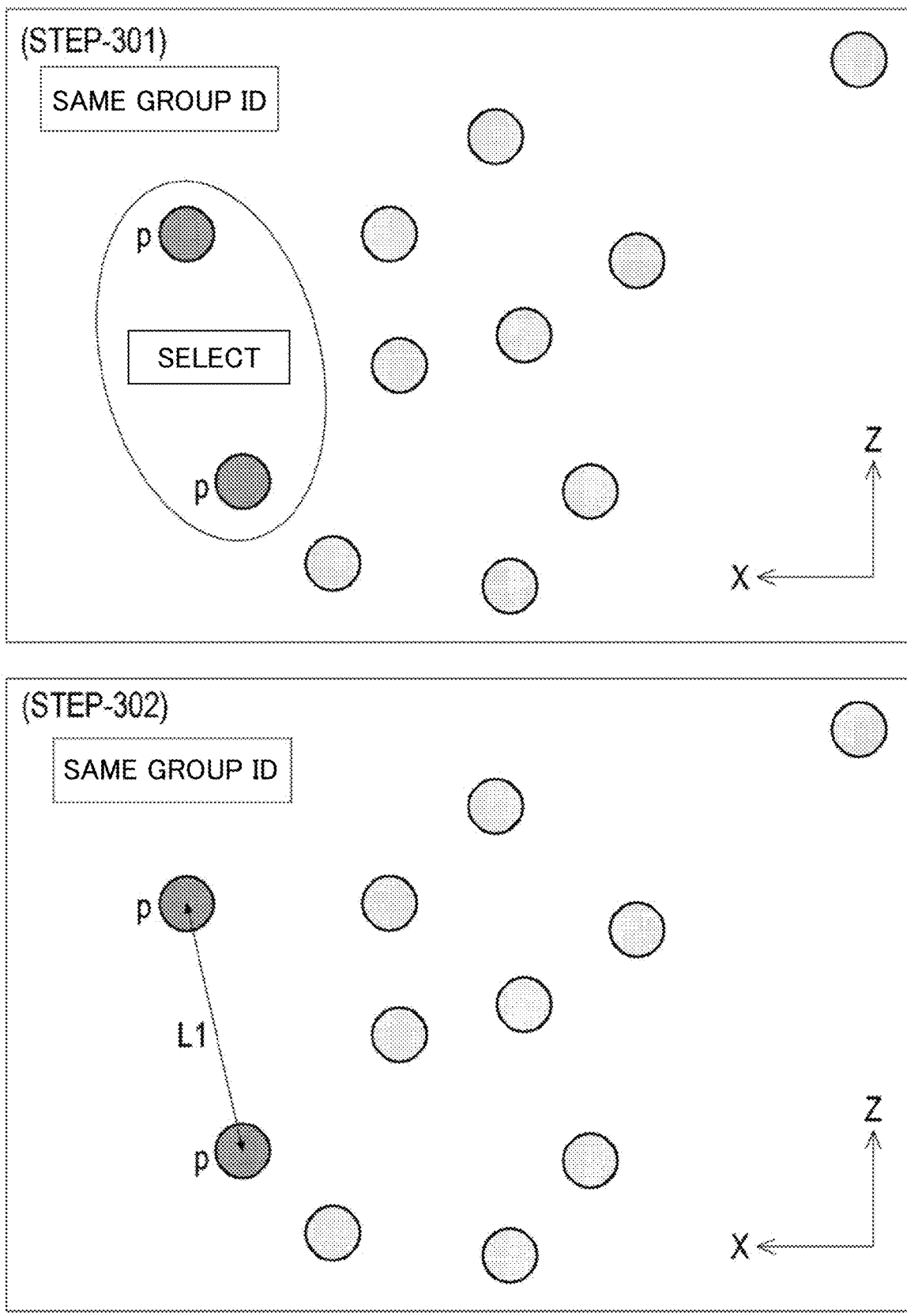
Figure 20:
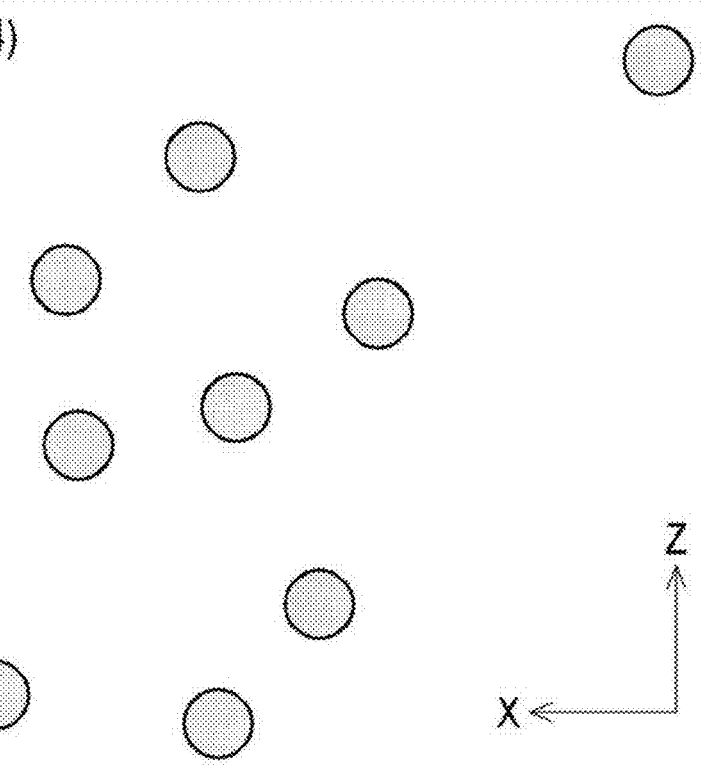
Figure 20:
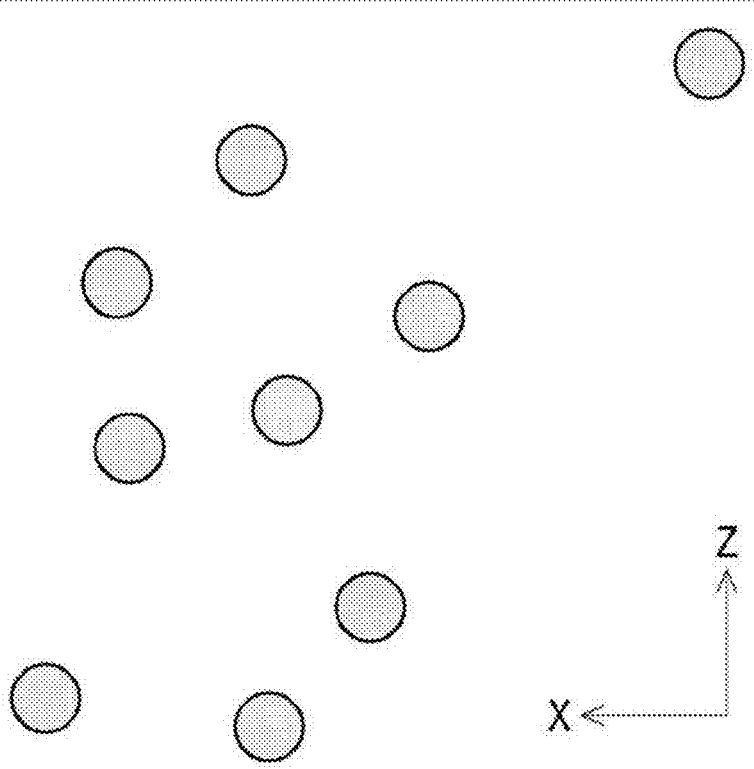
Figure 21:
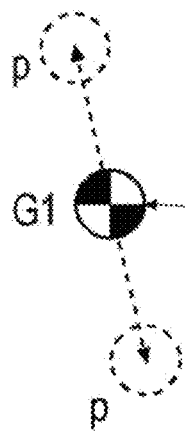
Figure 21:
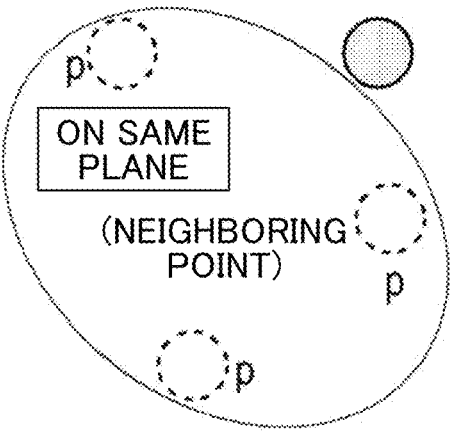
Figure 22:
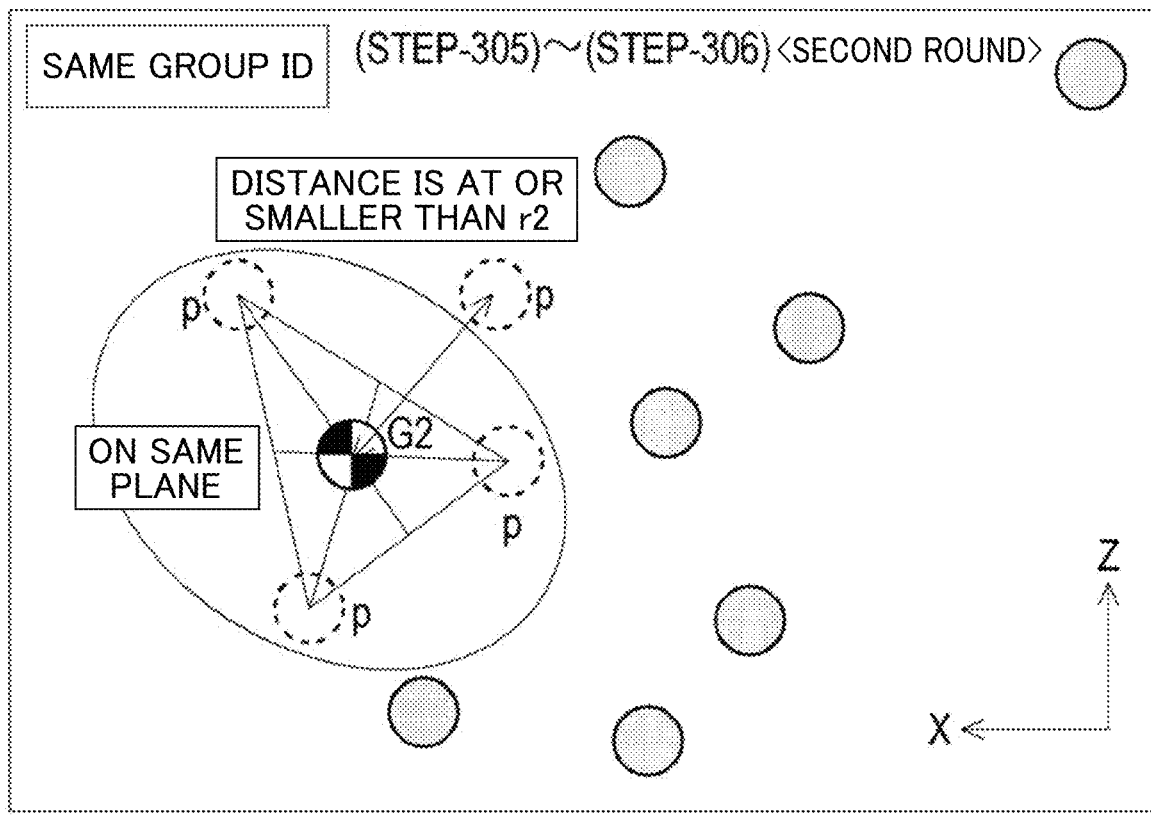
Figure 22:
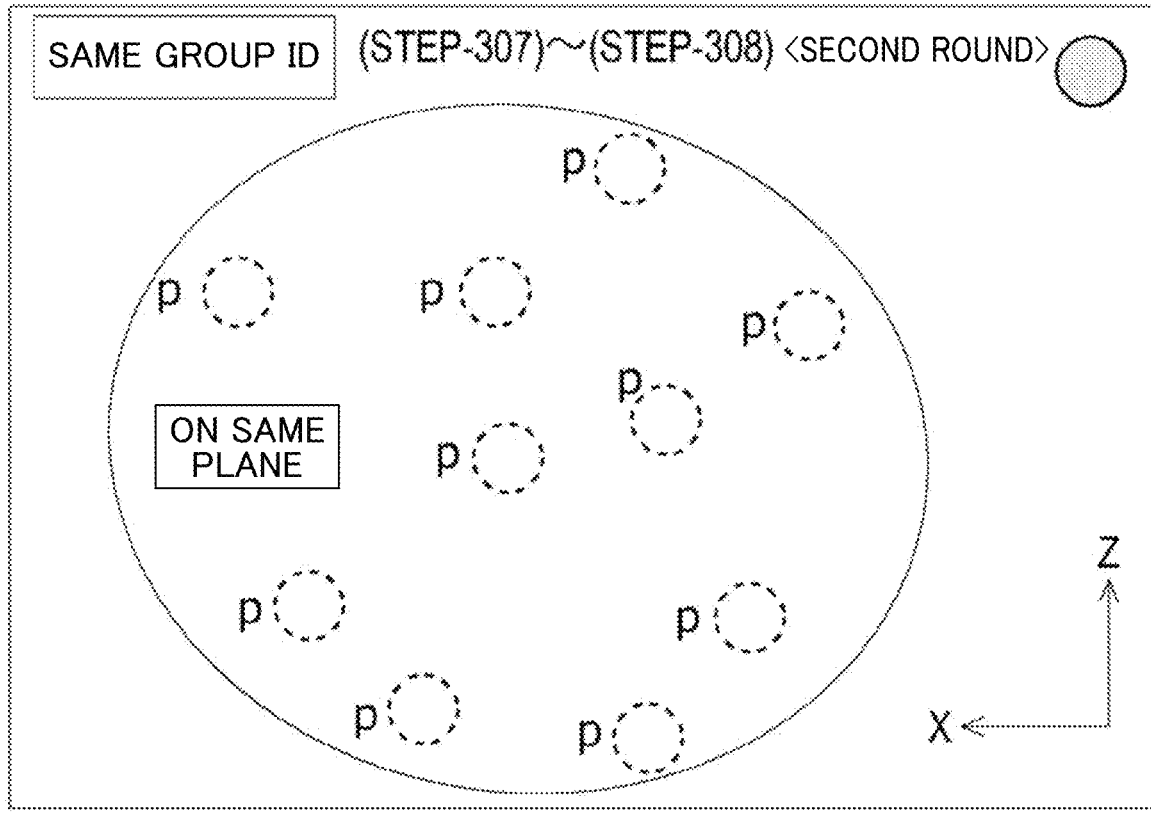
Figure 23:
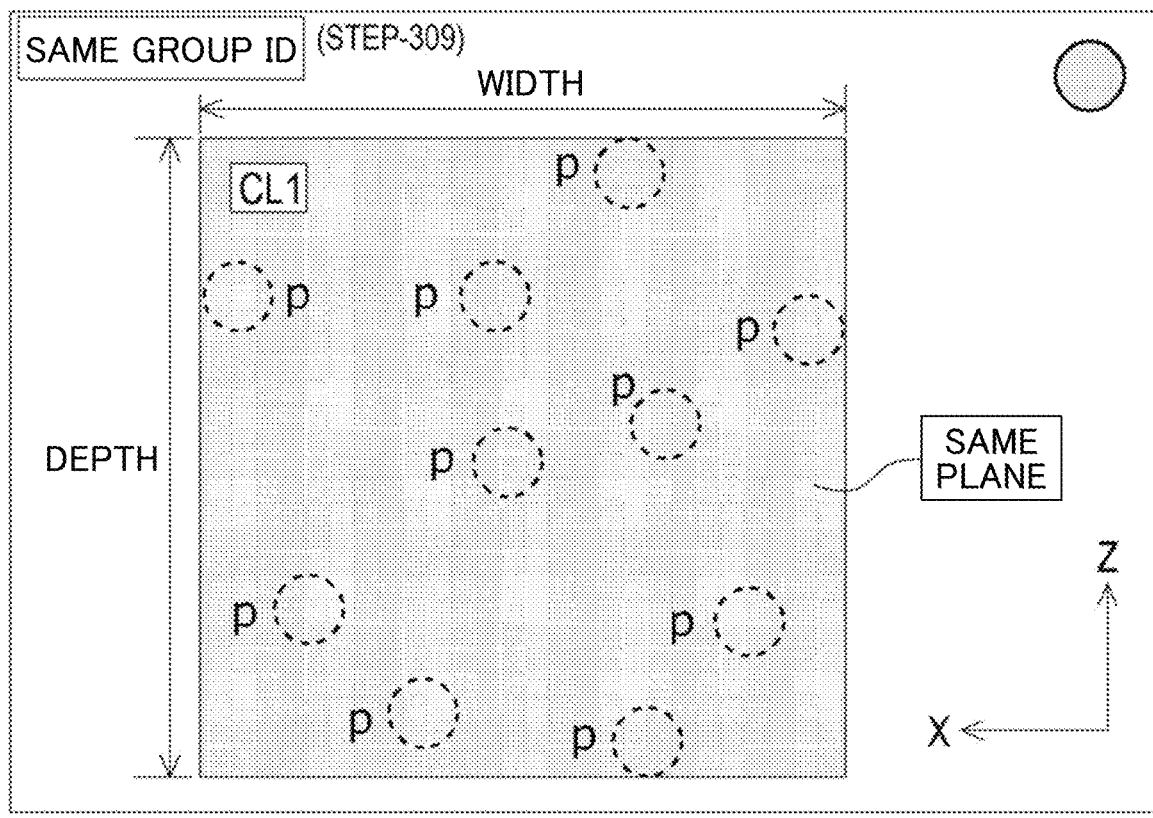
Figure 24:
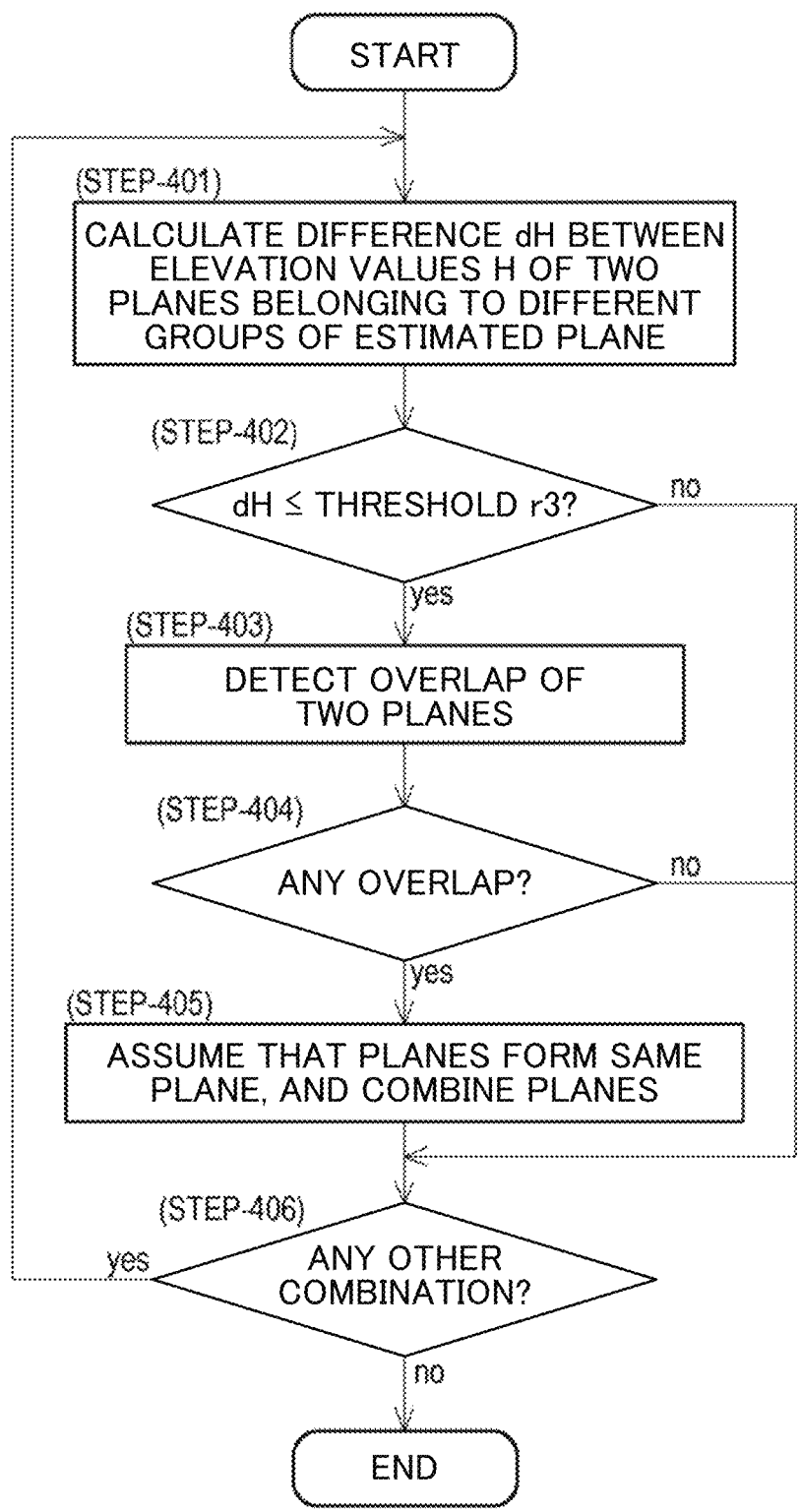
Figure 25:
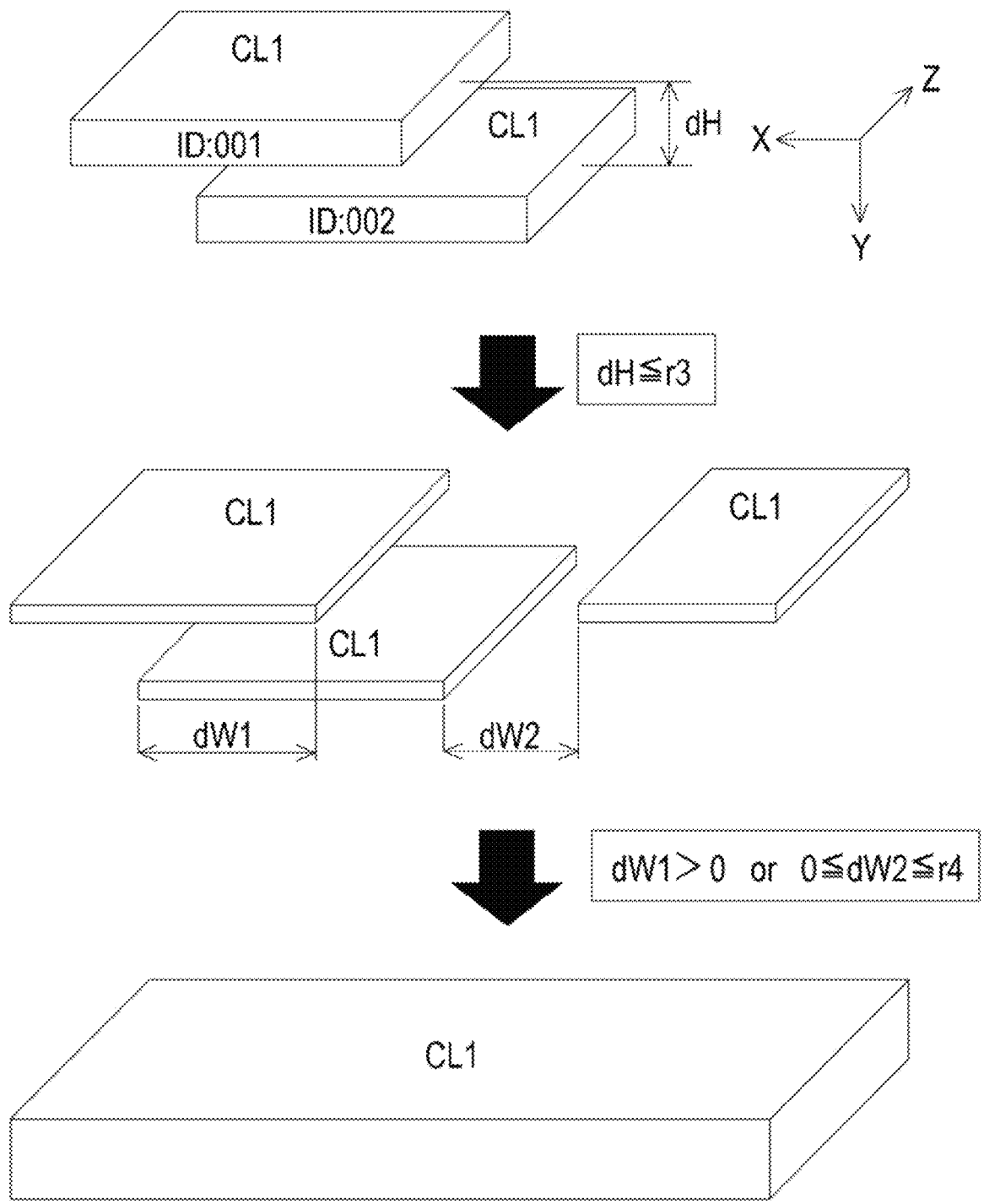
Figure 26:
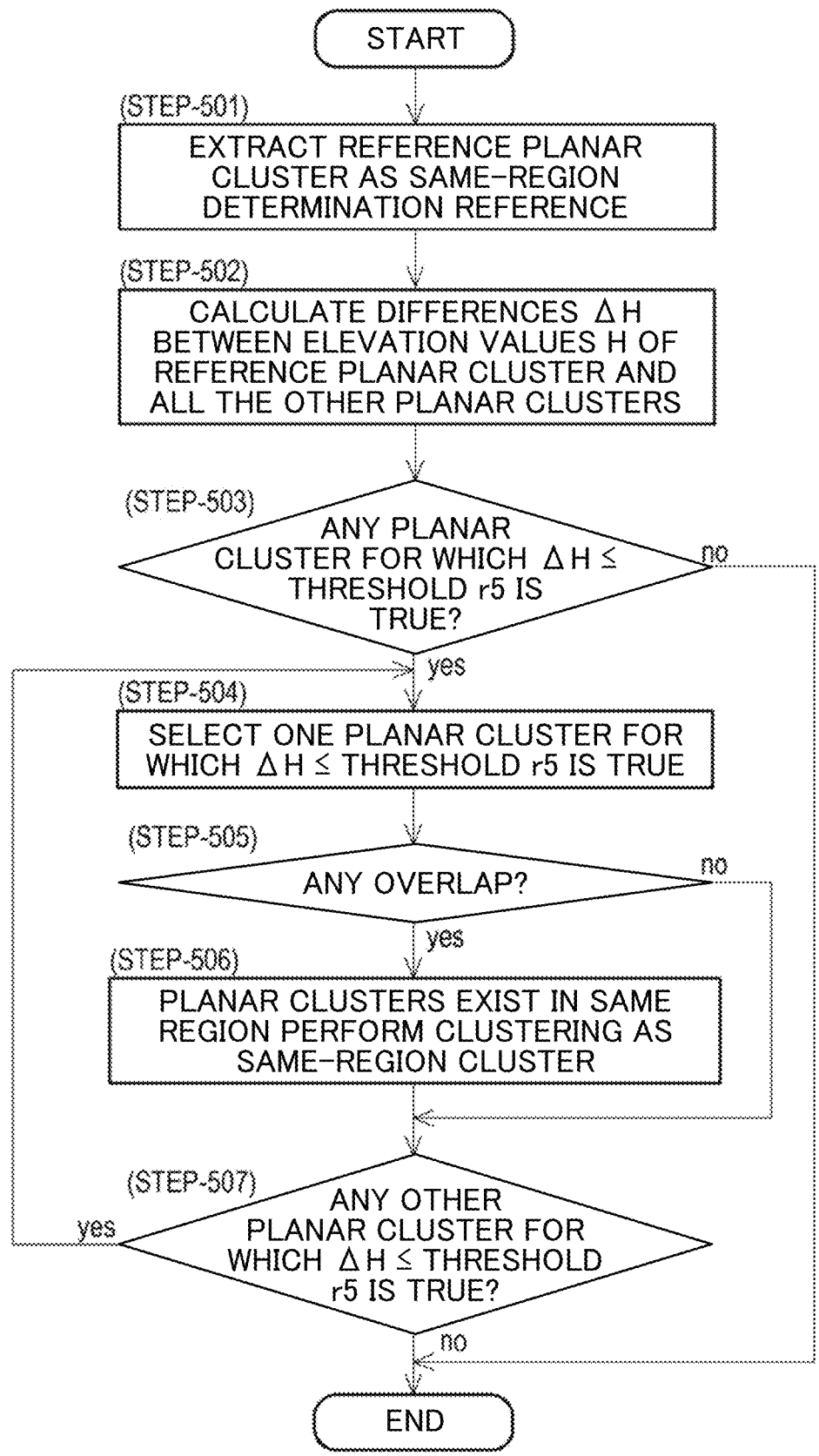
Figure 27:
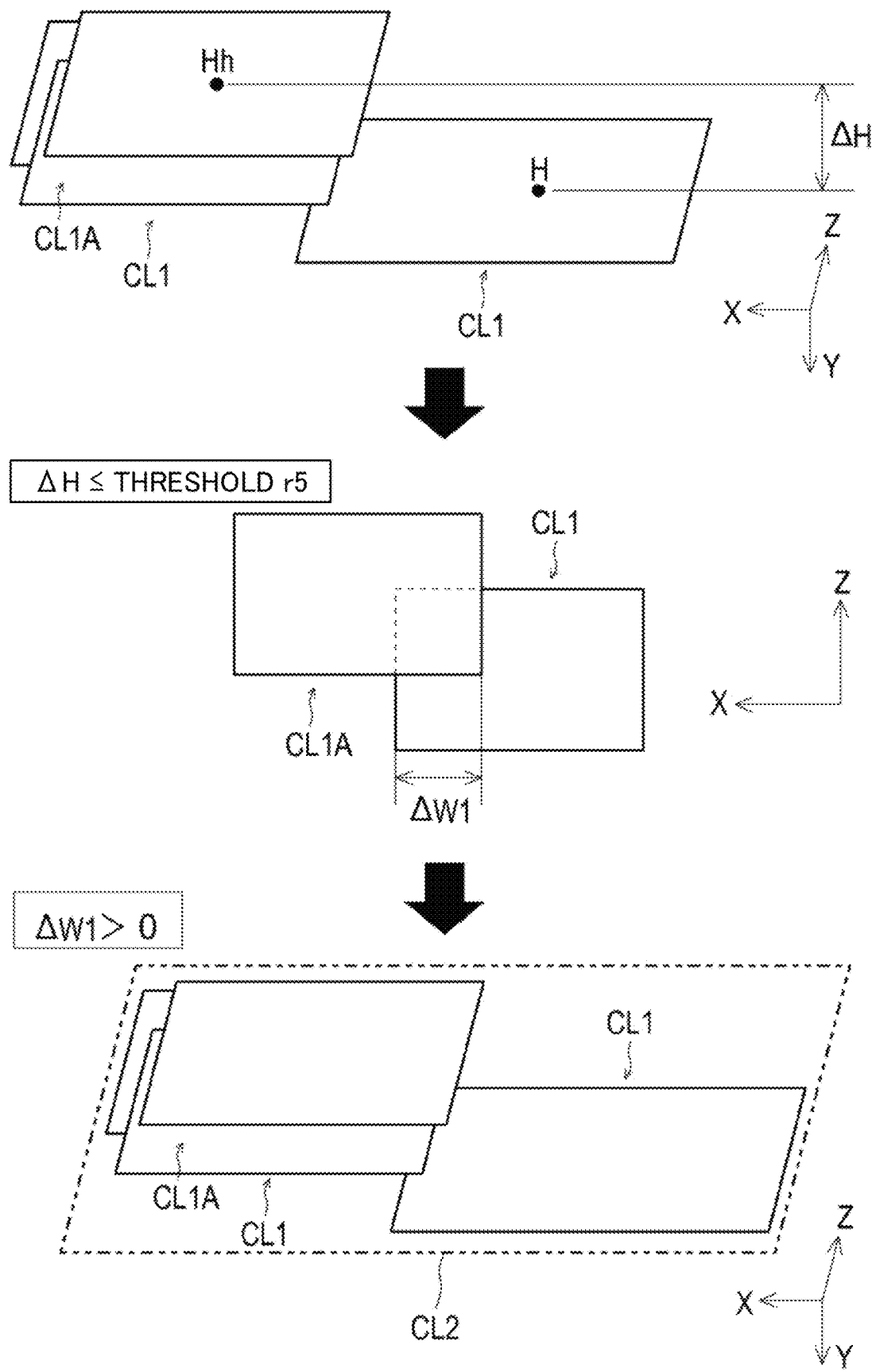
Figure 28:
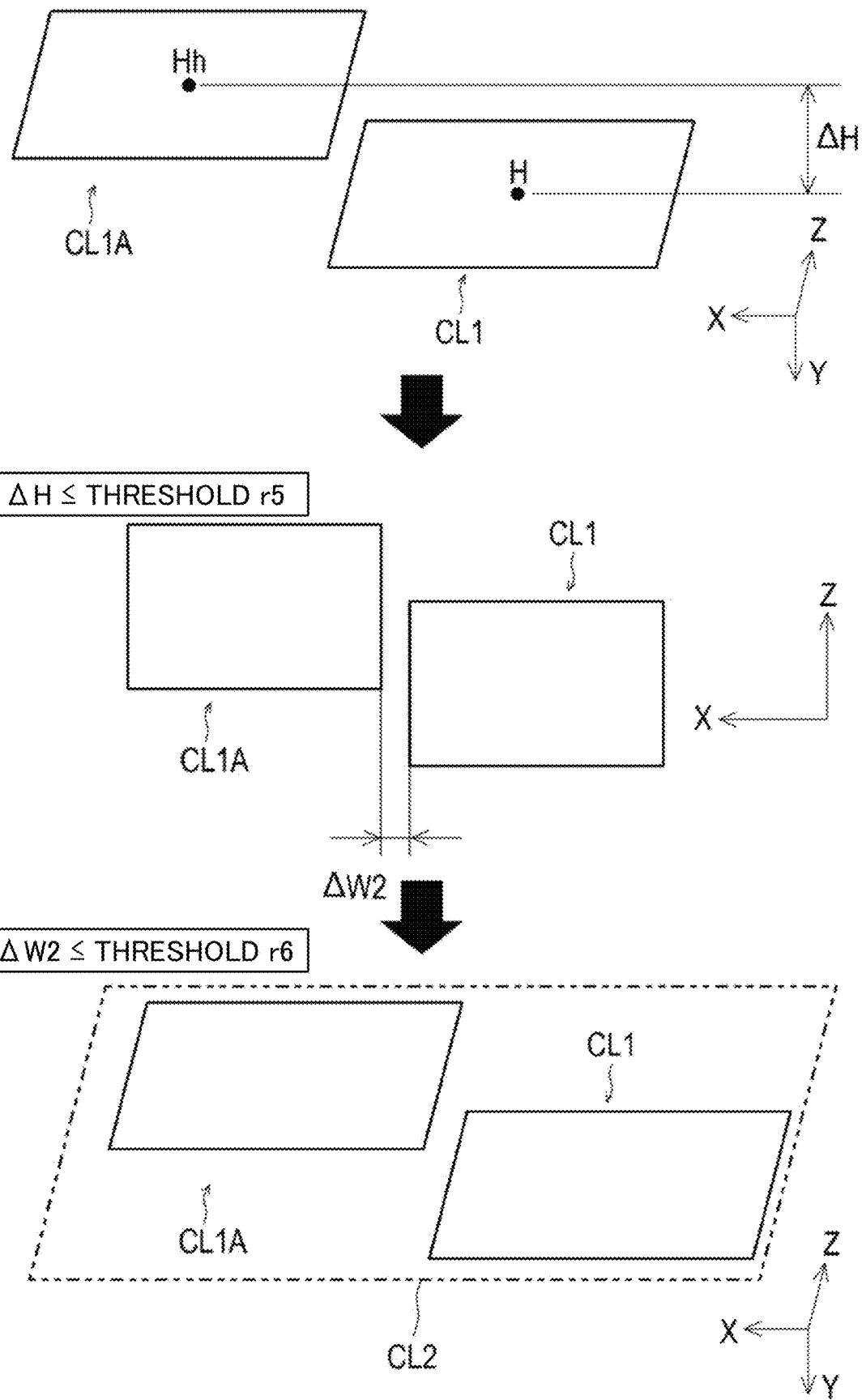
Figure 29A:
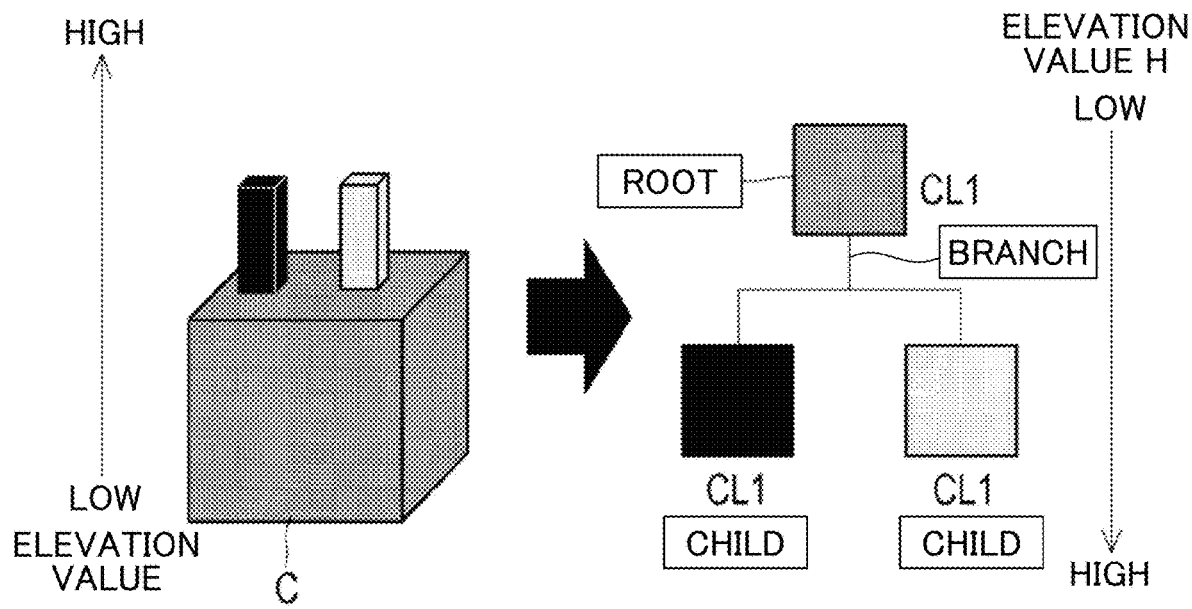
Figure 29B:
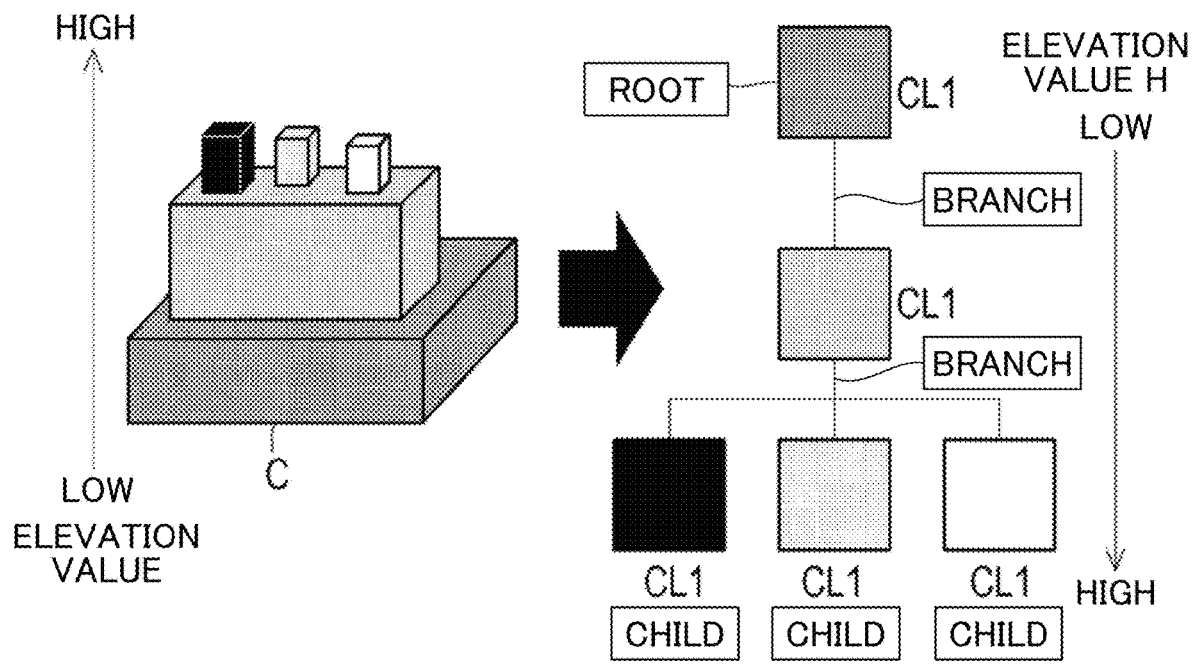
Figure 30:
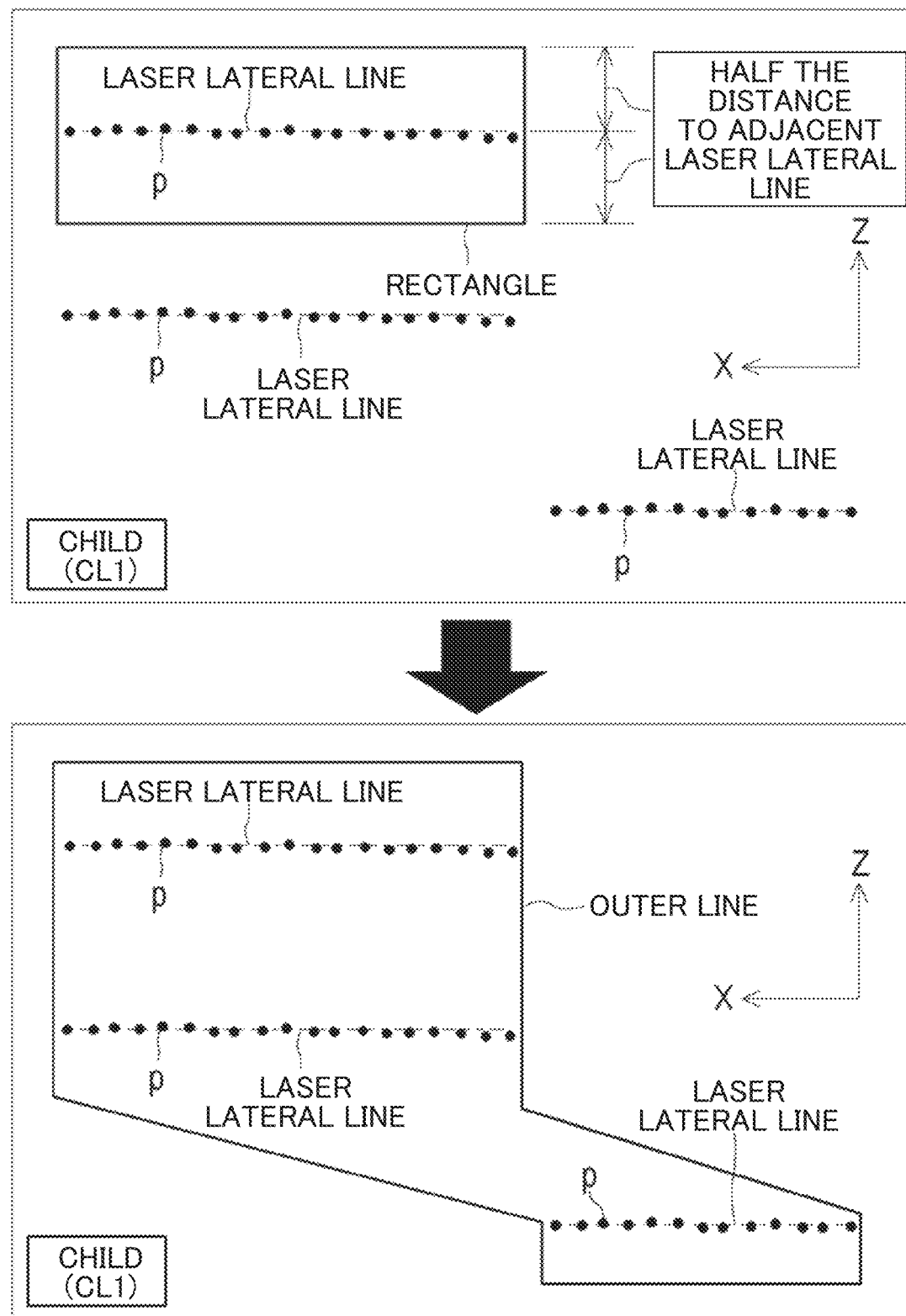
Figure 31A:
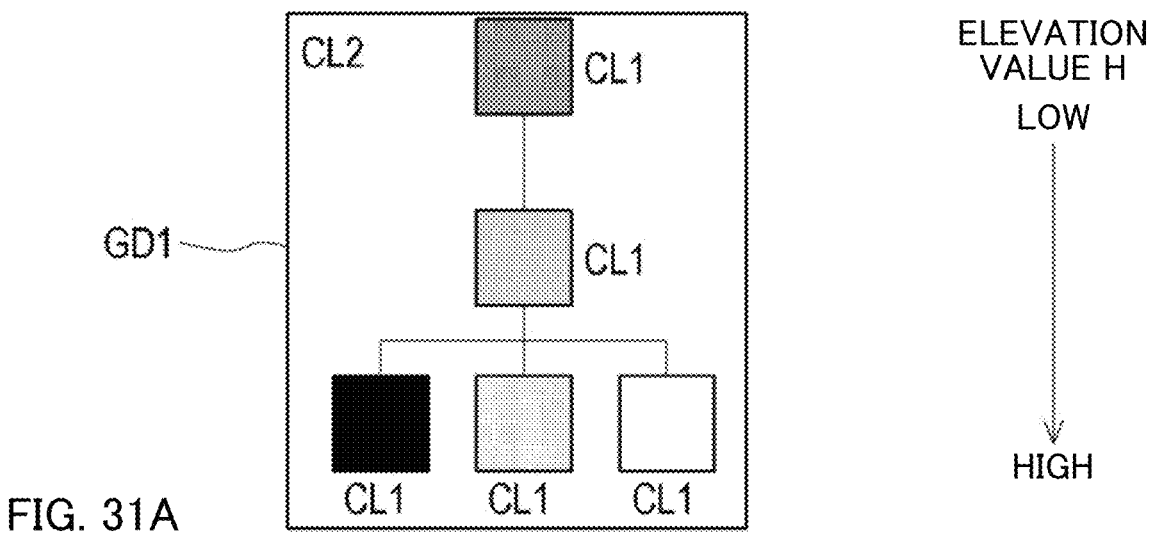
Figure 31B:
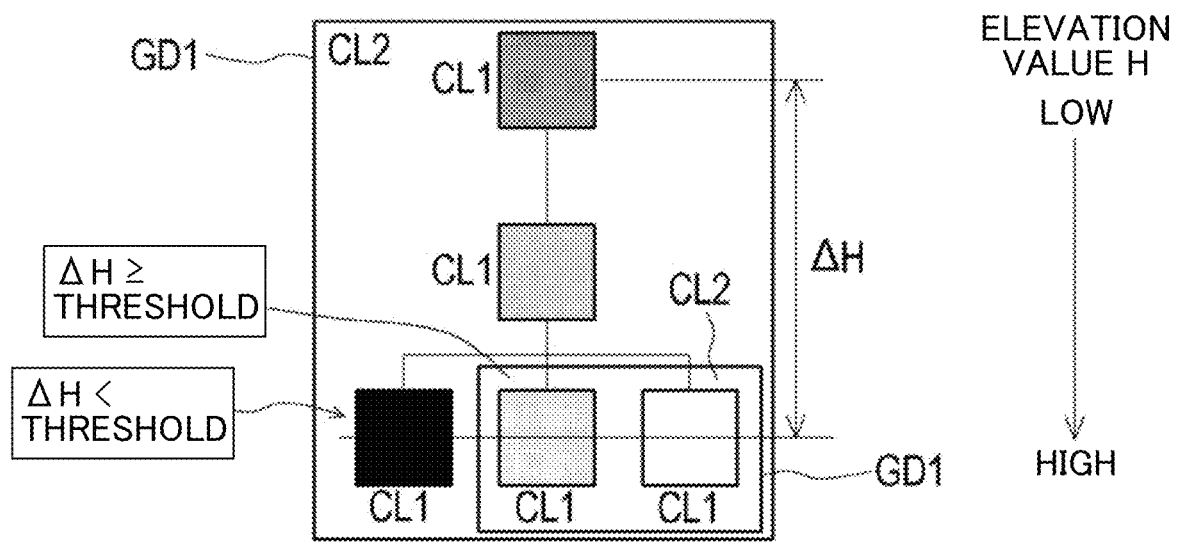
Figure 31C:
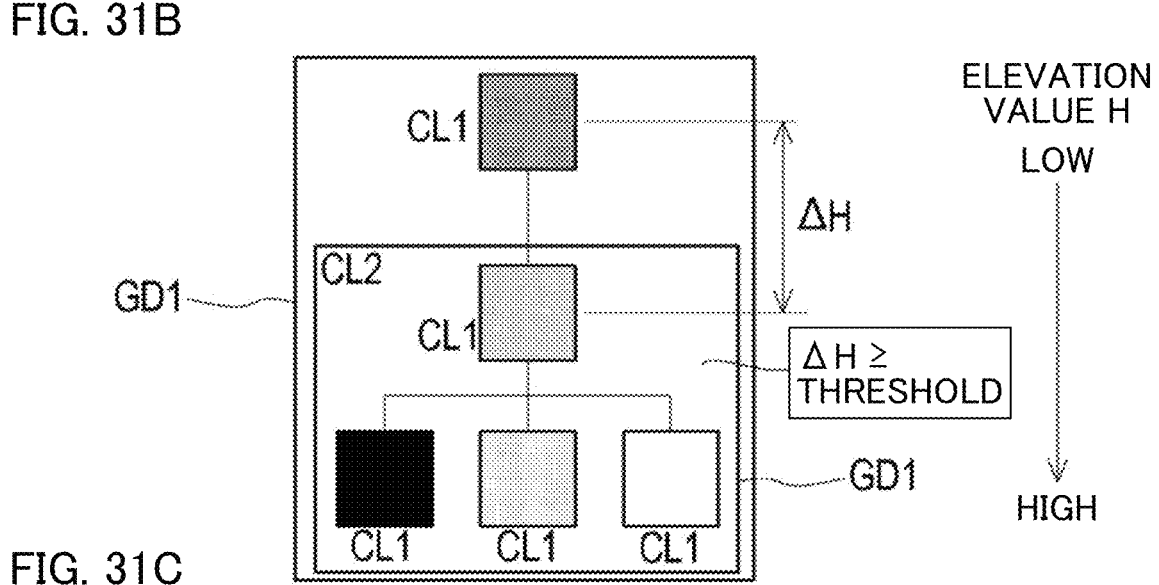
Figure 32:
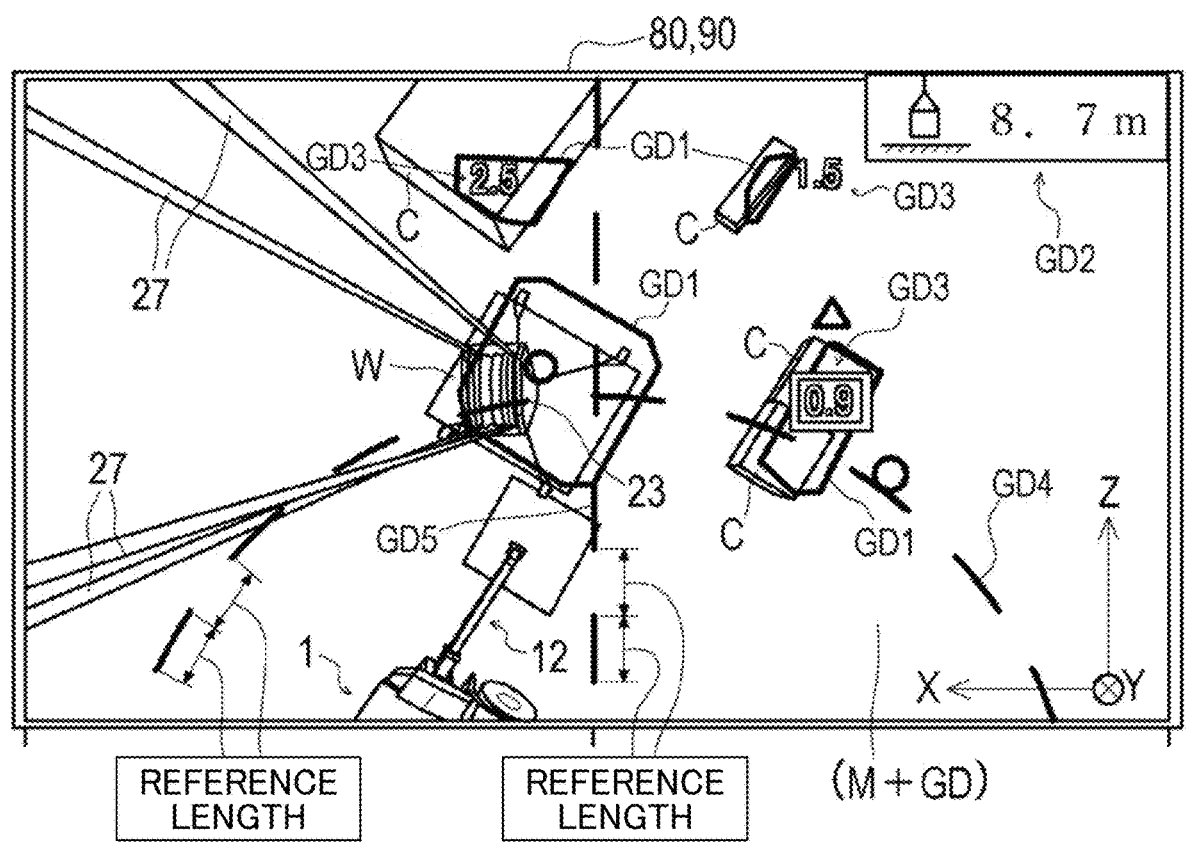
Figure 33:
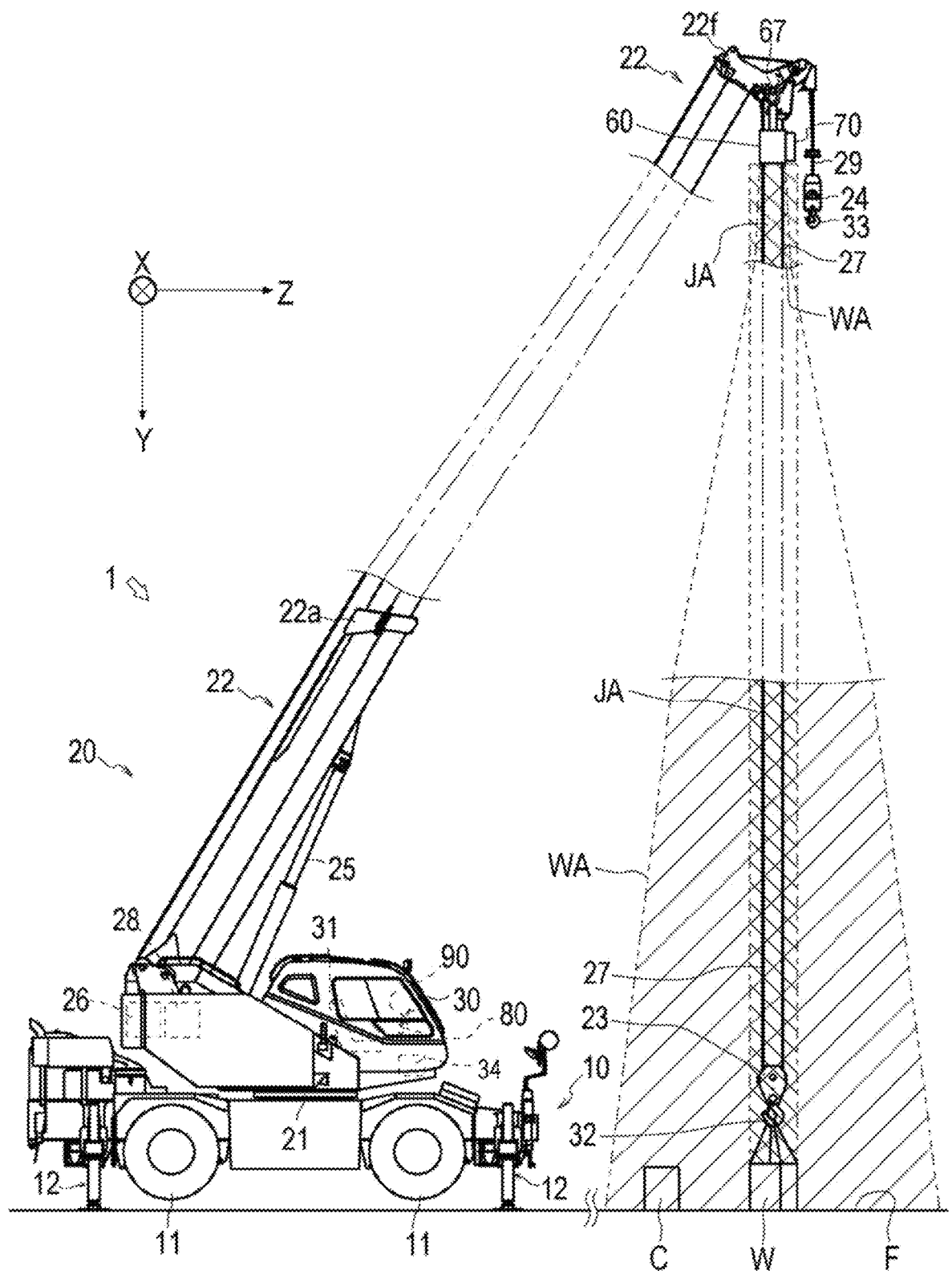

FIGS. 9A and 9B are schematic diagrams illustrating different configurations of the guide information display apparatus, where FIG. 9A illustrates a case where a data processing section, the data display section and a data input section are configured by a tablet PC, and FIG. 9B illustrates a case where the data display section and the data input section are configured by a touch panel display apparatus;

FIG. 10 is a schematic diagram illustrating a relationship between the suspended load region and laser lateral lines;

FIG. 11 is a schematic diagram along the Z-axis direction for describing the radiation state of laser by the laser scanner;

FIG. 12 is a flow diagram illustrating a flow of data processing by the data processing section;

FIGS. 13A and 13B are diagrams illustrating point cloud data acquired by the data acquisition section, where FIG. 13A is a diagram illustrating the point cloud data plotted in an XYZ coordinate system, and FIG. 13B is a diagram illustrating the point cloud data plotted in the XYZ coordinate system being grouped into a plurality of groups;

FIG. 14 is a flow diagram of a ground surface estimation method;

FIGS. 15A and 15B are explanatory diagrams of a calculation method of a reference height at a time of specification of a ground surface, where FIG. 15A is a diagram illustrating the calculation method of the reference height, and FIG. 15B is a schematic diagram illustrating a divided state of the suspended load region;

FIG. 16 is a schematic diagram illustrating a specified state of a ground surface by an operator;

FIG. 17 is an explanatory diagram of a creation method of a planar cluster;

FIG. 18 is a flow diagram illustrating a plane estimation process;

FIG. 19 is an explanatory diagram of the plane estimation process (STEPS-301 and 302);

FIG. 20 is an explanatory diagram of the plane estimation process (STEPS-303 to 305);

FIG. 21 is an explanatory diagram of the plane estimation process (STEPS-306 to 308);

FIG. 22 is an explanatory diagram of the plane estimation process (STEPS-306 to 308 (2nd round));

FIG. 23 is an explanatory diagram of the plane estimation process (a top surface estimated state);

FIG. 24 is a flow diagram of a combining method of planes belonging to different groups;

FIG. 25 is an explanatory diagram of the combining method of planes belonging to different groups;

FIG. 26 is a flow diagram of a clustering method for a same region;

FIG. 27 is an explanatory diagram of a clustering process for a same region;

FIG. 28 is an explanatory diagram of the clustering process for a same region;

FIGS. 29A and 29B are explanatory diagrams of hierarchical clustering, where FIG. 29A illustrates a case of a grounded object of a first example, and FIG. 29B illustrates a case of a grounded object of a second example;

FIG. 30 is an explanatory diagram of a creation process of a guide frame;

FIGS. 31A to 31C are diagrams illustrating example setting of a same-region cluster in hierarchical clustering, where FIG. 31A illustrates a case of an all-enclosing same-region cluster, FIG. 31B illustrates a case where a planar cluster with a greatest elevation value is set as a different same-region cluster, and FIG. 31C illustrates a case where a different same-region cluster is set, the same-region cluster including all of planar clusters for which a difference in the elevation value is equal to or greater than a threshold;

FIG. 32 is a schematic diagram illustrating an alarm display on the data display section; and FIG. 33 is an explanatory diagram of a set state of an excluded region.

DESCRIPTION OF EMBODIMENTS

Next, an embodiment of the invention will be described.

Figure 1:
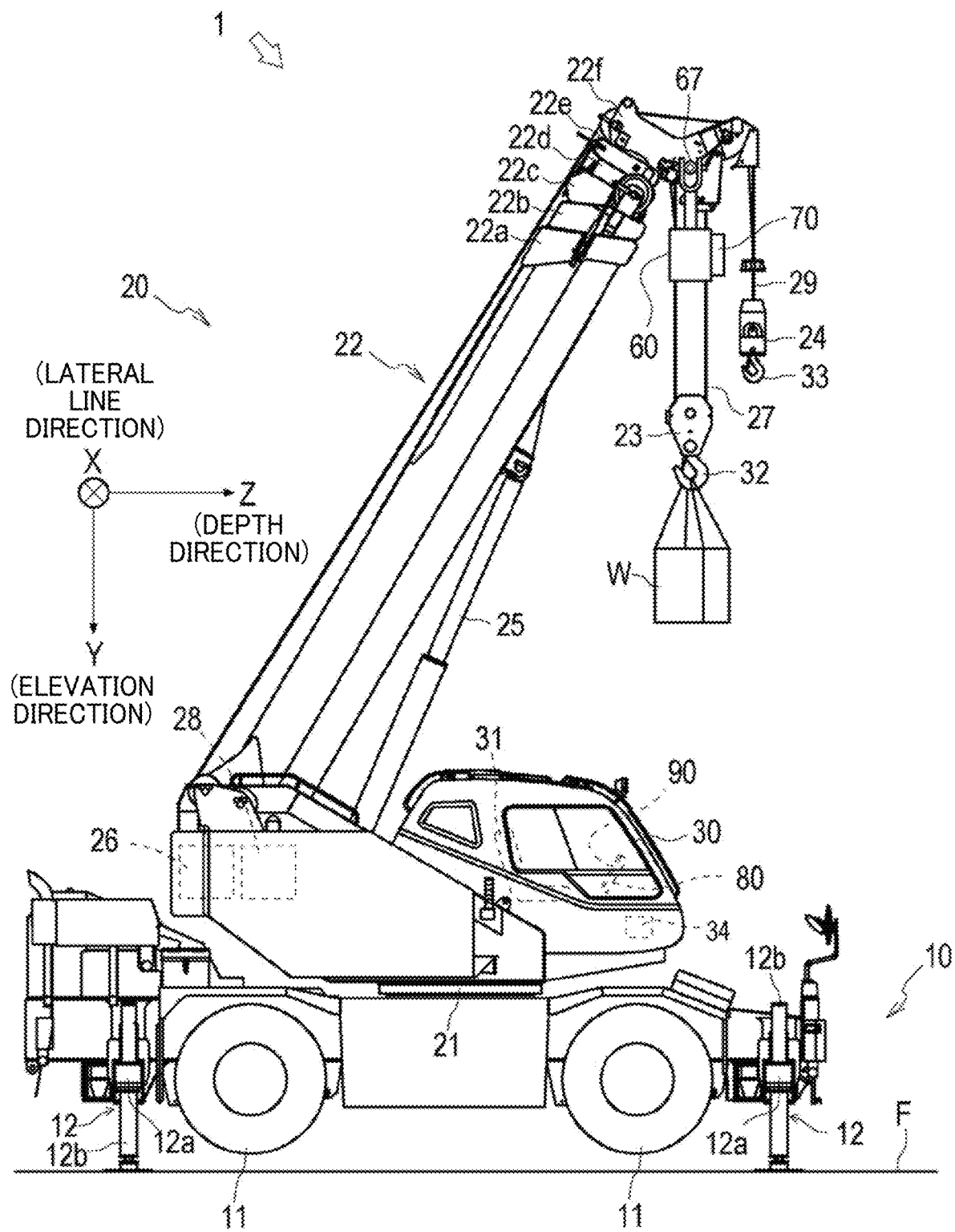
FIG. 1 is a schematic diagram illustrating an overall configuration of a crane according to an embodiment of the present invention.

As illustrated in FIG. 1, crane 1 is an example of a crane including a guide information display apparatus according to an embodiment of the present invention, and is a mobile crane that can be moved to a desired location.

Crane 1 includes traveling vehicle 10 and crane apparatus 20.

Traveling vehicle 10 is for transferring crane apparatus 20, and includes a plurality of wheels 11 (four, in the present embodiment), and performs traveling using an engine (not illustrated) as a power source.

Outrigger 12 is provided at four corners of traveling vehicle 10. Outrigger 12 is structured from overhang beam 12a that can be extended, by hydraulic pressure, to both sides in a width direction of traveling vehicle 10, and hydraulic jack cylinder 12b that can be extended in a direction perpendicular to the ground. Traveling vehicle 10 may place crane 1 in a workable state by grounding jack cylinder 12b, and may increase a workable range (a working radius) of crane 1 by increasing an extension length of overhang beam 12a.

Crane apparatus 20 lifts suspended load W with a wire rope, and includes swivel base 21, telescopic boom 22, main hook block 23, sub-hook block 24, tufting cylinder 25, main winch 26, main wire rope 27, sub-winch 28, sub-wire rope 29, and cabin 30.

Swivel base 21 enables crane apparatus 20 to swivel around, and is provided on a frame of traveling vehicle 10 through an annular bearing. The annular bearing is disposed with a rotation center being perpendicular to an installation surface of traveling vehicle 10. Swivel base 21 is capable of rotating in one direction and the other direction with a center of the annular bearing as a rotation center. Furthermore, swivel base 21 is rotated by a hydraulic rotation motor (not illustrated).

Telescopic boom 22 supports a wire rope such that suspended load W can be lifted. Telescopic boom 22 is made up of a plurality of boom members including base boom member 22a, second boom member 22b, third boom member 22c, fourth boom member 22d, fifth boom member 22e, and top boom member 22f. The boom members are inserted in a nested structure in the order of the size of cross-sectional area. Telescopic boom 22 may be freely extended and retracted in an axial direction by moving each boom member by a telescopic cylinder not illustrated. A base end of base boom member 22a of telescopic boom 22 is provided on swivel base 21 in a swingable manner. Telescopic boom 22 is thus horizontally rotatable and also swingable on the frame of traveling vehicle 10.

Main hook block 23 is where suspended load W is hooked and suspended, and main hook block 23 includes a plurality of hook sheaves around which main wire rope 27 is wound, and main hook 32 where suspended load W is suspended.

In addition to main hook block 23, crane apparatus 20 further includes sub-hook block 24 where suspended load W is hooked and suspended, and sub-hook block 24 includes sub-hook 33 where suspended load W is suspended, Luffing cylinder 25 maintains a posture of telescopic boom 22 by raising or luffing down telescopic boom 22. Luffing cylinder 25 is a hydraulic cylinder including a cylinder portion and a rod portion.

Main winch 26 draws in (winds up) or draws out (winds down) main wire rope 27, and is a hydraulic winch in the present embodiment.

Main winch 26 is configured such that a main drum around which main wire rope 27 is wound is rotated by a main hydraulic motor. Main winch 26 draws out main wire rope 27 that is wound around the main drum, by hydraulic oil being supplied such that the main hydraulic motor rotates in one direction, and draws in main wire rope 27 by winding main wire rope 27 around the main drum, by hydraulic oil being supplied such that the main hydraulic motor rotates in the other direction.

Furthermore, sub-winch 28 draws in or draws out sub-wire rope 29, and is a hydraulic winch in the present embodiment.

Cabin 30 covers a driver's seat 31 where an operator is to be seated, and is provided on swivel base 21, beside telescopic boom 22.

Crane 1 configured as described above may move crane apparatus 20 to an arbitrary location by causing traveling vehicle 10 to travel, and may also extend telescopic boom 22 to an arbitrary telescopic boom length by raising telescopic boom 22 to an arbitrary luff-up angle by lulling cylinder 25.

Moreover, crane 1 includes controller 34 that controls operation of swivel base 21, telescopic boom 22, luffing cylinder 25 and the like (or in other words, operation of crane 1). Controller 34 is capable of externally outputting information about operation states of swivel base 21, telescopic boom 22, luffing cylinder 25 and the like, information about performance unique to crane 1, a weight of suspended load W, and the like.

Additionally, in the present description, an XYZ coordinate system as illustrated in FIG. 1 is defined taking an axial direction of a luff-up support of telescopic boom 22 as a reference (the same applies in the following description).

Figure 2:
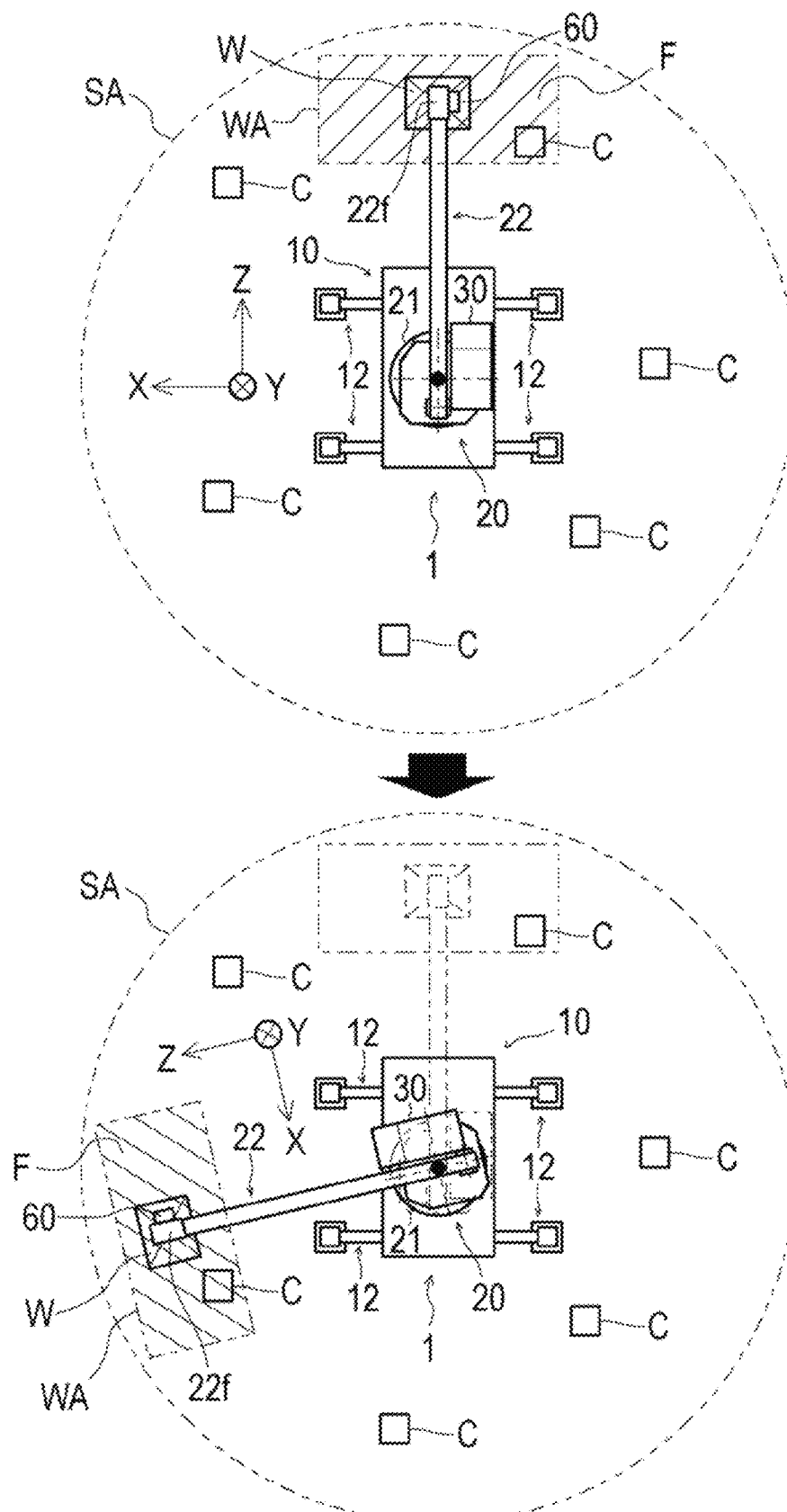
FIG. 2 is a schematic plan view for describing a suspended load region.

An X-axis direction (also referred to as a lateral line direction) is a horizontal direction that is parallel to the axial direction of the luff-up support of telescopic boom 22. A Y-axis direction (also referred to as an elevation direction) is a vertical direction. A Z-axis direction (also referred to as a depth direction) is a horizontal direction that is perpendicular to the axial direction of the luff-up support of telescopic boom 22. That is, the XYZ coordinate system is defined as a local coordinate system relative to telescopic boom 22, as illustrated in FIG. 2.

Next, a guide information display apparatus according to an embodiment of the presentation will be described.

Figure 3:
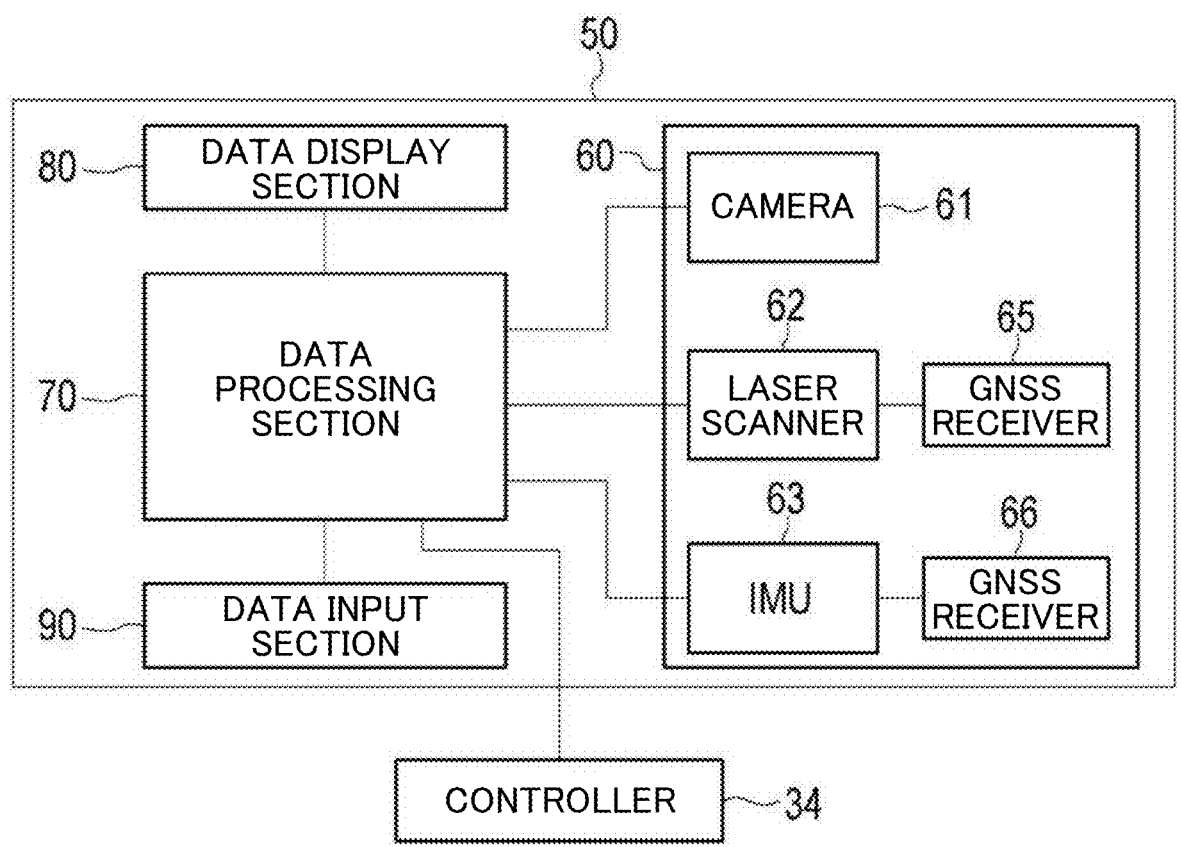
FIG. 3 is a schematic diagram illustrating an overall configuration of a guide information display apparatus according to an embodiment of the present invention.

Crane 1 includes guide information display apparatus 50 as illustrated in FIG. 3.

Guide information display apparatus 50 is an example of a guide information display apparatus according to the present invention, and is an apparatus that displays information (hereinafter, referred to as "guide information") about a region including suspended load W (hereinafter, referred to as "suspended load region WA") as an image and presents the same to an operator, such that work by crane 1 as illustrated in FIG. 1 may be efficiently and safely performed.

Figure 4:
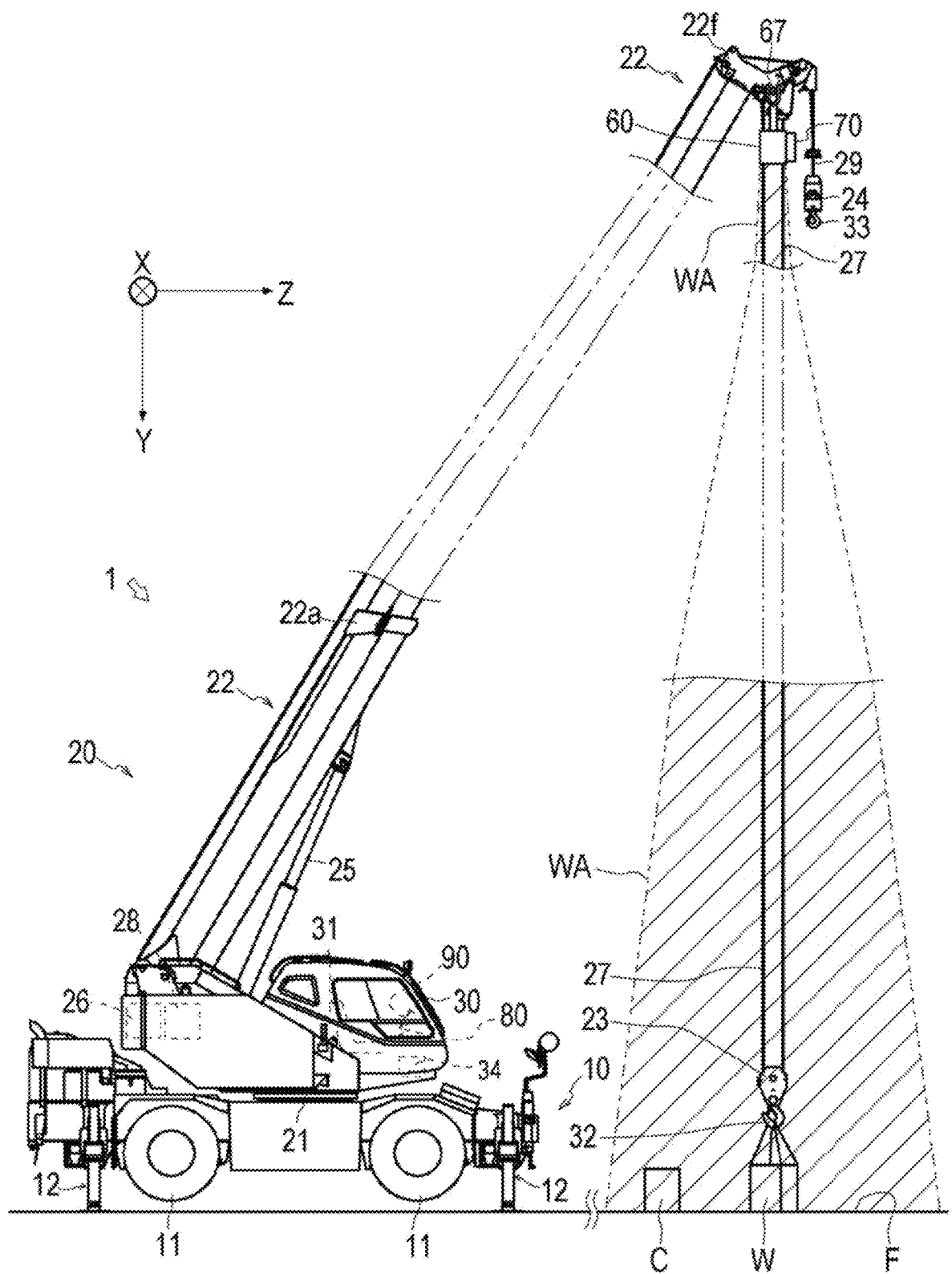
FIG. 4 is a schematic side view for describing the suspended load region.

As illustrated in FIGS. 2 and 4, "suspended load region WA" here is set as a region, in work area SA of crane 1, including suspended load W when viewed along the Y-axis direction, and is a region for which "guide information" is to be created.

"Suspended load region WA" is set as a region including a region directly below top boom member 22f of telescopic boom 22 of crane 1, and suspended load W, ground surface F, and grounded object C existing within suspended load region WA are made measurement target objects of guide information display apparatus 50. The position of "suspended load region WA" is changed according to a swiveling operation, a luff-up operation, or an extension/retraction operation of telescopic boom 22.

Furthermore, "guide information" here is information used to aid determination of an operator at the time of the operator conveying suspended load. W by crane 1, with respect to whether a length, a swivel position or a luff-up angle of telescopic boom 22, the amount of winding down of a wire rope, or the like is good or not, and includes image information about suspended load region WA, information about shapes of suspended load W and grounded object C, height information of suspended load W, height information of grounded object C, information about a traffic line of suspended load W, and the like.

As illustrated in FIGS. 3 and 4, guide information display apparatus 50 includes data acquisition section 60, data processing section 70, data display section 80, and data input section 90.

Data acquisition section 60 is a part that acquires data necessary to create the guide information of suspended load region WA, and includes camera 61, laser scanner 62, and inertial measurement unit (IMU) 63, as illustrated in FIG. 3.

As illustrated in FIG. 4, data acquisition section 60 is attached to top boom member 22f positioned at a distal end of telescopic boom 22 of crane 1, and is disposed in such a manner that a situation directly below can be captured from a boom distal end positioned directly above suspended load W. Additionally, "directly above" suspended load W is a concept including a position that is vertically above suspended load W and a position of a specific range relative to such a position (such as a range of a top surface of suspended load W).

Data acquisition section 60 is attached to top boom member 22f at a distal end portion of telescopic boom 22 through gimbal 67 (see FIG. 1), and is configured such that an attitude of data acquisition section 60 (an attitude along the Y-axis direction) may be maintained substantially constant at the time of the luff-up operation, the swiveling operation, or the extension/retraction operation of telescopic boom 22. Camera 61 and laser scanner 62 may thereby constantly face suspended load W. Accordingly, data acquisition section 60 may constantly acquire data by camera 61 and laser scanner 62, from suspended load W and ground surface F below suspended load W (that is, suspended load region WA). Furthermore, in the case where grounded object C exists in suspended load region WA, data about grounded object C may be acquired by camera 61 and laser scanner 62.

Figure 5A:
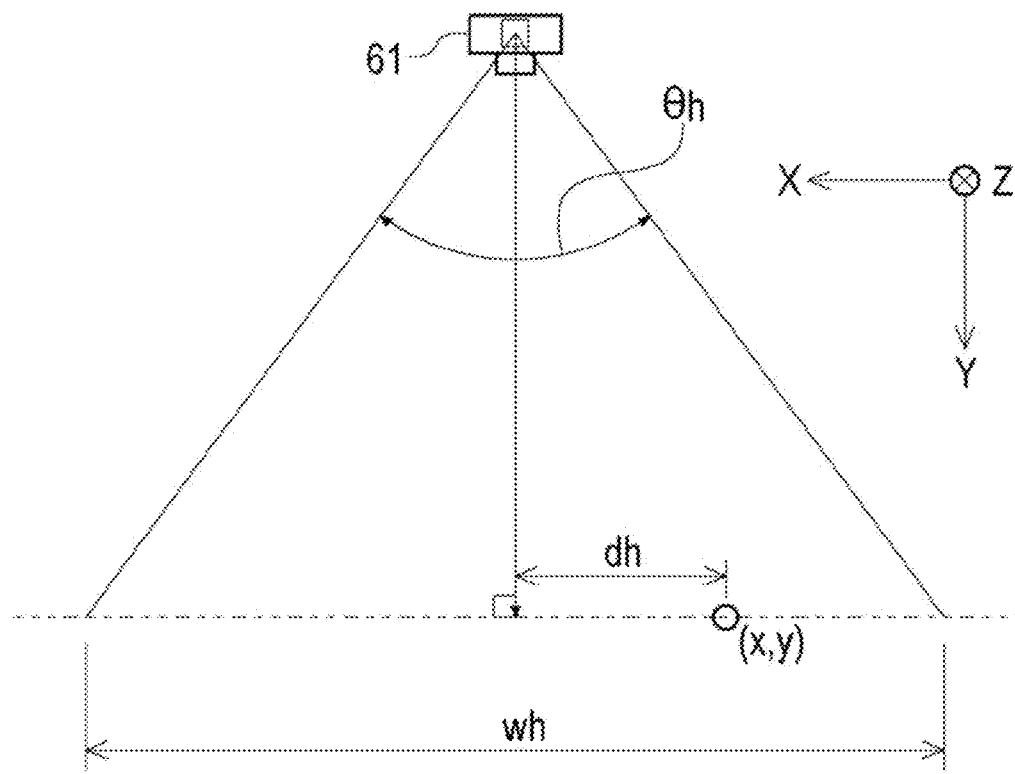
FIGS. 5A and 5B are explanatory diagrams of a camera spatial coordinate system and a viewing angle of a camera, where
Figure 5B:
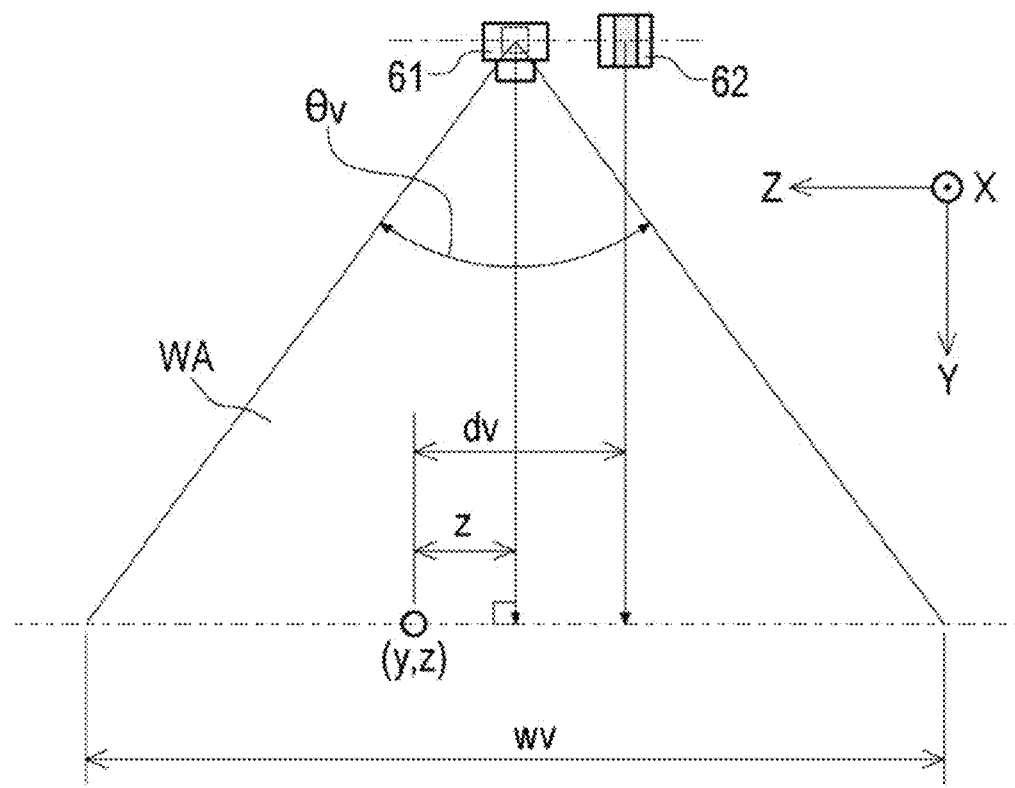

As illustrated in FIGS. 5A and 5B, camera 61 is a digital video camera for capturing video of suspended load region WA, and includes a function of externally outputting, in real time, video that is captured. Camera 61 has viewing angles (horizontal viewing angle θh and vertical viewing angle θv) as illustrated in FIGS. 5A and 5B. Furthermore, the number of pixels, a frame rate and an image transfer rate of camera 61 are such that the amount of data necessary to create appropriate guide information is taken into account.

As illustrated in FIG. 3, laser scanner 62 is an apparatus that radiates laser on a measurement target object and receives reflected light of the laser from the measurement target object to thereby acquire information about a reflection point and to acquire point cloud data of the measurement target object. The measurement target objects of laser scanner 62 are suspended load W, grounded object C, and ground surface F. Moreover, first GNSS receiver 65 that acquires a measurement time is connected to laser scanner 62.

Guide information display apparatus 50 acquires planar three-dimensional point cloud data in real time by laser scanner 62.

Figure 6A:
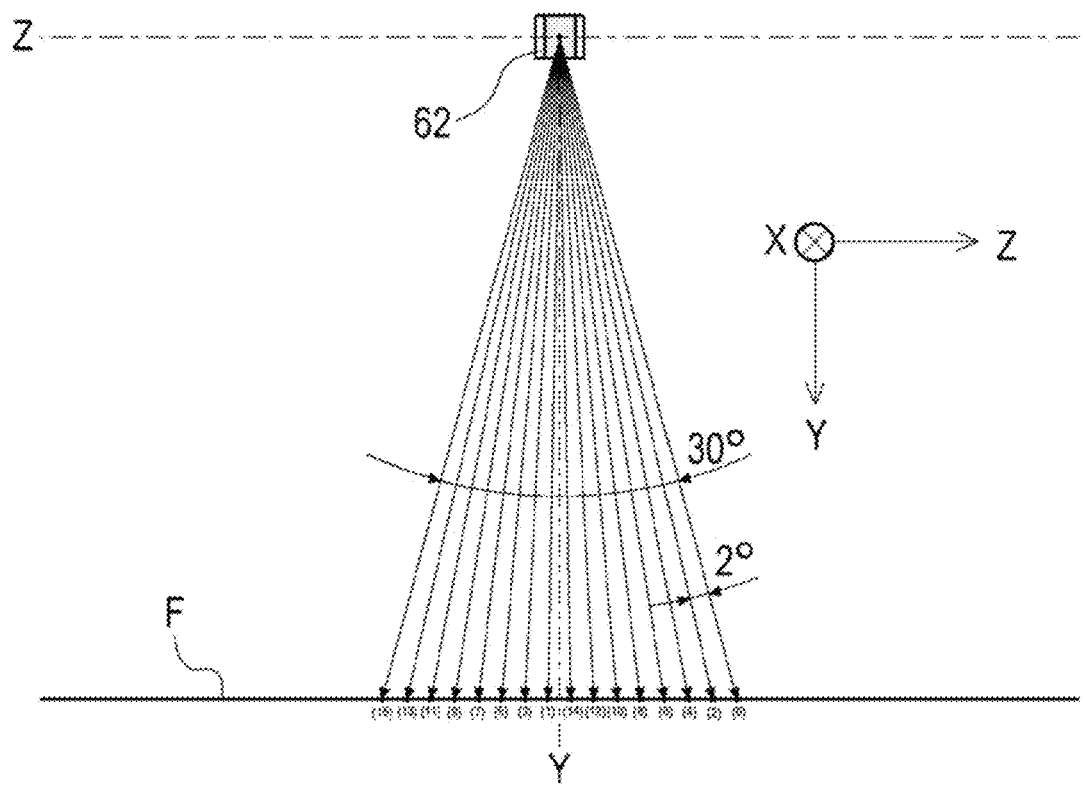
FIGS. 6A and 6B are explanatory diagrams of a radiation state of laser by a laser scanner, where
Figure 6B:
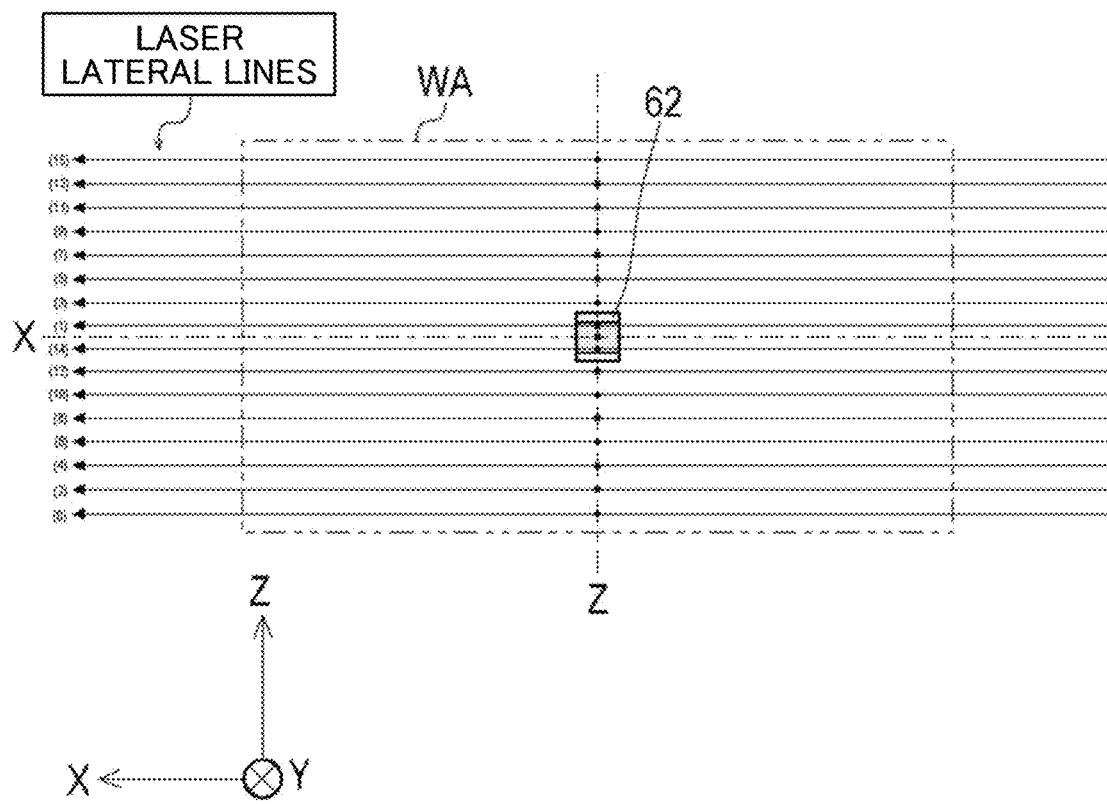

As illustrated in FIGS. 6A and 6B, laser scanner 62 includes a total of 16 laser transmitter/receiver sensors, and is capable of acquiring point cloud data of a measurement target object by simultaneously radiating 16 laser beams on the measurement target object. The 16 laser transmitter/receiver sensors of laser scanner 62 are arranged with radiation angles shifted by 2 degrees in the Z-axis direction, and are configured such that laser over a range of 30 degrees in total may be radiated on the measurement target object. Furthermore, each laser transmitter/receiver sensor of laser scanner 62 is capable of rotating 360 degrees (entire azimuth) around the Z-axis. Additionally, in the following description, a trajectory of laser that is radiated toward suspended load region WA will be referred to as a laser lateral line. The laser lateral line is parallel to the X-axis direction, and with laser scanner 62, 16 laser lateral lines are drawn at the same time.

Moreover, laser scanner 62 is disposed such that the laser lateral line becomes parallel to the X-axis direction. A reference axis of laser scanner 62 for changing the radiation angle of laser is parallel to the Z-axis direction.

As illustrated in FIG. 3, inertial measurement unit (hereinafter, referred to as "IMU") 63 is an apparatus that acquires attitude data of camera 61 and laser scanner 62 at the time of data acquisition. IMU 63 is capable of measuring an attitude angle in real time, and achieves a measurement accuracy allowing use in correction of point cloud data acquired by laser scanner 62. Moreover, second GNSS receiver 66 that acquires a measurement time is connected to IMU 63.

Figure 7A:
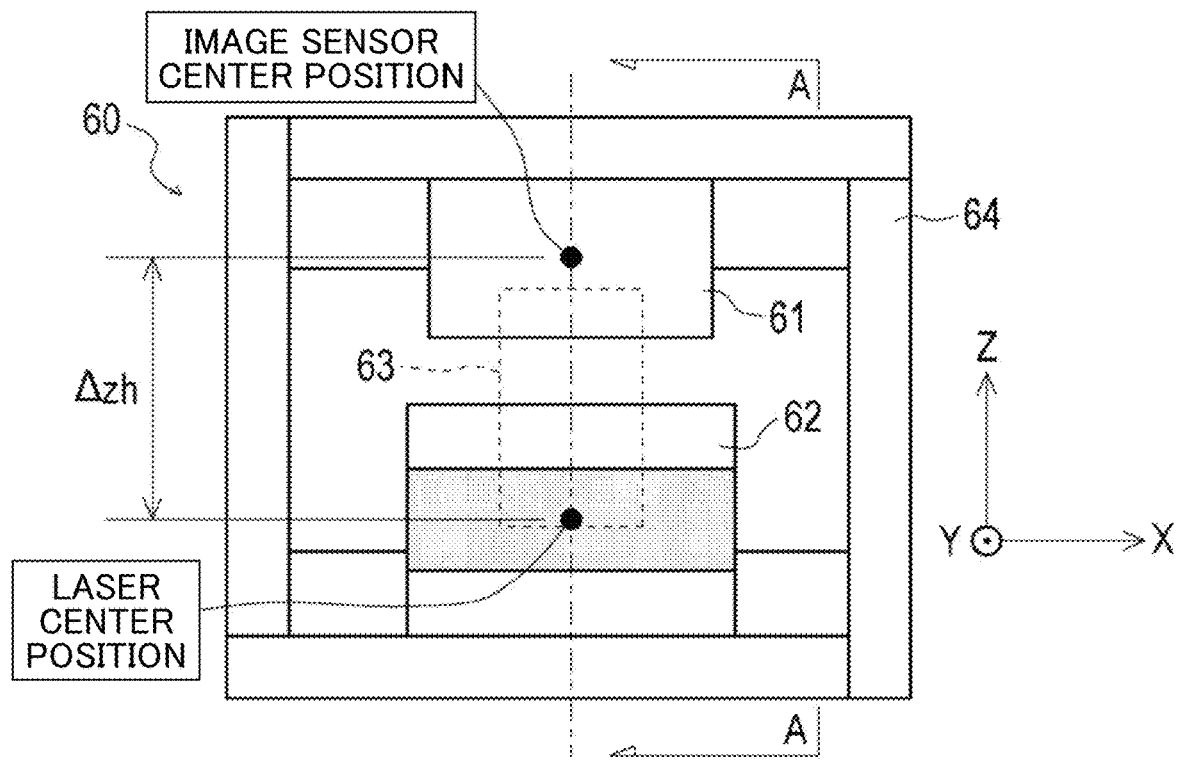
FIGS. 7A and 7B are schematic diagrams illustrating a data acquisition section, where
Figure 7B:
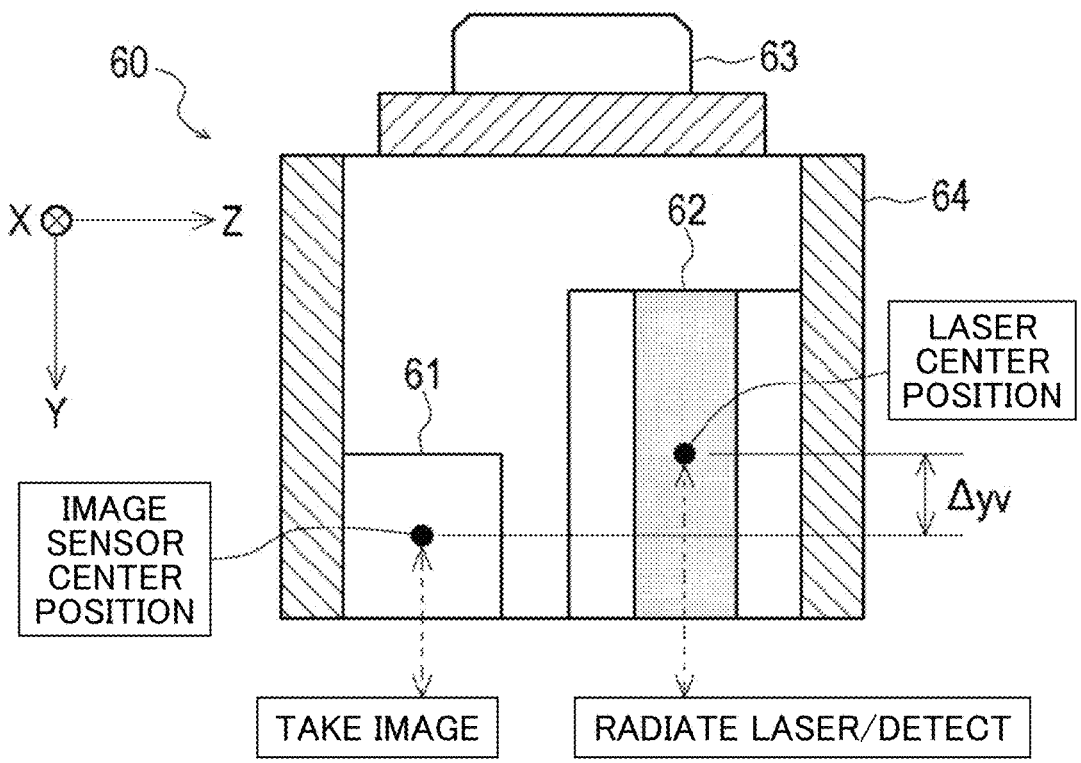

As illustrated in FIGS. 7A and 7B, data acquisition section 60 is a sensor unit where camera 61, laser scanner 62, and inertial measurement unit (IMU) 63 are integrally fixed to frame body 64.

Frame body 64 is a substantially cuboid object formed by combining five plate members. Frame body 64 is formed into a shape having an opening at a bottom, with four side surface portions of the cuboid being formed by four plate members and a top surface portion of the cuboid being formed by the remaining one plate member. With data acquisition section 60, camera 61 and laser scanner 62 are attached on inner sides of the side surface portions of frame body 64, and IMU 63 is attached to the top surface portion of frame body 64. As illustrated in FIG. 7A, an image sensor center position of camera 61 and a laser center position of laser scanner 62 are separated by distance Δzh in the Z-axis direction, when viewed along the Y-axis direction. Additionally, the laser center position is a laser rotation center of laser scanner 62, and is on the Z-axis.

Furthermore, as illustrated in FIG. 7B, the image sensor center position of camera 61 and the laser center position of laser scanner 62 are separated by distance Δyv in the Y-axis direction, when viewed along the X-axis direction.

Data acquisition section 60 is disposed at an attitude according to which, of the four side surface portions of frame body 64, one of pairs of facing side surface portions is perpendicular to the Z-axis, and the other of the pairs of facing side surface portions is perpendicular to the X-axis. Furthermore, data acquisition section 60 is disposed at an attitude according to which the top surface portion of frame body 64 is perpendicular to the Y-axis.

Next, a method of transforming an X coordinate of a point (x, y) in the XYZ coordinate system into an Xc coordinate in a camera spatial coordinate system will be described.

To display image M taken by camera 61 and guide information GD described later on data display section 80 in an overlapping manner, guide information display apparatus 50 performs a coordinate value transformation process between the XYZ coordinate system and the camera spatial coordinate system. Guide information display apparatus 50 defines a three-dimensional camera spatial coordinate system Xc•Yc•Zc in an image space of camera 61.

As illustrated in FIG. 5A, a distance between a perpendicular extending from a lens center of camera 61 and the point (x, y) in the X-axis direction is given as dh, and a maximum screen width of camera 61 in the horizontal direction is given as wh. Furthermore, x of the point (x, y) is a position in the X-axis direction from a screen center. At this time, the Xc coordinate of the point (x, y) in the camera space is expressed by following expressions (1) and (2).

Additionally, in the following expressions, a difference between positions of the image sensor of camera 61 and the laser center in the horizontal direction is given as Δzh (see FIG. 7A), a lateral width of a camera image as wh, the horizontal viewing angle of camera 61 as θh, and a temporary variable as tmp1.

$$tmp1 = (y - \Delta zh) \times \tan(\pi \times \theta h / 360) \quad (1)$$

$$Xc = wh/2 - wh \times x/(2 \times tmp1) \quad (2)$$

Next, a method of transforming a Z coordinate of a point (y, z) in the XYZ coordinate system into a Zc coordinate in the camera spatial coordinate system will be described, As illustrated in FIG. 5B, a distance between the point (y, z) and the laser center in the Z-axis direction is given as dv, and a maximum screen width of camera 61 in the horizontal direction is given as wv. Furthermore, z of the point (y, z) is a position in the Z-axis direction from the screen center. At this time, the Zc coordinate of the point (y, z) in the camera space is expressed by following expressions (3) and (4).

Additionally, in the following expressions, a difference between positions of the image sensor of camera 61 and the laser center of laser scanner 62 in the vertical direction is given as Δyv (see FIG. 7B), a vertical width of the camera image as wv, the vertical viewing angle of camera 61 as θv, and a temporary variable as tmp2.

$$tmp2 = Y \times \tan(\pi \times \theta v / 360) \quad (3)$$

$$Zc = wv/2 + wv \times (Z - \Delta yv)/(2 \times tmp2) \quad (4)$$

Guide information display apparatus 50 transforms coordinates of point cloud data acquired by laser scanner 62 or the like in the XYZ coordinate system into those in the camera spatial coordinate system by using expressions (1) to (4) above, and thereby performs display by adjusting a position of guide information GD on image M taken by camera 61.

Additionally, as laser scanner 62, a device that is capable of measuring a three-dimensional shape of a measurement target object from a maximum reachable height of telescopic boom 22 (for example, about 100 meters) is selected by taking into account the maximum reachable height. Furthermore, as laser scanner 62, a device that achieves predetermined performance with respect to specifications regarding a measurement speed, the number of measurement points, a measurement accuracy and the like is selected, by taking into account the amount of data and a data accuracy necessary to create appropriate guide information.

Additionally, the present embodiment describes, as an example, a case where laser scanner 62 including a total of 16 laser transmitter/receiver sensors is used, but the guide information display apparatus according to the present invention is not limited by the number of laser transmitter/receiver sensors forming the laser scanner. That is, with the guide information display apparatus according to the present invention, a laser scanner of optimal specifications is selected as appropriate according to the maximum reachable height of the boom (jib) of the crane, or the like.

Data that is acquired from suspended load region WA by data acquisition section 60 includes image data, taken by camera 61, of suspended load \V, ground surface F below suspended load W, and grounded object C existing around suspended load W. Furthermore, data that is acquired from suspended load region WA by data acquisition section 60 includes point cloud data that is acquired by scanning suspended load W, ground surface F, and grounded object C by laser scanner 62. Additionally, ground surface F here broadly includes surfaces of a transfer origin and a transfer destination of suspended load W, and includes not only a surface of a ground, but also a surface of a rooftop terrace of a building, a rooftop surface and the like.

As illustrated in FIG. 3, data processing section 70 is a part that processes data that is acquired by data acquisition section 60, and creates guide information GD to be presented to the operator, and in the present embodiment, data processing section 70 is a general-purpose personal computer where predetermined data processing programs are installed.

Moreover, data processing section 70 is electrically connected to controller 34 of crane 1, and "crane information" that is output from controller 34 is input to data processing section 70.

Data display section 80 is a part that displays guide information GD to be presented to the operator, and is a display apparatus that is connected to data processing section 70.

Figure 8B:
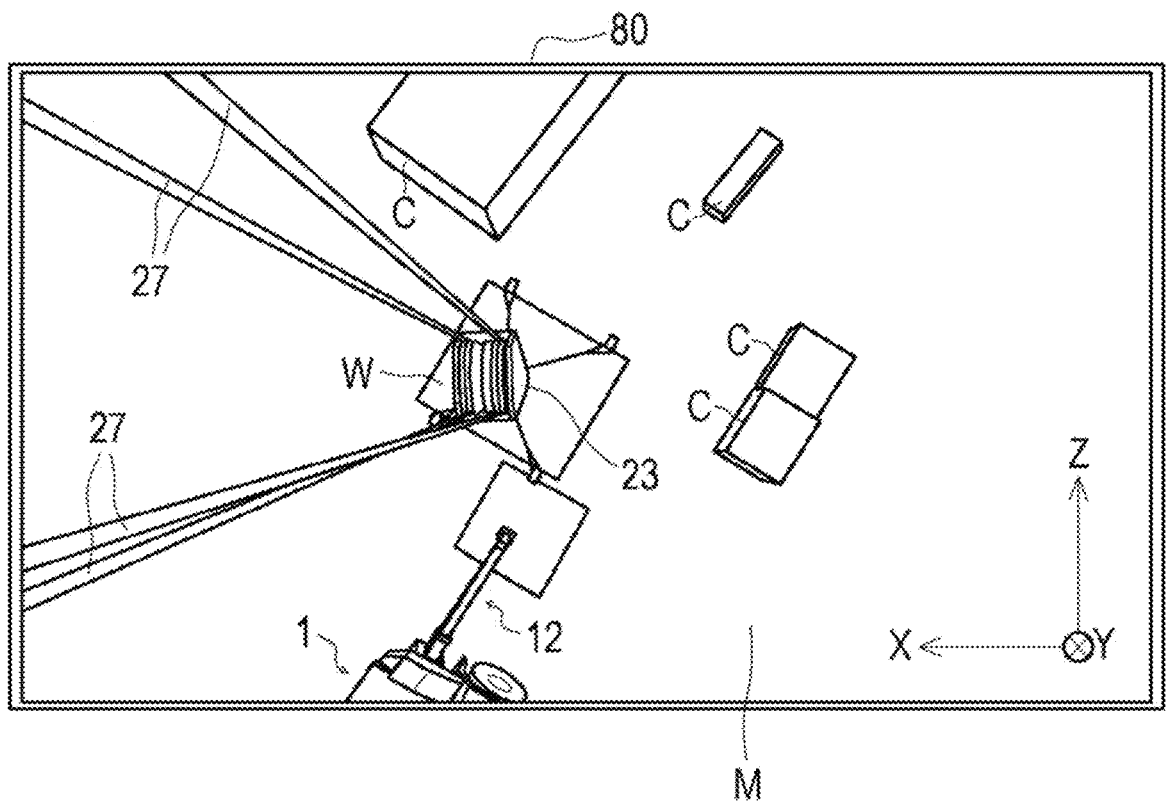
FIGS. 8A and 8B are diagrams illustrating a display state of guide information, where
Figure 8A:
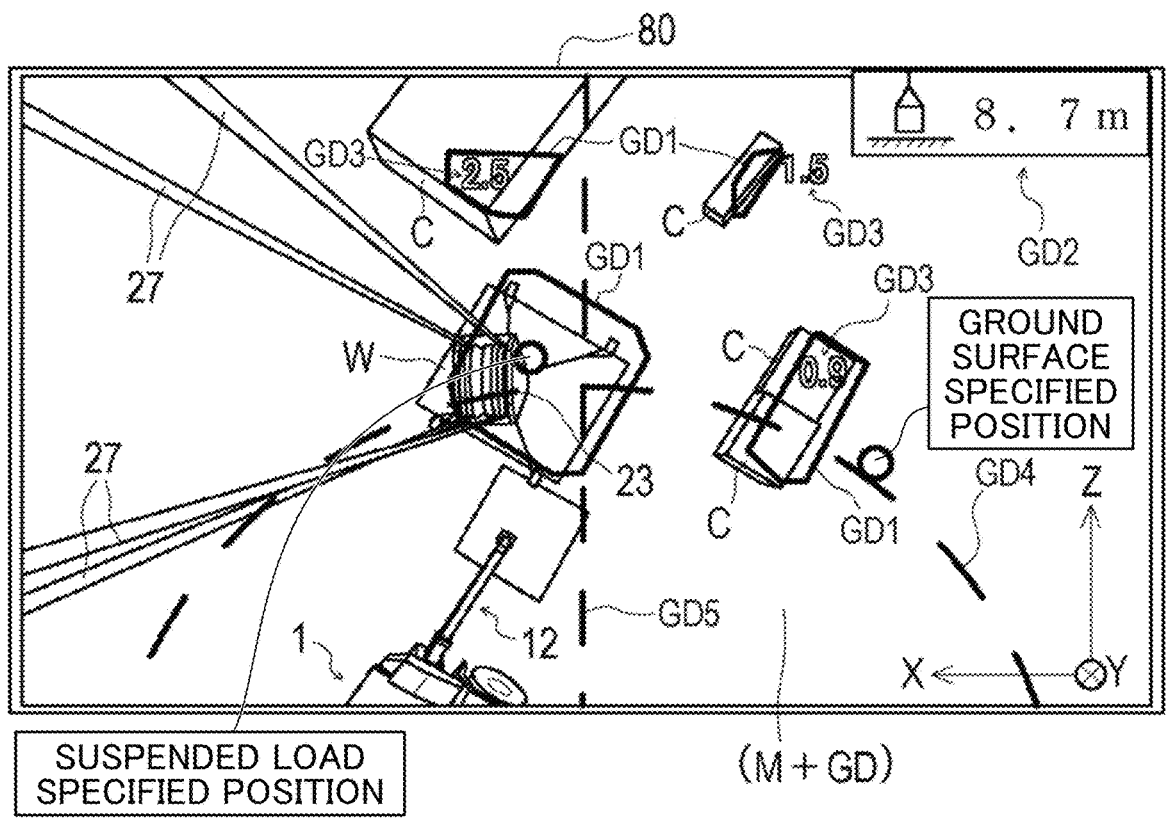

As illustrated in FIG. 8A, image M of suspended load region WA taken by camera 61 is displayed in real time on data display section 80.

As illustrated in FIG. 8B, guide information GD includes guide frame GD1 indicating an outer shape of suspended load W or grounded object C that is viewed along the Y-axis direction, height information GD2 of a bottom surface of suspended load W, height information GD3 of a top surface of grounded object C, working radius information GD4 indicating a traffic line of suspended load W, axial line information GD5 indicating an axial line direction of telescopic boom 22, and the like.

Moreover, guide information GD created by data processing section 70 and image M are superimposed and displayed on data display section 80.

As illustrated in FIG. 3, data input section 90 is a part used to input setting values and the like to data processing section 70, and is configured from a touch panel, a mouse, a keyboard apparatus and the like.

Additionally, as illustrated in FIG. 9A, with guide information display apparatus 50, data processing section 70, data display section 80, and data input section 90 are desirably integrally configured by a general-purpose tablet personal computer (hereinafter, referred to also as a tablet PC). Alternatively, as illustrated in FIG. 93, with guide information display apparatus 50, data display section 80 and data input section 90 may be integrally configured by a touch panel display apparatus, and data processing section 70 which is a general-purpose PC may be connected to the touch panel display apparatus.

As illustrated in FIG. 4, data display section 80 and data input section 90 are disposed inside cabin 30, at positions in front of driver's seat 31 that are easily visible to the operator. Data processing section 70 is desirably disposed near data acquisition section 60. Additionally, in the case where data processing section 70, data display section 80, and data input section 90 are integrally configured by a tablet PC, data processing section 70 may be disposed inside cabin 30.

A wired LAN is desirably used for data transmission between data acquisition section 60 and data processing section 70. Additionally, a wireless LAN or power line communication may be used for data transmission between data acquisition section 60 and data processing section 70.

Additionally, as illustrated in FIG. 9A, with guide information display apparatus 50, data processing section 70, data display section 80, and data input section 90 are desirably integrally configured by a general-purpose tablet personal computer (hereinafter, referred to also as a tablet PC). Alternatively, as illustrated in FIG. 9B, with guide information display apparatus 50, data display section 80 and data input section 90 may be integrally configured by a touch panel display apparatus, and data processing section 70 which is a general-purpose PC may be connected to the touch panel display apparatus.

A state of acquisition of data by data acquisition section 60 will now be described.

Data acquisition section 60 continuously captures suspended load region WA by camera 61, and acquires image M of suspended load region WA.

As illustrated in FIG. 10, data acquisition section 60 continuously scans suspended load region WA by laser scanner 62, and acquires point cloud data of a measurement target object in suspended load region WA. In the following, point cloud data that is acquired by laser scanner 62 will be referred to as point cloud data P. Point cloud data P is a set of point data p, and point data p indicates each point on ground surface F, suspended load W, and a top surface of grounded object C that are present in suspended load region WA. Furthermore, as illustrated in FIG. 11, point data p includes information about distance a between a measurement target object (such as grounded object C) and laser scanner 62, and about radiation angle b of laser scanner 62 at a time of acquisition of point data p in question.

As illustrated in FIG. 3, first GNSS receiver 65 is connected to laser scanner 62, and time information is received by first GNSS receiver 65 from a plurality of positioning satellites at the same time as acquisition of point cloud data. P. Data processing section 70 adds information about an acquisition time of point data p to point data p in question.

That is, information about point data p includes acquisition time tp, in addition to distance a and radiation angle b.

Furthermore, at the same time as acquiring point cloud data P by laser scanner 62, data acquisition section 60 acquires, by IMU 63, attitude data Q of laser scanner 62 at predetermined intervals. Attitude data. Q includes information about acceleration and an angle of laser scanner 62 with respect to each axis direction of X-, Y-, Z-axes. Additionally, an acquisition cycle of attitude data Q by IMU 63 is set shorter than an acquisition cycle of point cloud data P by laser scanner 62. Attitude data Q is a set of individual attitude data q that is measured in each measurement cycle.

Second GNSS receiver 66 is connected to IMU 63, and time information is received by second GNSS receiver 66 from a plurality of positioning satellites at the same time as acquisition of attitude data Q. Data processing section 70 adds acquisition time tq to individual attitude data q, as information about an acquisition time of individual attitude data q in question. That is, information about individual attitude data q includes acquisition information tq.

Next, a state of processing of data by data processing section 70 will be described.

As illustrated in FIG. 12, in data processing by data processing section 70, a "frame extraction process" is first performed (STEP-101).

In the data processing of point cloud data P by data processing section 70, point cloud data P for one frame is segmented and output from stream data of point cloud data P. Point cloud data P for one frame is a set of point data p acquired while the radiation direction of laser by laser scanner 62 makes one round around the Z-axis.

As illustrated in FIG. 12, in the data processing by data processing section 70, a "synchronization process of point cloud data and attitude data" is next performed (STEP-102).

Data processing section 70 synchronizes point data p included in point cloud data P for one frame with attitude data Q acquired by IMU 63.

Specifically, synchronization is performed for each point data p, by retrieving acquisition time tq of individual altitude data q closest to acquisition time tp of point data p in question, and associating individual attitude data q at acquisition time tq in question with point data p in question.

Data processing section 70 outputs point data p synchronized with individual attitude data q in the manner described above.

Then, as illustrated in FIG. 11, data processing section 70 calculates distance h from the laser center position of laser scanner 62 to point data p on the basis of distance a and radiation angle b. Additionally, "distance h" here is a distance from the laser center position of laser scanner 62 to a horizontal plane where point data p is present.

Furthermore, at the time of calculating distance h of point data p, data processing section 70 performs correction using individual attitude data q for point data p in question. An error due to the attitude of laser scanner 62 may thereby be eliminated, and distance h of point data p may be more accurately calculated.

That is, with guide information display apparatus 50, data acquisition section 60 includes IMU 63 that acquires attitude data Q of laser scanner 62, and data processing section 70 corrects point cloud data P on the basis of attitude data Q of laser scanner 62 acquired by IMU 63.

According to such a configuration, guide information display apparatus 50 may present more accurate guide information GD to the operator.

When point cloud data P for one frame is plotted in the XYZ coordinate system, it is shown as FIG. 13A. FIG. 13A illustrates point cloud data P (a set of point data p) viewed in the Z-axis direction.

As illustrated in FIG. 12, in the data processing by data processing section 70, a "ground surface estimation process" is next performed (STEP-103). Data processing section 70 performs a process of estimating reference height H0 of ground surface Fin suspended load region WA.

First, a case of automatically estimating ground surface F will be described.

(Point Cloud Data Acquisition Step)

First, data processing section 70 acquires point cloud data. P for one frame. Point cloud data P is acquired from suspended load region \V including suspended load W, grounded object C and ground surface F, from above suspended load W and grounded object C which are measurement target objects.

As illustrated in FIGS. 14 and 15B, data processing section 70 divides suspended load region WA into a lattice of a plurality of small regions S in a plan view (viewed in the Y-axis direction; region dividing step: STEP-201). Data processing section 70 equally divides laser lateral lines by division lines parallel to the Z-axis direction, and performs division into small regions S having same shape and same area with reference to the divided laser lateral line. In the present embodiment, data processing section 70 performs division into 160 small regions S by dividing each laser lateral line into ten pieces.

Next, data processing section 70 extracts point data p with greatest distance h (that is, distance h is maximum distance hmax) from each small region S (maximum point data extraction step: STEP-202). Point data p with maximum distance hmax is expected to be point data p that exists at a lowest position. As illustrated in FIGS. 14 and 15A, data processing section 70 then calculates separation amount D of distance h of another point data from point data p with maximum distance hmax (separation amount calculation step: STEP-203). Data processing section 70 extracts, as point data of ground surface F, point data p, separation amount D of distance h of which is at or smaller than predetermined threshold r1 (in the present embodiment, separation amount D of 7 cm or less), with maximum distance hmax as a reference (ground surface point data extraction step: STEP-204).

Next, data processing section 70 estimates, for each small region S, reference height H0 of ground surface F in small region S on the basis of distance h of extracted point data p (small region ground surface estimation step: STEP-205). In the present embodiment, data processing section 70 takes an average value of distances h of pieces of extracted point data p as reference height H0 of ground surface F in small region S.

According to such a configuration, data processing section 70 may estimate reference height H0 of ground surface F in arbitrary small region S.

Furthermore, data processing section 70 estimates reference height 110 of ground surface F in suspended load region WA on the basis of reference height H0 of ground surface F in each small region S (region ground surface estimation step: STEP-206), in the present embodiment, data processing section 70 takes, as reference height H0 of ground surface F in suspended load region WA, a value that is obtained by further averaging reference heights H0 (average values of distances h) of ground surfaces F in small regions S among all small regions S.

According to such a configuration, data processing section 70 may estimate reference height H0 of ground surface F in suspended load region WA. Then, data processing section 70 calculates elevation value H of point data p from distance h and reference height H0. As illustrated in FIG. 10, elevation value H is a height of point data p from reference height H0.

In (STEP-206), in the case where a difference between reference height H0 of ground surface F in suspended load region WA and reference height H0 of ground surface F in one small region S is greater than a predetermined threshold, data processing section 70 may determine that point data p not belonging to ground surface F is extracted, and may correct reference height H0 of ground surface F in suspended load region WA by using, instead of reference height H0 of ground surface F in one small region S in question, reference height H0 of ground surface F in small region S, difference of which is smaller than the predetermined threshold, among small regions S that are adjacent to one small region S in question.

According to such a configuration, in a case where point data p not belonging to ground surface F is estimated to have been extracted, data processing section 70 may use reference height H0 of ground surface F in small region S, the difference of which is smaller than the predetermined threshold, among small regions S that are adjacent to one small region S, instead of one small region S in question, and reference height H0 of ground surface F in suspended load region WA may be more accurately estimated.

Furthermore, at the time of estimating reference height H0 of ground surface F in suspended load region WA in (STEP-206), small region S, among all small regions 5, with respect to which point data p not belonging to ground surface F is estimated to have been extracted may be excluded. For example, an average value may be calculated using only reference heights H0 of ground surfaces F in small regions S within a predetermined threshold with reference to one small region S with minimum reference height H0 of ground surface F, among reference heights H0 of ground surfaces F calculated for small regions S. As described above, at the time of estimating reference height H0 of ground surface F in suspended load region WA, reference height H0 of only specific small region S may be used instead of using reference heights H0 of all small regions S.

According to such a configuration, data processing section 70 may exclude small region S with respect to which it is estimated that point data belonging to around surface F is not extracted. Accordingly, estimation of reference height H0 in suspended load region WA may be accurately performed.

As described above, a ground surface estimation method includes the point cloud data acquisition step of acquiring point cloud data P from suspended load region WA including ground surface F by laser scanner 62, the region dividing step of dividing suspended load region WA into a lattice in a plan view, and creating a plurality of small regions S having a same shape and a same area, the maximum point data extraction step of extracting, from small region S, point data p with maximum distance h, the separation amount calculation step of calculating, for small region 5, separation amount D of distance h of another point data p with respect to point data p with maximum distance h, the ground surface point data extraction step of extracting, from small region 5, point data p with respect to which separation amount D of distance h is at or smaller than predetermined threshold r1, the small region ground surface estimation step of estimating reference height H0 of ground surface F in small region S on the basis of point data p extracted in the ground surface point data extraction step, and the region ground surface estimation step of estimating reference height H0 of ground surface F in suspended load region WA on the basis of reference height H0 of around surface F in each small region S.

Guide information display apparatus 50 is configured to create guide information GD on the basis of reference height H0 of ground surface F that is acquired with high accuracy by the processes described above. Accordingly, guide information display apparatus 50 may accurately calculate the height information of suspended load W and the height information of grounded object C on the basis of reference height H0 of ground surface F.

Next, a case of estimating ground surface F by taking a specific position in an image as a reference will be described. Additionally, a case is described here, as an example, where the operator manually specifies a specific position in an image, but a specific position in an image may alternatively be automatically determined and specified by data processing section 70.

With guide information display apparatus 50, ground surface F as a reference may be determined by specifying a position on the ground surface using data display section 80 and data input section 90.

As illustrated in a top diagram in FIG. 16, in the case of manual performance, the operator specifies a position which is clearly a ground surface, in an image that is displayed on data display section 80. Then, as illustrated in a middle diagram in FIG. 16, data processing section 70 creates a reference circle having a predetermined radius with the specified position (point) at a center. Then, as illustrated in a bottom diagram in FIG. 16, data processing section 70 detects an overlap of point data p existing on the laser lateral lines, and selects a plurality of pieces of point data p included in the reference circle.

Then, as illustrated in FIG. 15A, data processing section 70 extracts point data p with greatest distance h (that is, distance h is maximum distance hmax) from the selected plurality of pieces of point data p. Then, data processing section 70 calculates separation amounts D of distances h of other pieces of point data with respect to point data p with maximum distance hmax. Data processing section 70 extracts, as point data of ground surface F, point data p with respect to which separation amount D of distance h is at or smaller than predetermined threshold r1 (in the present embodiment, separation amount D of 7 cm or less) with respect to maximum distance hmax. Data processing section 70 estimates reference height H0 of ground surface F on the basis of distances h of the extracted pieces of point data p. In the present embodiment, data processing section 70 takes the average value of distances h of the extracted pieces of point data p as reference height H0 of ground surface E As illustrated in FIG. 12, in the data processing by data processing section 70, a "plane estimation process" is then performed (STEP-104). Data processing section 70 estimates top surfaces of suspended load W and grounded object C, which are measurement target objects existing in suspended load region WA, by a following top surface estimation method.

When point cloud data P for one frame is plotted on suspended load region WA represented in the XYZ coordinate system, it is shown as FIG. 13A. When such point cloud data P in suspended load region WA is schematically illustrated, it is as shown in a top diagram in FIG. 17.

(Point Cloud Data Acquisition Step)

Data processing section 70 first acquires such point cloud data P for one frame. Point cloud data P is acquired from suspended load region W including suspended load W and grounded object C, which are measurement target objects, from above suspended load W and grounded object C.

(Grouping Step)

Data processing section 70 divides point cloud data P, as illustrated in the top diagram in FIG. 17, acquired from suspended load region WA into layers having predetermined thickness d in the Y-axis direction, as illustrated in a middle diagram in FIG. 17, and groups point cloud data. P into a plurality of groups (see FIG. 13B), At this time, data processing section 70 assigns an individual group ID (in this case, ID: 001 to 006) to each of the divided groups, and associates each piece of point data p to a group ID.

(Top Surface Estimation Step)

Then, data processing section 70 estimates a plane for each group using a plurality of pieces of point data p included in the group. The "plane" here is an upward plane of each of suspended load W and grounded object C, or in other words, a "top surface" of each of suspended load W and grounded object C.

In the following, the top surface estimation step will be specifically described.

First, as illustrated in FIG. 18 and a top diagram in FIG. 19, data processing section 70 selects two pieces of point data p, p from a plurality of pieces of point data p, p, . . . included in a same group (two-point selection step: STEP-301).

Then, as illustrated in FIG. 18 and a bottom diagram in FIG. 19, data processing section 70 calculates an inter-point distance L1 between the selected two pieces of point data p, p (inter-point distance calculation step: STEP-302).

Next, as illustrated in FIG. 18 and a top diagram in FIG. 20, if inter-point distance L1 is at or smaller than predetermined threshold r2 (STEP-303), data processing section 70 deems the two points (two pieces of point data p, p indicated by dotted lines) to be on a same plane (two-points-on-plane deeming step: STEP-304). Then, as illustrated in FIG. 18 and a bottom diagram in FIG. 20, data processing section 70 calculates center of gravity G1 of each point that is deemed to be on the same plane (in this case, each of the selected two points; center-of-gravity calculation step: STEP-305). If "no" is determined in (STEP-303), two points are newly selected by returning to (STEP-301).

Next, as illustrated in FIG. 18 and a top diagram in FIG. 21, data processing section 70 searches for point data p which is a neighboring point of the calculated center of gravity G1 (neighboring point search step: STEP-306). The "neighboring point" here is a point, the inter-point distance of which to center of gravity G1 is at or smaller than threshold r2.

Then, as illustrated in FIG. 18 and a bottom diagram in FIG. 21, when point data p which is a neighboring point is found (STEP-307), data processing section 70 deems that point data p in question, which is a neighboring point, is also on the same plane as the two pieces of point data p, p previously selected (neighboring-point-on-plane deeming step: STEP-308).

Then, as illustrated in FIG. 18 and a top diagram in FIG. 22, data processing section 70 returns to (STEP-305), and newly calculates center of gravity G2 from the points that are deemed to be on the same plane (in this case, three pieces of point data p, p, p indicated by dotted lines).

Data processing section 70 proceeds to (STEP-306), and further searches for point data p which is a neighboring point of center of gravity G2. Then, as illustrated in FIG. 18 and a bottom diagram in FIG. 22, if point data p which is a neighboring point is further found (STEP-307), data processing section 70 deems that point data p in question, which is a neighboring point, is also on the same plane as each point previously selected point (STEP-308).

Then, data processing section 70 searches for a neighboring point while calculating a new center of gravity, and repeats the processes (STEP-305) to (STEP-308) in the order mentioned until point data p which is a neighboring point is no longer detected.

Then, as illustrated in FIGS. 18 and 23, if no new neighboring point is found, data processing section 70 determines "no" in (STEP-307), performs clustering of a subset (cluster) of pieces of point data p that are deemed to be on the same plane, and estimates a plane (STEP-309). The "clustering" here refers to a process of separating point cloud data P, which is a set of point data p, into clusters such that pieces of point data p included in each cluster have a common property of being on the same plane.

Data processing section 70 sets planar clusters CL1 by separating point cloud data P into pieces of point data p which are deemed to be on the same plane (see FIG. 17, bottom diagram). A plane (that is, the "top surface" of suspended load W or grounded object C) may be defined using each piece of point data p belonging to planar cluster CL1. Additionally, a plurality of planar clusters CL1 possibly present in a group assigned with one group ID.

Then, data processing section 70 estimates a "width" of the plane from a maximum value and a minimum value of the X coordinate of pieces of point data p belonging to planar cluster CL1, and estimates a "depth" of the plane from a maximum value and a minimum value of the Z coordinate. That is, according to the top surface estimation method for suspended load W and grounded object C described in the present embodiment, a "width" of the top surface is estimated by data processing section 70 from the inter-point distance between two pieces of point data p, p that are most separate in a width direction (X-axis direction) of the top surface, among a plurality of pieces of point data p that are deemed to be on the same plane (in other words, belonging to the same planar cluster CL1), and a "depth" of the top surface is estimated by data processing section 70 from the inter-point distance between two pieces of point data p, p that are most separate in a depth direction (Z-axis direction) of the top surface, among such plurality of pieces of point data p.

Data processing section 70 defines a plane from estimated planar cluster CL1 in such a manner. Additionally, a plane to be defined may be a polygon other than a rectangle.

That is, the top surface estimation method for suspended load W and grounded object C includes the point cloud data acquisition step of, by laser scanner 62, acquiring point cloud data P from suspended load region WA including suspended load W and grounded object C, from above suspended load W and grounded object C, and by means of data processing section 70 that performs arithmetic processing on point cloud data P, the grouping step of dividing suspended load region WA into layers of a plurality of groups (IDs: 001 to 006) having predetermined thickness d in the vertical direction, and grouping acquired point cloud data P into the plurality of groups (IDs: 001 to 006), and the top surface estimation step of, by data processing section 70, estimating top surfaces of suspended load W and grounded object C for each group, on the basis of point cloud data P grouped into the plurality of groups (IDs: 001 to 006).

With the top surface estimation method as described above, the top surfaces of suspended load W and grounded object C may be estimated on the basis of only point cloud data P corresponding to the top surfaces, acquired by laser scanner 62. Accordingly, with the top surface estimation method described in the present embodiment, the top surfaces of suspended load W and grounded object C may be estimated in a short time on the basis of point cloud data P acquired by laser scanner 62, and thus, estimation of the top surfaces of suspended load W and grounded object C in real time may be achieved.

Furthermore, with the top surface estimation method as described above, the top surfaces of suspended load W and grounded object C may be estimated without using a statistical method, and the amount of calculation required to estimate the top surfaces of suspended load W and grounded object C may be reduced compared to a case of using a statistical method. Accordingly, with the top surface estimation method described in the present embodiment, the top surfaces of suspended load W and grounded object C may be estimated in a shorter time on the basis of point cloud data P acquired by laser scanner 62.

Additionally, a case is described with respect to the top surface estimation method for suspended load W and grounded object C, according to which crane 1 is provided with data acquisition section 60 at top boom member 22$f$ of telescopic boom 22, and point cloud data P for suspended load W, grounded object C and ground surface F is acquired by laser scanner 62 from above suspended load W, but the top surface estimation method for a measurement target object is not limited to be applied to a case where the suspended load of the crane and objects around the suspended load are taken as the measurement target objects.

That is, the top surface estimation method for a measurement target object may be widely applied, for example, to cases where the laser scanner is provided at a boom distal end portion of a work vehicle (such as an aerial work platform) including a boom or on a drone, and point cloud data of a measurement target object below is acquired from above and the top surface of the measurement target object is estimated on the basis of the acquired point cloud data.

Next, with the top surface estimation method, estimated planar clusters CL1 (top surfaces) are combined.

As illustrated in FIG. 24 and a top diagram in FIG. 25, data processing section 70 selects, from estimated planar clusters CL1, two planar clusters CL1, CL1 assigned with different group IDs, and calculates difference dH between elevation values H of planar clusters CL1 (STEP-401: elevation value difference calculation step).

Here, data processing section 70 searches for a combination for which difference dH is at or smaller than threshold r3 (STEP-402). Elevation value H of planar cluster CL1 here is an average value of elevation values H of pieces of point data p belonging to planar cluster CL1.

Next, as illustrated in FIG. 24 and a middle diagram in FIG. 25, when a combination of planar clusters CL1 for which difference dH between elevation values H is at or smaller than threshold r3 is detected, data processing section 70 detects an overlap of planar clusters CL1, CL1 in question in the X-axis direction (STEP-403: overlap detection step). The "overlap" here is a degree of overlap or a degree of separation of planes defined by planar clusters CL1 in the X-axis direction, and as illustrated in FIGS. 24 and 25, an "overlap" is detected in a case where amount of overlap dW1 is detected with respect to the "width" (dW1>0), or in a case where amount of separation dW2 is at or smaller than predetermined threshold r4 (0≤dW2≤r4).

Then, as illustrated in FIGS. 24 and 25, in the case where an "overlap" is detected (STEP-404), data processing section 70 deems that pieces of point data p belonging to planar clusters CL1, CL1 in question are present on a same plane, and combines and updates two planar clusters CL1, CL1 in question as new planar cluster CL1 (STEP-405: plane combining step). Furthermore, at this time, new elevation value H is calculated from each piece of point data p belonging to new planar cluster CL1.

As illustrated in FIG. 24, data processing section 70 repeats the processes described above until there are no more combinations of planar clusters CL1, CL1 satisfying the condition (STEP-406), and estimates a plane that is present across a plurality of groups.

Then, data processing section 70 outputs the combined plane (that is, planar cluster CL1) obtained by the combining process described above.

Planes that are defined by planar clusters CL1 are upward planes of suspended load W and grounded object C, or in other words, the top surfaces of suspended load W and grounded object C.

That is, the top surface estimation method for suspended load W and grounded object C includes the elevation value difference calculation step (STEP-401) of calculating difference dH between elevation values H of a top surface belonging to one group (in FIG. 25, ID: 001) and a top surface belonging to another group (in FIG. 25, ID: 002), among top surfaces estimated in the top surface estimation step, the overlap detection step (STEP-403) of detecting an overlap between the top surfaces in the lateral line direction of laser radiated by laser scanner 62 (that is, the X-axis direction), in the case where difference dH between elevation values His at or smaller than predetermined threshold r3 (STEP-402), and the plane combining step (STEP-405) of deeming, in the case where an overlap is detected (STEP-404), that the top surfaces form one plane, and combining the top surfaces.

With the estimation method for a plane as described above, a plane may be estimated without using a normal vector of point cloud data P. Accordingly, there is a characteristic that the amount of calculation may be small compared to a case of estimating the plane by using a normal vector of point cloud data P.

Furthermore, with the estimation method for a plane as described above, by estimating the top surfaces of suspended load W and grounded object C, three-dimensional shapes of suspended load W and grounded object C may be grasped without acquiring point data p of side surfaces of suspended load W and grounded object C.

As illustrated in FIG. 12, in the clustering method of point cloud data by data processing section 70, a "clustering process for a same region" is next performed (STEP-105). The "clustering" here is a process of separating point cloud data P, which is a set of data, into clusters, and causing pieces of point data p included in a cluster to have a common property of being in a "same region".

The "clustering process for a same region" that is performed here is a process of clustering created planar clusters CL1 (planes) on the basis of whether planar clusters CL1 exist in the "same region" or not, regardless of whether planar clusters CL1 belong to the same plane or not. In the following, processing contents of the clustering process for a same region (STEP-105) will be specifically described.

Specifically, as illustrated in FIG. 26, a top diagram in FIG. 27, and a top diagram in FIG. 28, data processing section 70 extracts reference planar cluster CL1A that is planar cluster CL1 to be used as a reference at the time of determining presence in a same region (STEP-501: reference planar cluster extraction step). Data processing section 70 extracts planar cluster CL1 with maximum elevation value H as reference planar cluster CL1A. Elevation value H of planar cluster CL1 here is an average value of elevation values H of pieces of point data p belonging to planar cluster CL1. Data processing section 70 determines whether or not another planar cluster CL1 is in the "same region" as reference planar cluster CL1A, by using extracted reference planar cluster CL1A as a reference. The determination of being present in the "same region" or not is performed by the following procedure.

As illustrated in FIG. 26, the top diagram in FIG. 27, and the top diagram in FIG. 28, when reference planar cluster CL1A is extracted, data processing section 70 calculates differences ΔH of elevation values H of all the other planar clusters CL1 with respect to reference planar cluster CL1A (STEP-502: elevation value difference calculation step).

Next, data processing section 70 searches for planar cluster CL1, difference ΔH of elevation value H of which with respect to reference planar cluster CL1A is at or smaller than threshold r5 (STEP-503: planar cluster search step). Then, when planar clusters CL1, differences ΔH of which are at or smaller than threshold r5, are detected, one planar cluster CL1 is selected therefrom (STEP-504: planar cluster selection step).

Additionally, the process is ended if planar cluster CL1, difference ΔH of which is at or smaller than threshold r5, is not detected.

Next, data processing section 70 detects overlap/non-overlap of selected one planar cluster CL1 in the X-axis direction with respect to reference planar cluster CL1A (STEP-505: overlap detection step). The "overlap" here is a degree of overlap or a degree of separation of the plane defined by planar cluster CL1 when viewed along the Y-axis direction, and an "overlap" is detected in a case where amount of overlap ΔW1 is detected with respect to the "width" (ΔW1>0), as illustrated in a middle diagram in FIG. 27, or in a case where amount of separation ΔW2 is at or smaller than predetermined threshold r6 (0≤ΔW2≤r6), as illustrated in a middle diagram in FIG. 28. As illustrated in the middle diagram in FIG. 27, a case where amount of overlap ΔW1 is detected with respect to the "width" is a state where reference planar cluster CL1A and planar cluster CL1 are overlapped with each other when viewed along the Y-axis direction. As illustrated in the middle diagram in FIG. 28, a case where amount of separation ΔW2 is detected to be at or smaller than predetermined threshold r6 is a state where reference planar cluster CL1A and planar cluster CL1 are not overlapped with each other but close to each other when viewed along the Y-axis direction.

As illustrated in FIG. 26, a bottom diagram in FIG. 27, and a bottom diagram in FIG. 28, in a case where an "overlap" is detected, data processing section 70 deems that one planar cluster CL1 in question exists in the same region as reference planar cluster CL1A, and forms same-region cluster CL2 by one planar cluster CL1 in question and reference planar cluster CL1A (STEP-506: same-region clustering step). Additionally, when an "overlap" is not detected in (STEP-505: overlap detection step), same-region cluster CL2 is not formed, and the next process (STEP-507) is performed.

After (STEP-506), data processing section 70 determines whether there are other planar clusters CL1, differences ΔH of elevation values of which are at or smaller than threshold r5, other than one planar cluster CL1 previously selected (STEP-507: planar cluster presence/absence determination step). Then, if there are other planar clusters CL1 satisfying the condition, (STEP-504) is performed again, and new planar cluster CL1 is selected, and the processes (STEP-505) and (STEP-506) are performed in the order mentioned, and if there is another planar cluster CL1 satisfying the condition, planar cluster CL1 in question is added to previously formed same-region cluster CL2. Then, data processing section 70 repeats processes from (STEP-504) to (STEP-507) in the order mentioned until there are no more planar clusters CL1, differences ΔH of which are at or smaller than threshold r5, and fixes same-region cluster CL2.

When there are no more planar clusters CL1, differences ΔH of elevation values H of which are at or smaller than threshold r5 with respect to reference planar cluster CL1A that is extracted first in (STEP-501), data processing section 70 may further extract new reference planar cluster CL1A, and may form new same-region cluster CL2. In this case, data processing section 70 returns to (STEP-501) and performs the clustering process again, and extracts planar clusters CL1 in the descending order of elevation values H as reference planar cluster CL1A, while excluding planar clusters CL1 already forming same-region cluster CL2.

As described above, specific contents of the clustering process for a same region (STEP-105) illustrated in FIG. 12 are processing contents of (STEP-501) to (STEP-507) as illustrated in FIG. 26.

That is, the clustering method of point cloud data according to an embodiment of the present invention includes the reference planar cluster extraction step (STEP-501) of extracting, from planar clusters processed by the plane estimation process, reference planar cluster CL1A as a reference for a same region, the elevation difference calculation step (STEP-502) of calculating difference ΔH of elevation value H with respect to reference planar cluster CL1A, the planar cluster search step (STEP-503) of searching for planar cluster CL1, difference ΔH of which is at or smaller than threshold r5, the planar cluster selection step (STEP-504) of selecting one planar cluster CL1, difference ΔH of elevation value H of which is at or smaller than threshold r5, the overlap detection step (STEP-505) of detecting overlap/non-overlap of selected planar cluster CL1 with reference planar cluster CL1A, and in case of detecting overlap, the same-region clustering step (STEP-506) of deeming planar clusters CL1A, CL1 to exist in a same region, and of forming same-region cluster CL2.

According to the clustering method of point cloud data having such a configuration, point cloud data P of one or a plurality of suspended loads W and grounded objects C existing in a same region may be clustered on the basis of point cloud data P corresponding to the top surfaces of suspended loads) W and grounded object(s) C acquired by laser scanner 62.

Pieces of point data p belonging to same-region cluster CL2 formed in such a manner are treated as forming one shape in the display of guide information GD described later, and guide frame GD1 is displayed in a manner enclosing same-region cluster CL2. That is, according to the clustering method of point cloud data P described above, suspended loads W and grounded objects C may be collectively displayed as simple guide frame GD1, or may be displayed as guide frames GD1 indicating detailed forms by being sorted into characteristic parts, and a display mode of guide frame GD1 may be changed according to preferences of operators or a work state, the shape of suspended load W, and the like.

Additionally, the "clustering process for a same region" as described above is desirably hierarchical clustering that uses a tree structure based on elevation value, as illustrated in FIGS. 29A and 29B. In the "clustering process for a same region", data processing section 70 creates, for each grounded object C, a tree structure using elevation values IT Here, a description will be given of a case where hierarchical clustering that uses a tree structure is performed for grounded object C of a first example illustrated in FIG. 29A, and a case where hierarchical clustering that uses a tree structure is performed for grounded object C of a second example illustrated in FIG. 29B.

In the hierarchical clustering that uses a tree structure based on the elevation value, data processing section 70 sets planar cluster CL1, the average value of elevation values H of which is the smallest, as a "root". Furthermore, if there is planar cluster CL1 that overlaps planar cluster CL1 forming the "root" when viewed along the Y-axis direction, data processing section 70 forms a "branch" from the "root", and adds overlapping planar cluster CL1 at a tip of the "branch". Then, data processing section 70 sets planar cluster CL1, the average value of elevation values H of which is the greatest, as a "child".

A creation method of guide frame GD1 will now be describe&

Data processing section 70 acquires the tree structure of grounded object C created in the "clustering process for a same region". Then, data processing section 70 acquires point data p included in each planar cluster CL1 forming the tree structure.

Next, as illustrated in a top diagram in FIG. 30, data processing section 70 acquires, from pieces of point data p of "child" planar cluster CL1, each piece of point data p on the laser lateral line that is at a deepest position in the Z-axis direction. Then, data processing section 70 creates a rectangle that is shifted in the Z-axis direction by half the distance to the adjacent laser lateral line, and that has a width in the X-axis direction by which pieces of point data p can be enclosed.

Next, in the case where point data p exists on the laser lateral line that is adjacent to the created rectangle, data processing section 70 changes the shape of the rectangle to include all the pieces of point data p on the corresponding laser lateral line, and creates an outer line, as illustrated in a bottom diagram in FIG. 30.

Then, data processing section 70 searches for point data p on an adjacent laser lateral line until there is no point data p on a laser lateral line as a target, and repeats the processes described above.

Lastly, data processing section 70 creates an outer line that includes all planar clusters CL1 included in the selected tree structure.

Then, data processing section 70 outputs only an outer line satisfying a condition as guide frame GD1, from created outer lines.

For example, as the condition for outputting as guide frame GD1, a condition of displaying only the outer line that is an outermost frame of grounded object C, as illustrated in FIG. 31A, may be selected. In the case of selecting such a condition, one guide frame GD1 entirely enclosing grounded object C is displayed on data display section 80, with respect to grounded object C in question.

Furthermore, for example, as the condition for outputting as guide frame GD1, a condition of displaying, in addition to the outer line that is the outermost frame of grounded object C, an outer line (a small frame), among outer lines where the difference (difference ΔH) of elevation value H with respect to the "root" is at or greater than a threshold, of planar cluster CL1 with greatest elevation value H among the branches may be selected, as illustrated in FIG. 31B. In the case of selecting such a condition, first guide frame GD1 entirely enclosing grounded object C, and second guide frame GD1 included in first guide frame GD1 are displayed on data display section 80, and more detailed guide information GD that takes the three-dimensional shape of grounded object C into account is displayed.

Furthermore, for example, as the condition for outputting as guide frame GD1, a condition of displaying, in addition to the outer line that is the outermost frame of grounded object C, all the outer lines (small frames) where the difference (difference ΔH) of elevation value H with respect to the "root" is at or greater than a threshold may be selected, as illustrated in FIG. 31C. Also in the case of selecting such a condition, first Lunde frame GD1 entirely enclosing grounded object C, and second guide frame GD1 included in first guide frame GD1 are displayed on data display section 80, and more detailed guide information GD that takes the three-dimensional shape of grounded object C into account is displayed.

The threshold regarding difference ΔH may be adjusted with respect to such display conditions. An operator may select the display condition for guide frame GD1 as appropriate to increase visibility of display of guide information GD.

That is, with guide information display apparatus 50, by creating guide frame GD1 on the basis of same-region cluster CL2, the three-dimensional shape of grounded object C may be taken into account, and guide frame GD1 more specifically expressing grounded object C may be created. Furthermore, with guide information display apparatus 50, guide frame GD1 collectively enclosing planar clusters CL1 existing in a same region may be created. That is, with guide information display apparatus 50, detailed and highly visible guide information GD may be presented.

As illustrated in FIG. 12, in the data processing by data processing section 70, a "synchronization process of point cloud data and camera image" is next performed (STEP-106).

As illustrated in FIGS. 5A and 5B, point cloud data P acquired in the XYZ coordinate system is transformed into coordinate values in the camera spatial coordinate system, is synchronized with (positioned on) image M taken by camera 61, and is output to data display section 80.

As illustrated in FIG. 12, in the data processing by data processing section 70, a "guide display process" is next performed (STEP-107).

Data processing section 70 creates guide information GD on the basis of information about created same-region cluster CL2, and outputs guide information GD to data display section 80.

Additionally, at the time of the "guide display process", "crane information" that is output from controller 34 of crane 1 is used. The "crane information" to be used here includes information about a length of telescopic boom 22, a luff-up angle, the working radius of crane 1, the weight of suspended load W, and the like.

A sequential flow of data processing by data processing section 70 has been described above. According to such a configuration, point data p on a side surface of a measurement target object does not have to be acquired, and guide information GD may be created by accurately grasping the three-dimensional shapes of suspended load W and grounded object C with a small amount of calculation. According to such a configuration, the amount of data calculation may be reduced, and thus, such a configuration is suitably used to grasp the shape of suspended load W or grounded object C in real time, and also allows use of data processing section 70 having a simple hardware configuration.

Next, contents of guide information GD will be described.

With guide information display apparatus 50, guide information GD is displayed by data display section 80. Guide information GD to be displayed by data display section 80 includes information about a specified position on ground surface F that is indicated by an operator, as illustrated in FIG. 8B.

Furthermore, guide information display apparatus 50 allows specification of suspended load W. When an operator specifies suspended load W on a screen, in the same manner as when specifying ground surface F, a plane (top surface) present at the specified position is set as representing the top surface of suspended load W. After specification of suspended load W, guide frame GD1 related to suspended load W and guide frame GD1 related to grounded object C are desirably displayed while being distinguished from each other by a change of the color, the thickness or the like of lines.

Pieces of information about specified positions of ground surface F and suspended load W are displayed by markers represented by figures such as circles.

Furthermore, guide information GD to be displayed by data display section 80 includes guide frame GD1 created by data processing section 70.

Data processing section 70 outputs guide frame GD1 on the basis of same-region cluster CL2 that is set. Additionally, with respect to guide frame GD1 of suspended load W, data processing section 70 may output, as guide frame GD1, a frame line that is outwardly offset from the outer line of suspended load W by a predetermined distance and that may include a margin to reliably avoid collision. Such guide frame GD1 is a frame display enclosing with line segments an estimated top surface (planar cluster CL1) of suspended load W and grounded object C.

Furthermore, guide information GD to be displayed by data display section 80 includes height information GD2 from reference height H0 to the bottom surface of suspended load W, and height information GD3 from reference height H0 to the top surface of grounded object C.

Height information GD2 of suspended load W is desirably displayed in an area that is independently provided at an easily visible position on the screen of data display section 80.

Guide information display apparatus 50 uses such a configuration to prevent height information GD2 of suspended load W and height information GD3 of grounded object C from being mistaken for each other.

Data processing section 70 calculates height information GD2 by subtracting a height of suspended load W from a top surface height of planar cluster CL1 that is estimated to be the top surface of suspended load W.

With guide information display apparatus 50, an operator inputs information about suspended load W (hereinafter, referred to as "suspended load information") in data processing section 70 in advance. Such input of "suspended load information" by an operator is performed through data input section 90. Data processing section 70 acquires the height of suspended load W by using the "suspended load information".

Guide information display apparatus 50 is configured to display height information GD3 of grounded object C inside guide frame GD1 enclosing grounded object C. Alternatively, in the case where guide frame GD1 is small, guide information display apparatus 50 is configured to display height information GD3 in a manner partially overlapping guide frame GD1.

Guide information display apparatus 50 clearly indicates a correspondence relationship between grounded object C and height information GD3 using such a configuration.

Furthermore, guide information display apparatus 50 is configured to change, by data processing section 70, the color of the line of guide frame GD1 according to elevation value H of planar cluster CL1 corresponding to guide frame GD1 in question.

Using such a configuration, guide information display apparatus 50 allows an operator to vaguely grasp the approximate elevation values (heights) of suspended load W and grounded object C by looking at guide frames GD1. Accordingly, guide information display apparatus 50 may more accurately present the heights of suspended load W and grounded object C.

Furthermore, guide information display apparatus 50 is configured to change, by data processing section 70, a font color of height information GD2 according to elevation value H of planar cluster CL1 corresponding to guide frame GD1.

Using such a configuration, guide information display apparatus 50 allows an operator to vaguely grasp the approximate elevation values (heights) of suspended load W and grounded object C by looking at height information GD2. Accordingly, guide information display apparatus 50 may more accurately present the heights of suspended load W and grounded object C.

Furthermore, traffic line information of suspended load W is included in the display of guide information GD performed by guide information display apparatus 50. The traffic line information of suspended load W includes working radius information GD4 of suspended load W, and axial line information GD5 of telescopic boom 22 of crane 1.

Working radius information GD4 is a rough indication of the traffic line of suspended load W at a time of swiveling of telescopic boom 22 from a present state, and suspended load W moves along an arc indicated in the form of working radius information GD4.

Furthermore, axial line information GD5 is a rough indication of the traffic line of suspended load W at a time of luffing-up or extension/retraction of telescopic boom 22 from a present state, and suspended load W moves along a straight line indicated in the form of working radius information GD4.

Guide information display apparatus 50 creates working radius information GD4 of suspended load W and axial line information GD5 of telescopic boom 22 on the basis of the "crane information".

Data processing section 70 calculates a working radius of crane on the basis of the "crane information", and creates, and outputs as working radius information GD4, an arc indicating the working radius.

Furthermore, data processing section 70 calculates the axial line direction of telescopic boom 22 on the basis of the "crane information", and creates, and outputs as axial line information GD5, a straight line indicating the axial line direction.

Furthermore, guide information display apparatus 50 is configured to express lines displaying working radius information GD4 and axial line information GD5 by dotted lines while displaying lengths and gaps of the dotted lines using a length (hereinafter, referred to as a reference length) that is used as a rough indication. For example, in the case where the reference length is one meter, working radius information GD4 and axial line information GD5 are displayed to have lengths and gaps corresponding to one meter on ground surface F on a scale at the time, by changing the lengths and gaps of the dotted lines being displayed according to the size of suspended load region WA displayed on data display section 80.

Guide information display apparatus 50 is configured to allow an operator to sense the scale of suspended load W and grounded object C from guide information GD, by displaying the lengths and gaps of the dotted lines using the reference length (such as one meter).

Furthermore, data processing section 70 calculates a height of data acquisition section 60 on the basis of the "crane information", and also, calculates the size of suspended load region WA and a size of a display range of data display section 80, and changes the scale of the dotted lines (that is, sizes of the dotted lines and gaps) to be displayed as working radius information GD4 and axial line information GD5 according to calculation results.

Furthermore, display of guide information GD by guide information display apparatus 50 includes an alarm display for preventing suspended load W and grounded object C coining into contact with each other.

Data processing section 70 determines that there is a risk of contact, in a case where a horizontal distance between suspended load W and grounded object C projected on a horizontal plane is at or smaller than a predetermined threshold (such as one meter), and a distance in the vertical direction is at or smaller than a predetermined threshold (such as one meter).

At this time, as illustrated in FIG. 32, data processing section 70 outputs guide frame GD1 and height information GD2 of grounded object C while emphasizing guide frame GD1 and height information GD2 of grounded object C that possibly comes into contact with suspended load W. Alternatively, data processing section 70 outputs guide frame GD1 and height information GD2 of grounded object C while causing guide frame GD1 and height information GD2 of grounded object C to blink. With guide information display apparatus 50, guide frame GD1 and height information GD2 of grounded object C as alarm displays are output by data processing section 70 and are displayed on data display section 80 to thereby urge an operator to pay attention.

Furthermore, with guide information display apparatus 50, when creating guide information GD by data processing section 70, excluded region JA is set between suspended load W and top boom member 22f, as illustrated in FIG. 33. Data processing section 70 is configured to exclude point data p acquired in excluded region JA from targets of data processing.

Main wire rope 27 passes through excluded region JA. Guide information display apparatus 50 is configured to present more accurate and easily visible guide information GD, by not including main wire rope 27 as a target of creation of guide information GD (that is, the measurement target object). Additionally, excluded region JA is desirably set at a position at which a lower end height of excluded region JA is separate from the top surface of suspended load W by a predetermined distance, so as to prevent creation of guide frame GD1 of suspended load W from being affected.

With guide information display apparatus 50 having such a configuration, guide frames GD1 indicating the shapes, and guide information GD including height information GD2, GD3 indicating heights may be accurately presented to the operator of crane 1 with respect to suspended load W and grounded object C existing in the periphery of suspended load W. By using guide information display apparatus 50 having such a configuration, even in a state where the operator cannot directly view suspended load W, for example, the operator can perform work by crane 1 efficiently and safely on the basis of guide information GD presented by guide information display apparatus 50.

INDUSTRIAL APPLICABILITY

The present invention is applicable to a clustering method of point cloud data, a guide information display apparatus, and a crane.

REFERENCE SIGNS LIST

1 Crane
60 Data acquisition section
62 Laser scanner
70 Data processing section
80 Data display section
P Point cloud data
p Point data
WA Suspended load region
CL1 Planar cluster
CL1A Reference planar cluster
CL2 Same-region cluster
L1 Inter-point distance (of point data)
H Elevation value
ΔH Difference (in elevation values)

The invention claimed is:
1. A guide information display apparatus, comprising:
a data display section;
a data acquisition section that acquires image data of a suspended load region, and point cloud data, the image data being taken by a camera, the point cloud data being acquired by scanning an object with a laser scanner from a top surface, the object including a suspended load and a grounded object in the suspended load region; and
a data processing section that creates a guide frame from a planar cluster resulting from clustering the point cloud data and causes the guide frame to be displayed on a data display section while superimposing the created guide frame on the object in the image data, wherein the data processing section is implemented via at least one hardware processor of a computer,
wherein the data processing section deems a plurality of planar clusters in a same region to be a same region cluster, and creates and displays a single guide frame including the plurality of planar clusters,
wherein the data processing section extracts a planar cluster with a maximum elevation value as a reference planar cluster from the planar clusters,
wherein, the data processing section deems the reference planar cluster and another planar cluster to be in a same region
in a case where an overlap between the reference planar cluster and the another planar cluster for which a difference between elevation values is equal to or smaller than a threshold, is detected in planar view in a distance direction from the laser scanner, and
in a case where the overlap is not detected but a separation amount between the reference planar cluster and the another planar cluster is equal to or smaller than a threshold.

2. The guide information display apparatus according to claim 1, wherein the data processing section causes the guide frame of the planar cluster and the single guide frame including the plurality of planar clusters to be simultaneously or selectively displayed.

3. A work machine, comprising the guide information display apparatus according to claim 2.

4. The guide information display apparatus according to claim 2, wherein the data processing section structures the point cloud data into a hierarchy in a distance direction from the laser scanner and forms the planar cluster by clustering points which belong to a same layer and for which an inter-point distance is equal to or smaller than a predetermined value.

5. A work machine, comprising the guide information display apparatus according to claim 4.

6. A work machine, comprising the guide information display apparatus according to claim 1.

7. The guide information display apparatus according to claim 1, wherein the data processing section structures the point cloud data into a hierarchy in a distance direction from the laser scanner and forms the planar cluster by clustering points which belong to a same layer and for which an inter-point distance is equal to or smaller than a predetermined value.

8. A work machine, comprising the guide information display apparatus according to claim 7.

9. The guide information display apparatus according to claim 1, wherein the data processing section structures the point cloud data into a hierarchy in a distance direction from the laser scanner and forms the planar cluster by clustering points which belong to a same layer and for which an inter-point distance is equal to or smaller than a predetermined value.

10. A work machine, comprising the guide information display apparatus according to claim 9.

11. A guide information display method, comprising:

a data acquisition step of acquiring image data of a suspended load region, and point cloud data, the image data being taken by a camera, the point cloud data being acquired by scanning an object with a laser scanner from a top surface, the object including a suspended load and a grounded object in the suspended load region;

a data processing step of creating a guide frame by clustering the point cloud data; and a data display step of causing the guide frame to be displayed on a data display section while superimposing the created guide frame on the object in the image data, wherein the data processing step includes a step of structuring the point cloud data into a hierarchy in a distance direction from the laser scanner and forming a planar cluster by clustering point cloud data which belongs to a same layer and for which an inter-point distance is equal to or smaller than a threshold, and a step of deeming a plurality of planar clusters in a same region to be a same region cluster, and creating and displaying a single guide frame including the plurality of planar clusters, wherein a planar cluster with a maximum elevation value is extracted as a reference planar cluster from the planar clusters, and wherein, the reference planar cluster and another planar cluster are deemed to be in a same region in the data processing step in a case where an overlap between the reference planar cluster and the another planar cluster for which a difference between elevation values is equal to or smaller than a threshold, is detected in planar view in a distance direction from the laser scanner, and in a case where the overlap is not detected but a separation amount between the reference planar cluster and the another planar cluster is equal to or smaller than a threshold.

* * * * *